United States Patent
Choi et al.

(10) Patent No.: US 12,344,066 B2
(45) Date of Patent: Jul. 1, 2025

(54) CORNER MODULE APPARATUS FOR VEHICLE

(71) Applicant: HYUNDAI MOBIS CO., LTD., Seoul (KR)

(72) Inventors: Won Hyok Choi, Yongin-si (KR); Tae Heon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 254 days.

(21) Appl. No.: 17/899,421

(22) Filed: Aug. 30, 2022

(65) Prior Publication Data
US 2023/0391154 A1    Dec. 7, 2023

(30) Foreign Application Priority Data
Jun. 3, 2022   (KR) .......................... 10-2022-0068232

(51) Int. Cl.
*B60G 3/26* (2006.01)
*B60K 7/00* (2006.01)

(52) U.S. Cl.
CPC ............ *B60G 3/265* (2013.01); *B60K 7/0007* (2013.01); *B60G 2200/44* (2013.01); *B60G 2204/14* (2013.01); *B60K 2007/0038* (2013.01)

(58) Field of Classification Search
CPC .......... B60K 2007/0038; B60K 7/0007; B60G 2204/14; B60G 3/265
See application file for complete search history.

(56) References Cited

U.S. PATENT DOCUMENTS

| | | | | |
|---|---|---|---|---|
| 4,371,191 A | * | 2/1983 | Goldberg | B60G 17/018 280/5.521 |
| 4,700,972 A | * | 10/1987 | Young | B60G 17/0195 280/5.521 |
| 5,620,199 A | * | 4/1997 | Lee | B60G 3/265 280/5.521 |
| 5,782,484 A | * | 7/1998 | Kuhn, Jr. | B60G 3/265 267/248 |

(Continued)

FOREIGN PATENT DOCUMENTS

| | | |
|---|---|---|
| CN | 113276939 A | 8/2021 |
| EP | 4 000 970 A1 | 5/2022 |

(Continued)

OTHER PUBLICATIONS

Korean Office Action Issued on May 3, 2024, in Counterpart Korean Patent Application No. 10-2022-0068232 (6 Pages in Korean).

(Continued)

*Primary Examiner* — Paul N Dickson
*Assistant Examiner* — Maxwell L Meshaka
(74) *Attorney, Agent, or Firm* — NSIP Law

(57) ABSTRACT

Disclosed is a corner module apparatus for a vehicle. The corner module includes a driving unit that provides drive power to a wheel of the vehicle, a braking unit that interferes with rotation of the wheel to generate braking power, and a suspension unit connected to the driving unit. The suspension unit absorbs shock transferred from a road surface. The corner module also includes a steering unit connected to the suspension unit and rotated about a steering axis inclined with respect to the wheel. The steering unit adjusts a steering angle of the wheel.

13 Claims, 78 Drawing Sheets

(56) References Cited

U.S. PATENT DOCUMENTS

| | | | | |
|---|---|---|---|---|
| 5,984,330 | A * | 11/1999 | Hasshi | B60G 15/07 |
| | | | | 280/86.751 |
| 7,490,840 | B2 * | 2/2009 | Luttinen | B60G 3/06 |
| | | | | 280/124.126 |
| 11,577,783 | B2 * | 2/2023 | Lee | B62D 17/00 |
| 11,851,103 | B2 * | 12/2023 | Lee | B62D 7/18 |
| 11,872,889 | B2 * | 1/2024 | Choi | B60K 7/0007 |
| 12,059,939 | B2 * | 8/2024 | Lee | B60G 3/26 |
| 2006/0290088 | A1 * | 12/2006 | Luttinen | B60G 3/265 |
| | | | | 280/124.145 |
| 2020/0198425 | A1 * | 6/2020 | Verbrugge | B60G 3/20 |
| 2020/0207405 | A1 | 7/2020 | Kuribayashi | |
| 2021/0008939 | A1 * | 1/2021 | Schmidt | B62D 7/146 |
| 2022/0041212 | A1 | 2/2022 | Moon et al. | |
| 2022/0153348 | A1 * | 5/2022 | Lee | B60G 7/02 |
| 2022/0203823 | A1 * | 6/2022 | Choi | F16F 9/3235 |
| 2023/0143749 | A1 * | 5/2023 | Lee | B62D 17/00 |
| | | | | 280/5.521 |
| 2023/0159086 | A1 * | 5/2023 | Lee | B62D 5/0418 |
| | | | | 180/413 |
| 2023/0219389 | A1 * | 7/2023 | Lee | B60G 3/26 |
| | | | | 280/124.128 |
| 2023/0234438 | A1 * | 7/2023 | Lee | B60G 3/20 |
| | | | | 180/6.48 |
| 2023/0302860 | A1 * | 9/2023 | Jeon | B62D 5/0418 |
| 2023/0347974 | A1 * | 11/2023 | Min | B62D 5/0418 |
| 2023/0391154 | A1 * | 12/2023 | Choi | B60K 7/0007 |
| 2023/0391181 | A1 * | 12/2023 | Min | B60G 3/00 |
| 2023/0391392 | A1 * | 12/2023 | Choi | B62D 5/0418 |

FOREIGN PATENT DOCUMENTS

| | | | | | |
|---|---|---|---|---|---|
| FR | 2668983 | A1 * | 5/1992 | | B60G 15/06 |
| GB | 2246329 | A * | 1/1992 | | B60G 3/26 |
| GB | 2513837 | A * | 11/2014 | | B60G 21/007 |
| JP | 2020-104696 | A | 7/2020 | | |
| KR | 10-2017-0119240 | A | 10/2017 | | |
| KR | 10-2019-0041855 | A | 4/2019 | | |
| KR | 10-2022-0017237 | A | 2/2022 | | |

OTHER PUBLICATIONS

Extended European search report issued on Jul. 6, 2023, in counterpart European Patent Application No. 22191111.8 (8 pages in English).

Korean Office Action issued on Feb. 22, 2024, in counterpart Korean Patent Application No. 10-2022-0068232 (5 pages in Korean).

* cited by examiner 1200A,1200B

CORNER MODULE APPARATUS FOR VEHICLE

CROSS-REFERENCE TO RELATED APPLICATION

This application claims the benefit under 35 USC § 119(a) of Korean Patent Application No. 10-2022-0068232, filed on Jun. 3, 2022, in the Korean Intellectual Property Office, the entire disclosure of which is incorporated herein by reference for all purposes.

BACKGROUND

1. Field

The present disclosure relates to a corner module apparatus for a vehicle in which driving, braking, steering, and suspension systems are integrated.

2. Description of Related Art

In general, an electric vehicle refers to an eco-friendly vehicle devoid of the discharge of exhaust gas. A high-voltage battery for supplying energy for driving, a motor for driving for generating rotatory power from power outputted by the high-voltage battery, etc. are mounted on the electric vehicle. The electric vehicle is driven by the rotation power of the motor being delivered to wheels through a driving shaft.

Recently, in-wheel motor vehicles in which a motor is directly installed inside a wheel so that power of the motor is directly delivered to the wheel have been in the spotlight because a power transfer unit of an intermediate stage, such as a decelerator or a differential gear, has been omitted. These developments take into consideration advantages in which weight of the vehicle can be reduced and an energy loss in a power transfer process can be reduced. Additionally, a wheel in which braking, steering, and suspension systems are integrated in addition to a driving system is also being actively developed.

The background technology of the present disclosure is disclosed in Korean Patent Application Publication No. 10-2019-0041855 published on Apr. 23, 2019, by the Korean Intellectual Property Office, and entitled "STEERING SYSTEM FOR IN-WHEEL MOTOR VEHICLE", the entire disclosure of which is incorporated herein by reference for all purposes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a corner module apparatus for a vehicle. The corner module apparatus includes a driving unit configured to provide drive power to a wheel of the vehicle, a braking unit configured to interfere with rotation of the wheel to generate braking power, a suspension unit, connected to the driving unit, configured to absorb shock transferred from a road surface to the wheel, and a steering unit, connected to the suspension unit, configured to be rotated about a steering axis inclined with respect to the wheel, and to adjust a steering angle of the wheel.

The steering unit may include a steering main body connected to the suspension unit, one side of the steering main body being supported on a frame module in a manner that is rotatable about the steering axis, a steering driving unit, connected to the steering main body, configured to rotate the steering main body relative to the frame module.

The steering axis may be disposed inclined to a predetermined angle from the wheel toward the inside in a width direction of the vehicle.

The driving unit may include an in-wheel motor, disposed inside the wheel, configured to generate rotatory power to rotate the wheel, and a knuckle, coupled to the in-wheel motor, configured to support the braking unit and the suspension unit.

The suspension unit may include a suspension arm, both sides thereof being rotatably connected to the steering main body and the knuckle, and a shock absorber module, disposed between the suspension arm and the steering main body and provided in a manner that is expandable and contractable in a length direction thereof.

The suspension arm may include a first arm extending along a width direction of the vehicle, and a second arm extending along the width direction of the vehicle and spaced a distance, in an upward-downward direction, away from the first arm.

The shock absorber modules may be provided in one pair and may be disposed on both sides, respectively, of the steering main body.

The shock absorber module may include a cylinder connected to the suspension arm, a rod slidably installed in the cylinder and connected to the steering main body, and an elastic body provided between the cylinder and the rod and configured to elastically support the rod with respect to the cylinder.

A lower end portion of the cylinder may be rotatably coupled to the second arm.

Both end portions of the elastic body may be coupled to a lower sheet fixed to the cylinder and an upper sheet fixed to the rod, respectively.

The corner module apparatus may further include a support unit, extending from the frame module, configured to support the other side of the steering main body.

The support unit may include a support body, disposed in a manner that faces the other side of the steering main body, a first joint, coupled to one side of the support body and connected to the frame module, and a second joint, coupled to the other side of the support body and connected to the other side of the steering main body.

The first joint may be a rubber bush.

The second joint may be a ball joint.

Other features and aspects will be apparent from the following detailed description, the drawings, and the claims.

BRIEF DESCRIPTION OF THE DRAWINGS

FIGS. 65 to 67 are exemplary diagrams illustrating the state in which wheels have been aligned according to a direction angle in the second application (the braking mechanism through individual steering) a corner module apparatus for a vehicle according to an embodiment of the present disclosure.

Figure 1:
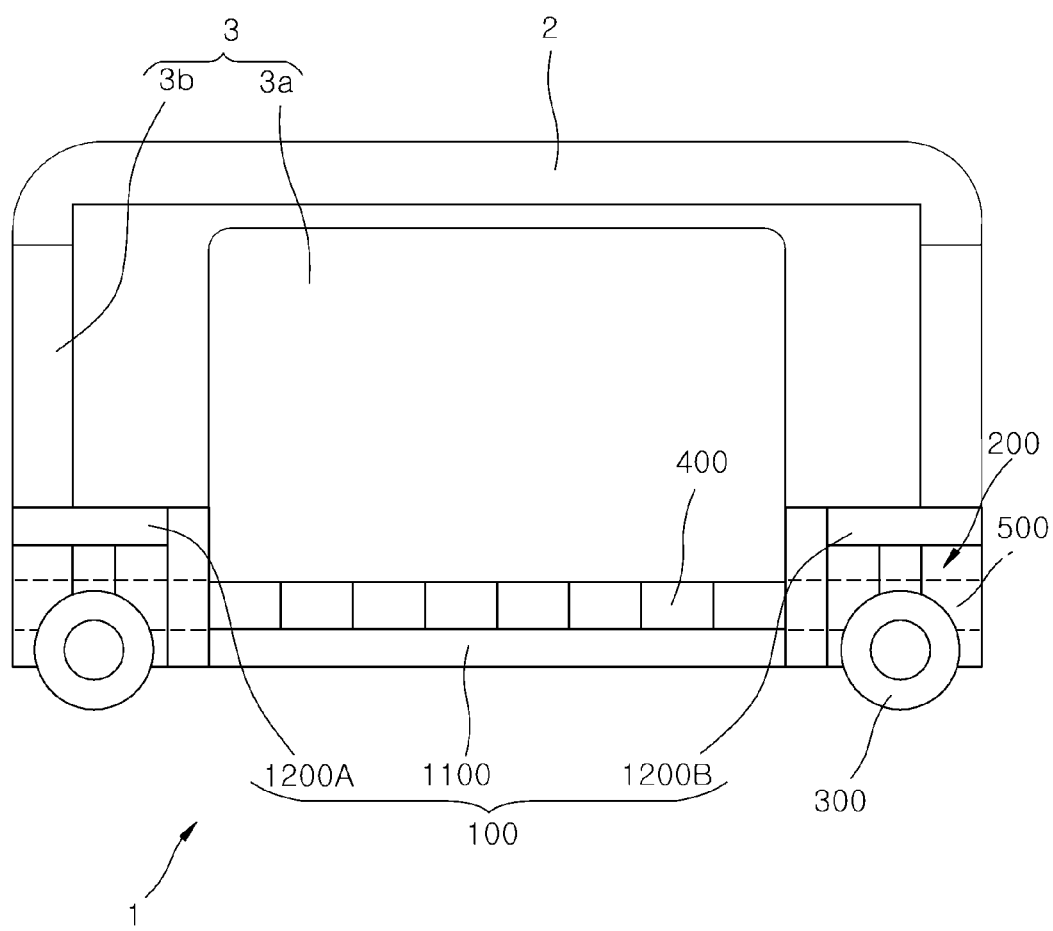
FIG. 1 is a front view schematically illustrating a configuration of a vehicle including a corner module apparatus for a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

1. Structure of Vehicle Including Corner Module Apparatus for Vehicle

Figure 2:
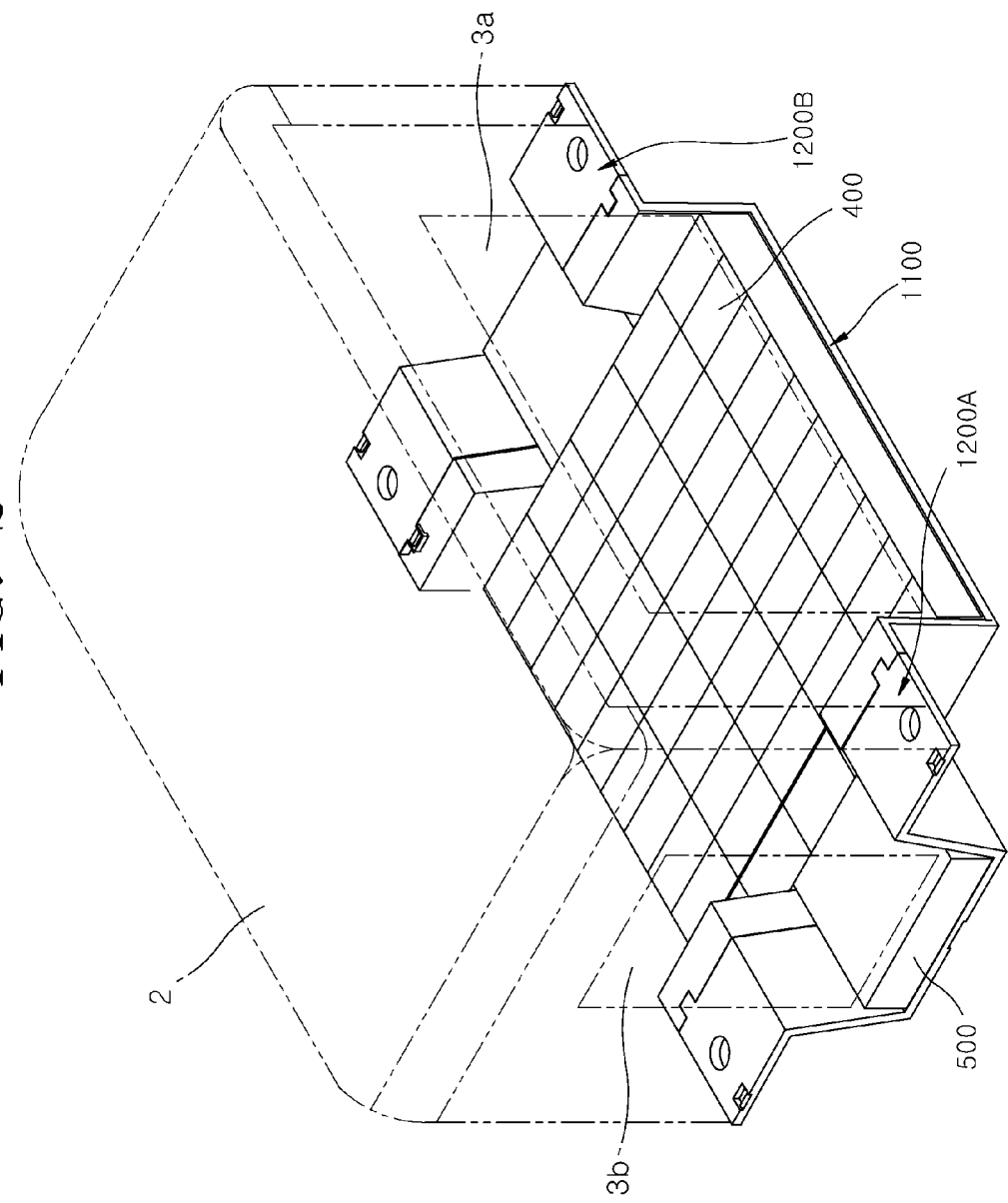
FIG. 2 is a perspective view schematically illustrating a configuration of a vehicle including a corner module apparatus for a vehicle according to an embodiment of the present disclosure.

FIG. 1 is a front view schematically illustrating a configuration of a vehicle including a corner module apparatus for a vehicle according to an embodiment of the present disclosure. FIG. 2 is a perspective view schematically illustrating a configuration of a vehicle including a corner module apparatus for a vehicle according to an embodiment of the present disclosure.

Referring to FIGS. 1 and 2, the vehicle including a corner module apparatus for a vehicle according to an embodiment of the present disclosure includes a corner module apparatus 1 for a vehicle, a top hat 2, and a door part 3.

The corner module apparatus 1 for a vehicle according to an embodiment of the present disclosure includes a frame module 100 and a corner module 200.

The frame module 100 is installed on the lower side of a vehicle body, and generally supports the corner module 200, a battery 400, and an inverter 500.

Referring to FIG. 2, the frame module 100 according to the present embodiment includes a main platform 1100, a first corner module platform 1200A, and a second corner module platform 1200B.

The main platform 1100 is installed on the lower side of the vehicle body. The battery 400 for supplying a power source to the corner module 200 described later is mounted within the main platform 1100. The main platform 1100 may have a highly rigid material, such as metal, so that main platform can sufficiently withstand weight applied from the battery 400. The battery 400 is formed to have a lower height than the main platform 1100.

Figure 3:
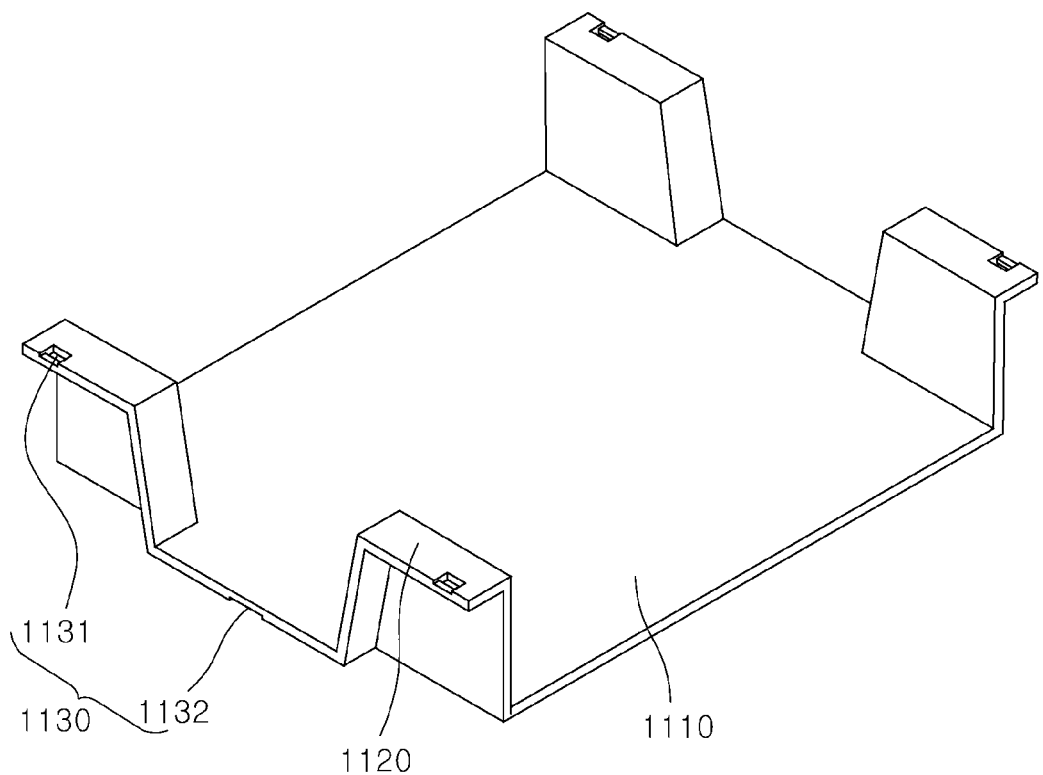
FIG. 3 is a perspective view schematically illustrating a configuration of a main platform according to an embodiment of the present disclosure.

FIG. 3 is a perspective view schematically illustrating a configuration of the main platform 1100 according to an embodiment of the present disclosure.

Referring to FIG. 3, the main platform 1100 according to the present embodiment includes a main plate 1110, a main wheel housing 1120, and a main fastening part 1130.

The main plate 1110 forms an external appearance of a central part of the main platform 1100, and generally supports the main wheel housing 1120 described later. The main plate 1110 according to an embodiment of the present disclosure may be formed to have a form of a flat plate that is disposed in parallel the ground. The battery 400 is seated on the top of the main plate 1110, and the inverter 500 may be seated thereon, if necessary. The design of the area of the main plate 1110 may be variously changed depending on the size of the vehicle body, the size of the battery 400, etc.

The main wheel housing 1120 extends from the main plate 1110, and provides a space in which the corner module 200 is accommodated. The main wheel housing 1120 according to the present embodiment may be formed to have a form of a pillar that is perpendicularly upward extended from the top of the main plate 1110. More specifically, the main wheel housing 1120 is disposed on the corner side of the main plate 1110, and is formed to have an outside surface thereof opened. For example, the main wheel housing 1120 may be extended to the top of the corner of the main plate 1110 with a cross-sectional form of an approximately "," form as illustrated in FIG. 3. Accordingly, the main wheel housing 1120 may provide a space in which the corner module 200 is accommodated.

The top of the main wheel housing 1120 is formed to have a form of a flat plate that is disposed in parallel to the main plate 1110. Accordingly, the main wheel housing 1120 may provide a space in which the main fastening part 1130 described later may be formed on the top of the main wheel housing 1120.

The main wheel housing 1120 may be provided in plural. The plurality of main wheel housings 1120 may be disposed on the plurality of corner sides of the main plate 1110, respectively.

The main fastening part 1130 is provided in the main plate 1110 and the main wheel housing 1120, and is fastened to the first corner module platform 1200A and the second corner module platform 1200B described later.

Figure 4:
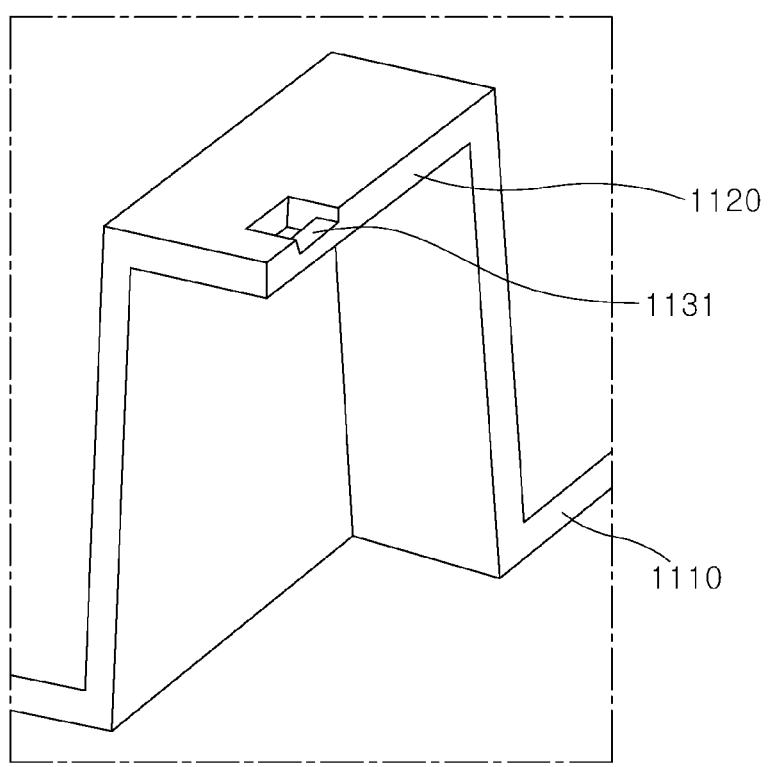
FIGS. 4 and 5 are enlarged views schematically illustrating configurations of a main fastening part according to an embodiment of the present disclosure.
Figure 5:
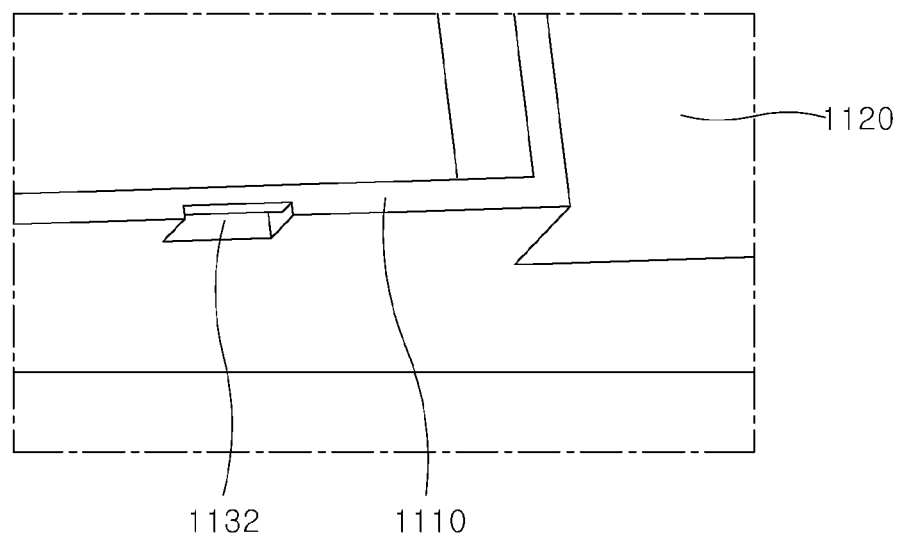

FIGS. 4 and 5 are enlarged views schematically illustrating configurations of the main fastening part according to an embodiment of the present disclosure.

Referring to FIGS. 3 to 5, the main fastening part 1130 according to the present embodiment includes an upper main fastening part 1131 and a lower main fastening part 1132.

The upper main fastening part 1131 according to the present embodiment may be formed to have a form of a groove that is concavely recessed and formed from an outside surface of the main wheel housing 1120. The upper main fastening part 1131 is perpendicularly downward extended from the top of the main wheel housing 1120. The upper main fastening part 1131 may have a cross-sectional form having a step form so that the upper main fastening part 1131 is locked and coupled with a first corner module upper-fastening part 1231A and a second corner module upper-fastening part 1231B described later. The upper main fastening part 1131 is disposed at the end of the main wheel housing 1120 disposed to face the first corner module platform 1200A and the second corner module platform 1200B described later. The upper main fastening part 1131 may be provided in plural, and may be individually provided in the main wheel housings 1120, respectively.

The lower main fastening part 1132 according to the present embodiment may be formed to have a form of a groove that is concavely recessed and formed from the outside surface of the main plate 1110. The lower main fastening part 1132 may have a cross-sectional form having a step form so that lower main fastening part 1132 is locked and coupled with a first corner module lower-fastening part 1232A and a second corner module lower-fastening part 1232B described later.

The lower main fastening part 1132 is extended in a direction opposite to a direction of the upper main fastening part 1131. More specifically, the lower main fastening part 1132 is perpendicularly upward extended from the lower side of the main plate 1110. Accordingly, when being fastened to a first corner module fastening part 1230A and a second corner module fastening part 1230B described later, the upper main fastening part 1131 and the lower main fastening part 1132 can prevent the first corner module fastening part 1230A and the second corner module fastening part 1230B from deviating in any one direction.

The lower main fastening part 1132 is provided in pair, and is disposed at the ends of the main plate 1110 disposed to face the first corner module platform 1200A and the second corner module platform 1200B described later, respectively.

The first corner module platform 1200A and the second corner module platform 1200B are detachably coupled to both sides of the main platform 1100, respectively. The first corner module platform 1200A and the second corner module platform 1200B have the corner modules 200 described later coupled to lower sides thereof, respectively, and support the corner modules 200. The corner module 200 and the inverter 500 that converts DC power supplied from the battery 400 into AC power and transmits the AC power to the corner module 200 are mounted within each of the first corner module platform 1200A and the second corner module platform 1200B. The inverter 500 is formed to have a lower height than the first corner module platform 1200A and the second corner module platform 1200B. The first corner module platform 1200A and the second corner module platform 1200B may have a highly rigid material, such as metal, so that the first corner module platform 1200A and the second corner module platform 1200B can sufficiently withstand weight applied from the corner module 200 and the battery 400.

Figure 6:
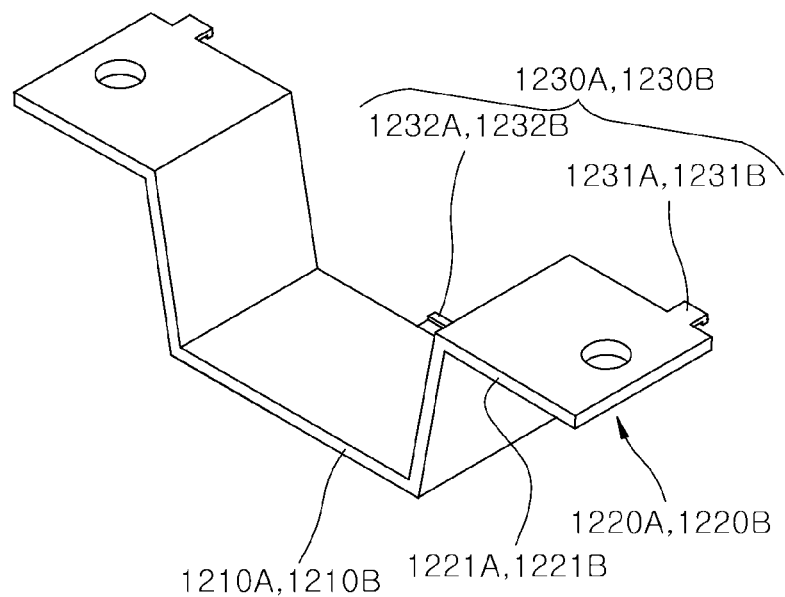
FIG. 6 is a perspective view schematically illustrating a configuration of a first corner module platform and a second corner module platform according to an embodiment of the present disclosure.

FIG. 6 is a perspective view schematically illustrating a configuration of the first corner module platform and the second corner module platform according to an embodiment of the present disclosure.

Referring to FIG. 6, the first corner module platform 1200A according to the present embodiment includes a first corner module plate 1210A, a first corner module wheel housing 1220A, and the first corner module fastening part 1230A.

The first corner module plate 1210A forms an external appearance of a central part of the first corner module platform 1200A, and generally supports the first corner module wheel housing 1220A described later. The first corner module plate 1210A according to the present embodiment may be formed to have a form of a flat plate that is disposed in parallel to the ground. The inverter 500 is seated on the top of the first corner module plate 1210A, and the battery 400 may be seated thereon, if necessary. The design of the area of the first corner module plate 1210A may be variously changed the size of the main plate 1110, the size of the inverter 500, etc.

The first corner module wheel housing 1220A extends from the first corner module plate 1210A and provides a space in which the corner module 200 is accommodated. The first corner module wheel housing 1220A according to the present embodiment may be formed to have a form of a plate that extends upward from the top of the main plate 1110. The first corner module wheel housing 1220A may be provided in pair, and may be disposed at the ends of the first corner module plate 1210A in a width direction thereof, respectively.

The first corner module wheel housing 1220A is provided with a first mounting plate 1221A that supports the corner module 200. The first mounting plate 1221A may be formed to have a form of a flat plate that extends in the width direction of the first corner module plate 1210A from the top of the first corner module wheel housing 1220A. The first mounting plate 1221A is disposed in parallel to the first corner module plate 1210A. The lower side of the first mounting plate 1221A is detachably coupled to the corner module 200 by bolting coupling, etc.

In this case, the first corner module wheel housing 1220A may be extended to the outside of the first corner module plate 1210A in the width direction thereof with a cross-sectional form having an approximately "," form as illustrated in FIG. 6. Accordingly, the first corner module wheel housing 1220A may provide a space in which the corner module 200 is accommodated.

The first corner module fastening part 1230A is provided in the first corner module plate 1210A and the first corner module wheel housing 1220A, and is fastened to the main fastening part 1130 disposed on one side of the main platform 1100. When the main platform 1100 and the first corner module platform 1200A are assembled, the first corner module fastening part 1230A is disposed at a location that faces the main fastening part 1130 disposed on the one side of the main platform 1100. The first corner module fastening part 1230A is locked and coupled with the main fastening part 1130 disposed on the one side of the main platform 1100 as the first corner module platform 1200A mutually comes into contact with the main platform 1100 in a direction parallel to the length direction of a vehicle. Accordingly, the main fastening part 1130 and the first corner module fastening part 1230A can improve assembly performance of the main platform 1100 and the first corner module platform 1200A.

Figure 7:
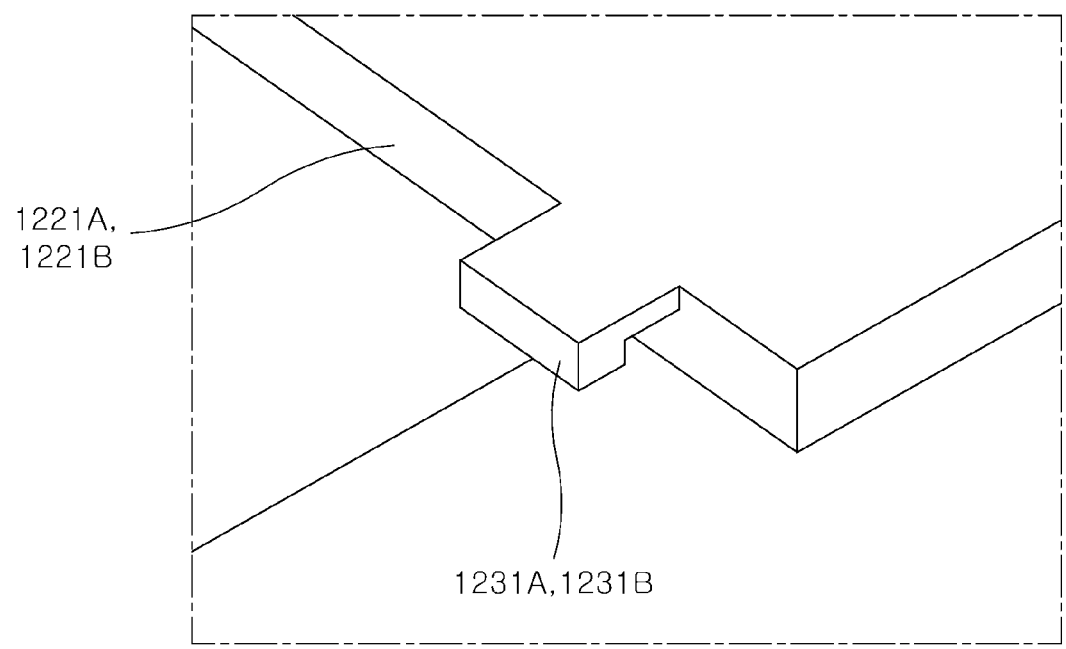
FIGS. 7 and 8 are enlarged views schematically illustrating configurations of a first corner module fastening part and a second corner module fastening part according to an embodiment of the present disclosure.
Figure 8:
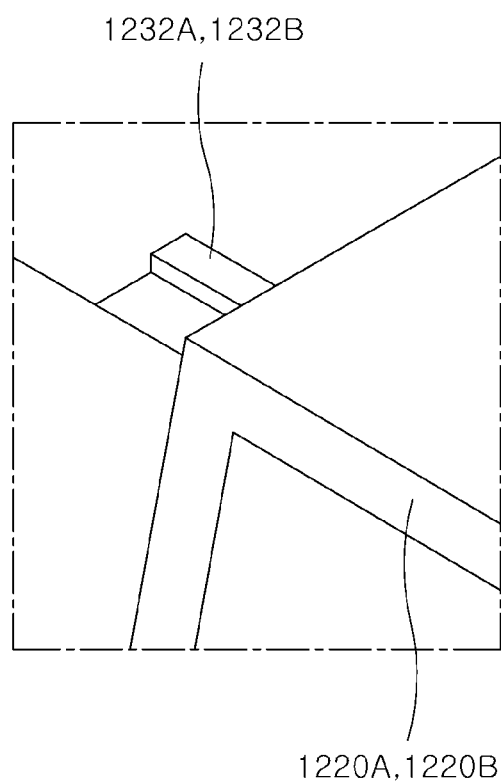

FIGS. 7 and 8 are enlarged views schematically illustrating configurations of the first corner module fastening part and the second corner module fastening part according to an embodiment of the present disclosure.

Referring to FIGS. 6 to 8, the first corner module fastening part 1230A according to an embodiment of the present disclosure includes the first corner module upper-fastening part 1231A and the first corner module lower-fastening part 1232A.

The first corner module upper-fastening part 1231A according to the present embodiment may be formed to have a form of a protrusion that protrudes from the outside surface of the first corner module wheel housing 1220A. More specifically, the first corner module upper-fastening part 1231A is transversely extended from the end of the front or rear of the first mounting plate 1221A, more specifically, an end disposed to face the end of the main platform 1100 on one side thereof. The first corner module upper-fastening part 1231A is inserted into the upper main fastening part 1131 disposed on the one side of the main platform 1100 as the first corner module platform 1200A comes into contact with the main platform 1100 in the direction parallel to the length direction of the vehicle. In this case, the first corner module upper-fastening part 1231A may have a shape having an end bent in a hook form so that the first corner module upper-fastening part 1231A is locked and coupled with the upper main fastening part 1131 disposed on the one side of the main platform 1100. The first corner module upper-fastening part 1231A may be provided in plural, and may be individually provided in the first corner module wheel housings 1220A, respectively.

The first corner module lower-fastening part 1232A according to the present embodiment may be formed to have a form of a protrusion that protrudes from the outside surface of the first corner module plate 1210A. More specifically, the first corner module lower-fastening part 1232A is transversely extended from any one end of the front or rear of the first corner module plate 1210A, more specifically, an end disposed to face the end of the main platform 1100 on the one side thereof. The first corner module lower-fastening part 1232A is inserted into the lower main fastening part 1132 disposed on the one side of the main platform 1100 as the first corner module platform 1200A comes into contact with the main platform 1100 in the direction parallel to the length direction of the vehicle.

The first corner module lower-fastening part 1232A may have a shape having an end bent in a hook form so that the first corner module lower-fastening part 1232A is locked and coupled with the lower main fastening part 1132. In this case, the end of the first corner module lower-fastening part 1232A is bent in a direction opposite to a direction of the end of the first corner module upper-fastening part 1231A. For example, the end of the first corner module upper-fastening part 1231A may be downward bent, and the end of the first corner module lower-fastening part 1232A may be upward bent. Accordingly, when being fastened to the main fastening part 1130, the first corner module upper-fastening part 1231A and the first corner module lower-fastening part 1232A can prevent the upper main fastening part 1131 and the lower main fastening part 1132 from deviating in any direction thereof.

The second corner module platform 1200B includes a second corner module plate 1210B, a second corner module wheel housing 1220B, and the second corner module fastening part 1230B.

Detailed shapes of the second corner module plate 1210B and the second corner module wheel housing 1220B may be formed to have the same forms as the above-mentioned first corner module plate 1210A and the second corner module wheel housing 1220A, respectively.

The second corner module fastening part 1230B is provided in the second corner module plate 1210B and the second corner module wheel housing 1220B, and is fastened to the main fastening part 1130 disposed on the other side of the main platform 1100. When the main platform 1100 and the second corner module platform 1200B are assembled, the second corner module fastening part 1230B is disposed at a location that faces the main fastening part 1130 disposed on the other side of the main platform 1100. The second corner module fastening part 1230B is locked and coupled with the main fastening part 1130 disposed on the other side of the main platform 1100 as the second corner module platform 1200B comes into contact with the main platform 1100 in the direction parallel to the length direction of the vehicle.

The second corner module fastening part 1230B according to the present embodiment includes the second corner module upper-fastening part 1231B and the second corner module lower-fastening part 1232B.

The second corner module upper-fastening part 1231B according to the present embodiment may be formed to have a form of a protrusion that protrudes an outside surface of the second corner module wheel housing 1220B. More specifically, the second corner module upper-fastening part 1231B is transversely extended from the end of the front or rear of a second mounting plate 1221B, more specifically, an end disposed to face the end of the main platform 1100 on the other side thereof. The second corner module upper-fastening part 1231B is inserted into the upper main fastening part 1131 disposed on the one side of the main platform 1100 as the second corner module platform 1200B comes into contact with the main platform 1100 in the direction parallel to the length direction of the vehicle. In this case, the second corner module upper-fastening part 1231B may have a shape having an end bent in a hook form so that the second corner module upper-fastening part 1231B is locked and coupled with the upper main fastening part 1131 disposed on the one side of the main platform 1100. The second corner module upper-fastening part 1231B may be provided in plural, and may be individually provided in the second corner module wheel housings 1220B, respectively.

The second corner module lower-fastening part 1232B according to the present embodiment may be formed to have a form of a protrusion that protrudes an outside surface of the first corner module plate 1210B. More specifically, the second corner module lower-fastening part 1232B is transversely extended from any one end of the front and rear of the second corner module plate 1210B, more specifically, an end disposed to face the end of the main platform 1100 on the other side thereof. The second corner module lower-fastening part 1232B is inserted into the lower main fastening part 1132 disposed on the other side of the main platform 1100 as the first corner module platform 1200B comes into contact with the main platform 1100 in the direction parallel to the length direction of the vehicle.

The second corner module lower-fastening part 1232B may have a shape having an end bent in a hook form so that the second corner module lower-fastening part 1232B is locked and coupled with the lower main fastening part 1132. In this case, the end of the second corner module lower-fastening part 1232B is bent in a direction opposite to that of the end of the second corner module upper-fastening part 1231B. For example, the end of the second corner module upper-fastening part 1231B may be downward bent, and the end of the second corner module lower-fastening part 1232B may be upward bent. Accordingly, when being fastened to the main fastening part 1130, the second corner module upper-fastening part 1231B and the second corner module lower-fastening part 1232B can prevent the upper main fastening part 1131 and the lower main fastening part 1132 from deviating in any one direction.

The corner module 200 is supported by the frame module 100 and connected to a wheel of the vehicle 300, and generally performs an operation, such as driving, braking, steering, or suspension. The corner module 200 may be provided in plural, and may be individually connected to each of the wheels 300. Each of the plurality of corner modules 200 may independently perform an operation, such as driving, braking, steering, or suspension, on each of the wheels 300. A detailed embodiment of the corner module 200 is described later.

The top hat 2 is mounted on the top of the corner module apparatus 1 for the vehicle. A boarding space for a passenger is provided within the top hat 2.

Referring to FIGS. 1 and 2, the top hat 2 according to the present embodiment may be formed to have a form of a box whose interior is empted and bottom is opened. Various articles and devices suitable for a purpose of a passenger, such as a seat, a manipulation panel, and a table, may be installed within the top hat 2. The opened bottom of the top hat 2 is disposed to face the top of the frame module 100, that is, the top of the main platform 1100, the first corner module platform 1200A, and the second corner module platform 1200B. The bottom of the top hat 2 may be coupled to the top of the main wheel housing 1120, the first corner module wheel housing 1220A, and the second corner module wheel housing 1220B through bolting, and may be detachably fixed to the frame module 100. The design of the area and length of the top hat 2 may be variously changed depending on the area, length, etc. of the frame module 100.

The door part 3 is installed in the top hat 2 in a way to be opened and closed, and enables a passenger to get in the top hat 2 when opened.

The door part 3 according to the present embodiment includes a first door 3a and a second door 3b.

The first door 3a is installed on one side of the top hat 2 in a way to be opened and closed, and is disposed on the top of the main platform 1100. Referring to FIGS. 1 and 2, the first door 3a according to the present embodiment is installed on the side of the top hat 2 in a width direction thereof in a way to be opened and closed. The first door 3a may be installed on the top hat 2 in a way to be opened and closed by using various methods, such as an open and close method and a sliding method. The first door 3a may be provided in pair, and may be installed on both sides of the top hat 2, respectively, in the width direction thereof in a way to be opened and closed. Both ends of the first door 3a are disposed between the pair of main wheel housings 1120 spaced apart from each other in the length direction of the main plate 1110. The bottom of the first door 3a is disposed to face the top of the battery 400 seated on the top of the main plate 1110. As the battery 400 is formed to have a lower height than the main platform 1100, the bottom of the first door 3a may be disposed close to the ground, thereby inducing smooth boarding of a passenger.

The second door 3b is installed on the other side of the top hat 2 in a way to be opened and closed, and is disposed on the top of at least one of the first corner module platform 1200A and the second corner module platform 1200B. Hereinafter, an example in which the second door 3b is disposed on both the tops of the first corner module platform 1200A and the second corner module platform 1200B will be described, but the second door 3b is not limited to the example. It is also possible for the second door 3b to be disposed on the top of any one of the first corner module platform 1200A and the second corner module platform 1200B.

Referring to FIGS. 1 and 2, the second door 3b according to the present embodiment is provided in pair, and is installed on the sides of the top hat 2 in forward and backward directions in a way to be opened and closed. Accordingly, the second door 3b may be disposed in a direction perpendicular to the first door 3a. The second door 3b may be installed in the top hat 2 in a way to be opened and closed by using various methods, such as an open and close method and a sliding method. Both ends of each of the pair of second doors 3b is disposed between the pair of first corner module wheel housing 1220A and second corner module wheel housing 1220B. The bottom of each of the pair of second doors 3b is disposed to face the top of the inverter 500 seated on the top of each of the first corner module plate 1210A and the second corner module plate 1210B. As the inverter 500 is formed to have a lower height than the first corner module platform 1200A and the second corner module platform 1200B, the bottom of the second door 3b may be disposed close to the ground, thereby inducing smooth boarding of a passenger.

Figure 9:
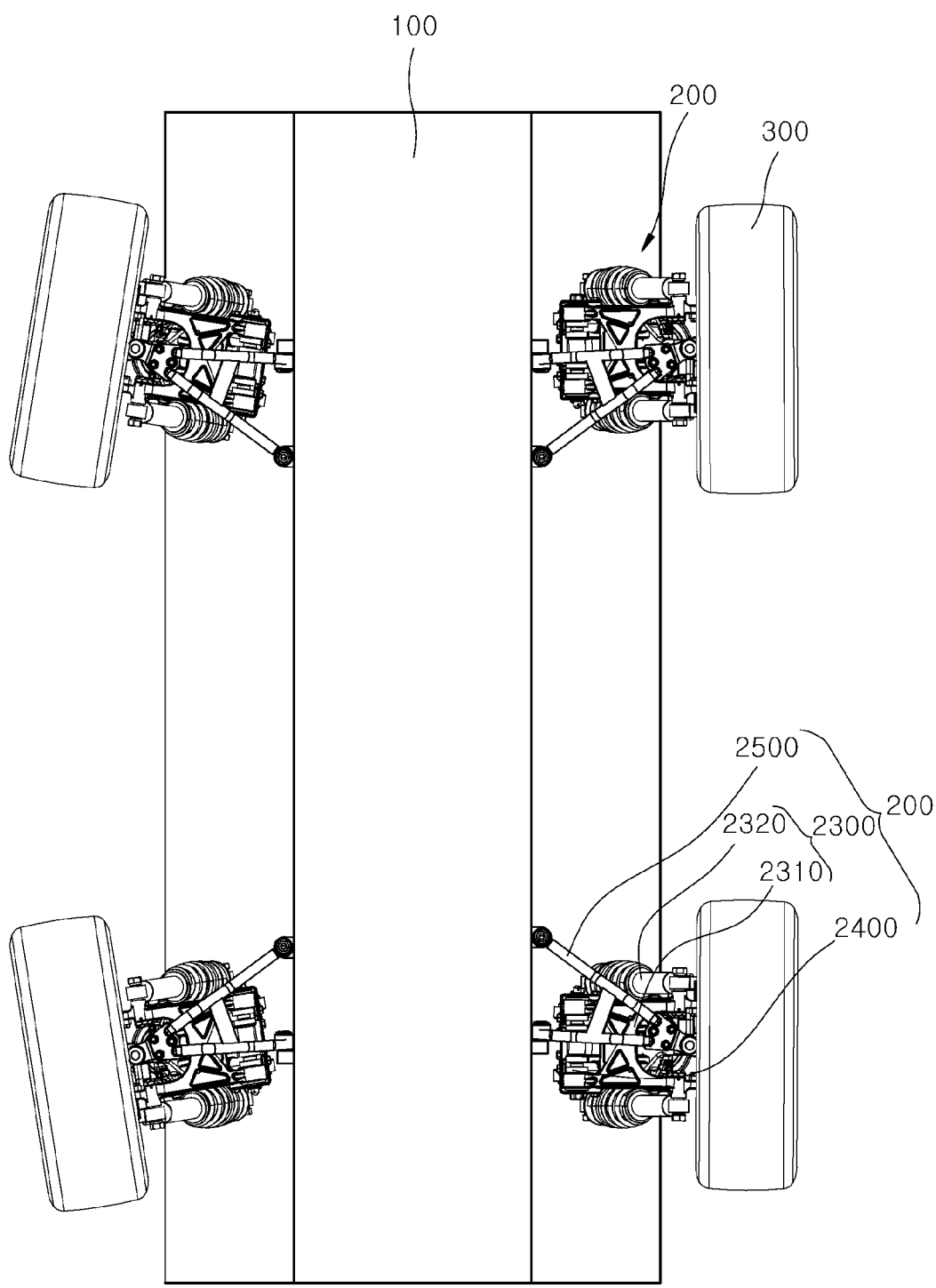
FIG. 9 is a view schematically illustrating an installed state of a corner module according to a first embodiment of the present disclosure.
Figure 10:
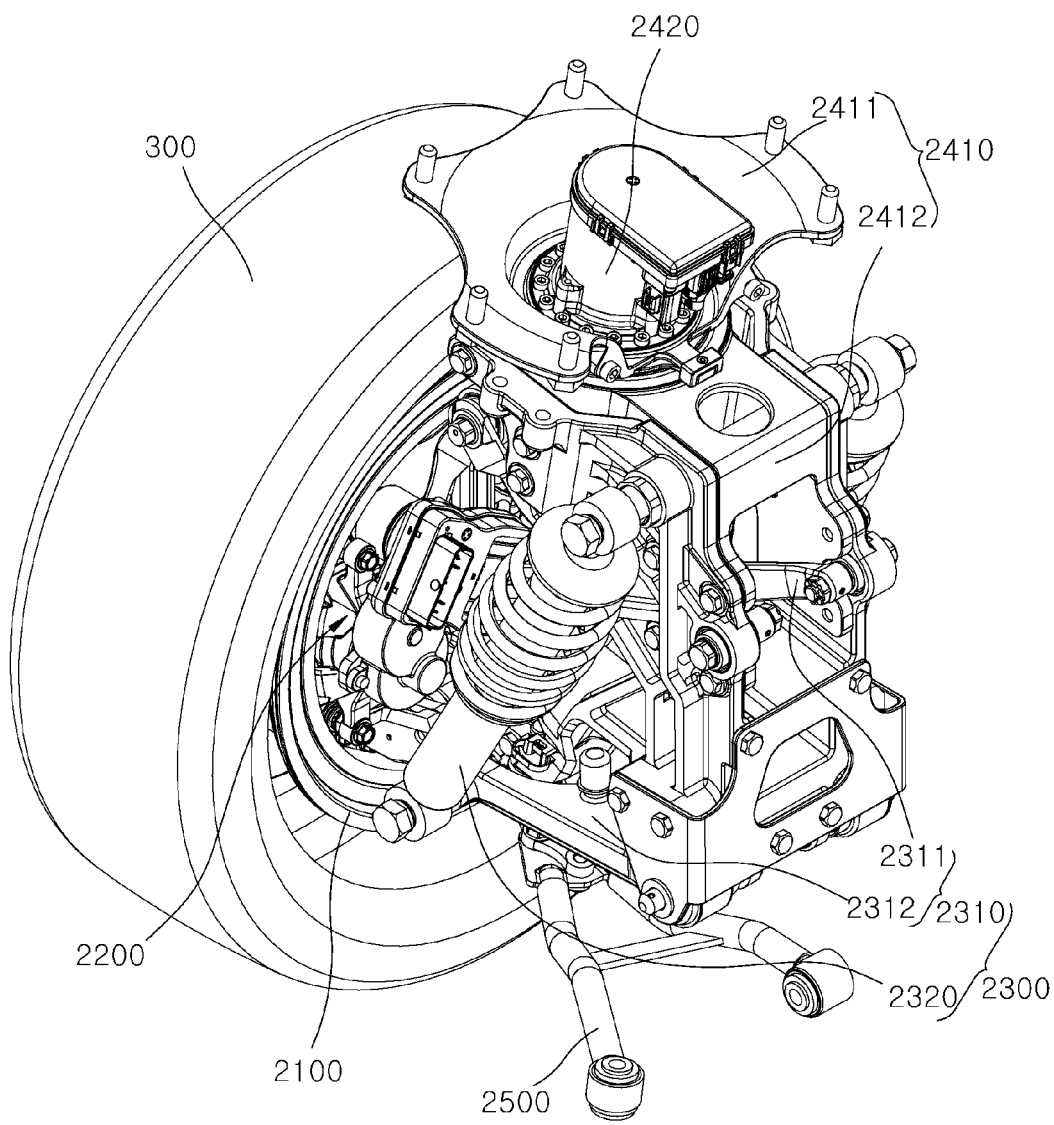
FIG. 10 is a perspective view schematically illustrating a configuration of the corner module according to the first embodiment of the present disclosure.
Figure 11:
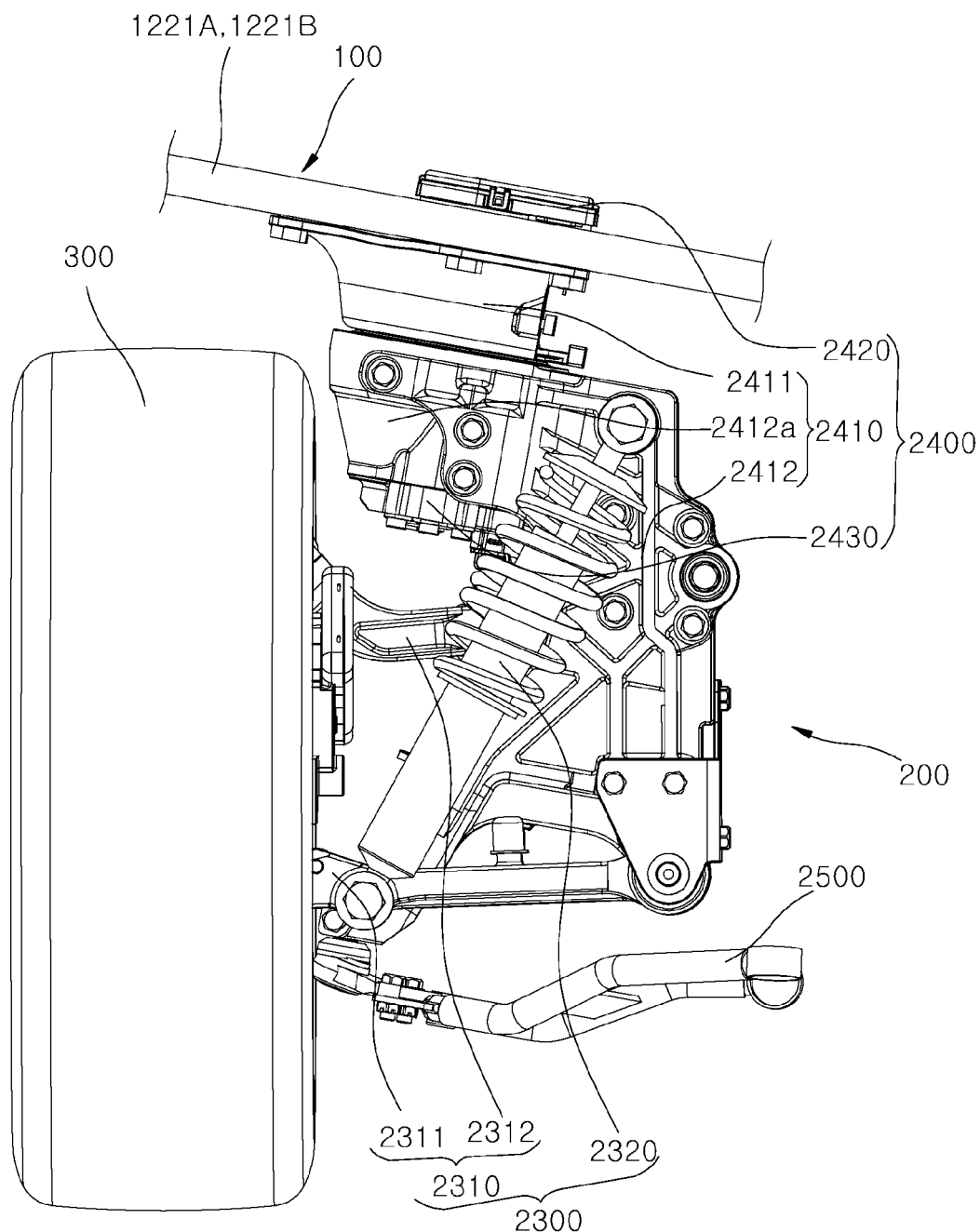
FIG. 11 is a front view schematically illustrating the configuration of the corner module according to the first embodiment of the present disclosure.
Figure 12:
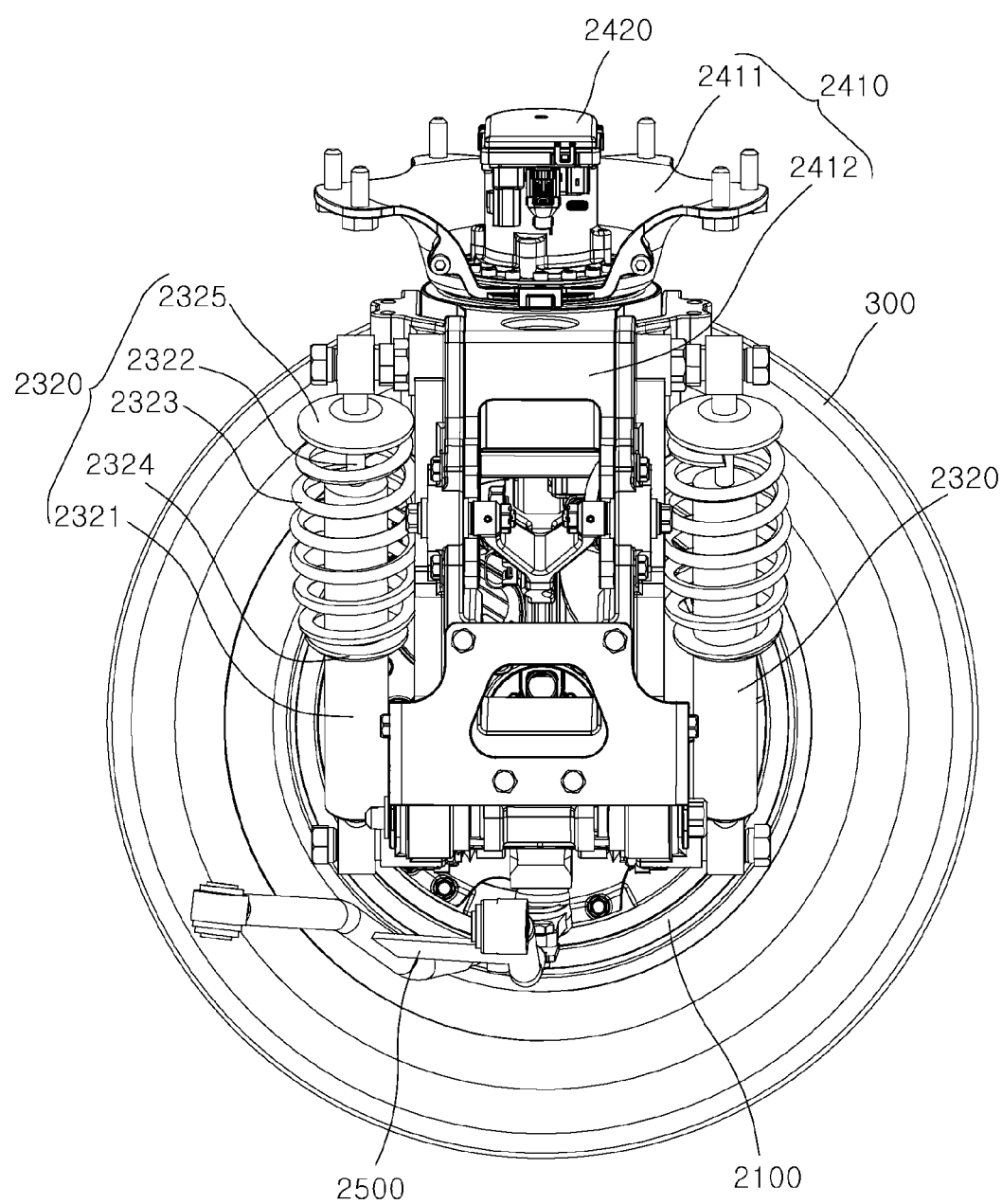
FIG. 12 is a side view schematically illustrating the configuration of the corner module according to the first embodiment of the present disclosure.
Figure 13:
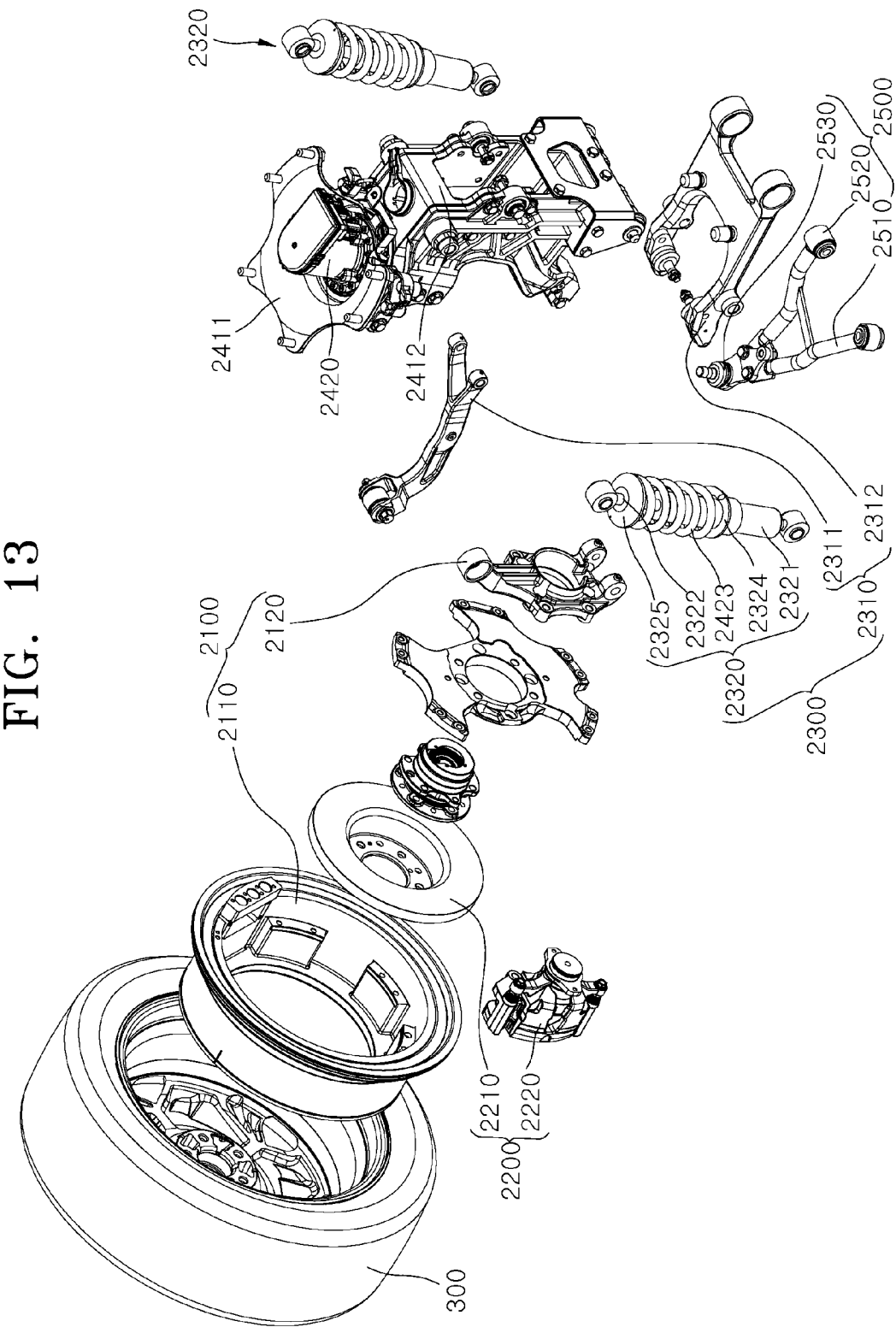
FIG. 13 is an exploded perspective view schematically illustrating the configuration of the corner module according to the first embodiment of the present disclosure.

FIG. 9 is a view schematically illustrating an installed state of the corner module 200 according to the first embodiment of the present disclosure. FIG. 10 is a perspective view schematically illustrating the configuration of the corner module 200 according to the first embodiment of the present disclosure. FIG. 11 is a front view schematically illustrating the configuration of the corner module 200 according to the first embodiment of the present disclosure. FIG. 12 is a side view schematically illustrating the configuration of the corner module 200 according to the first embodiment of the present disclosure. FIG. 13 is an exploded perspective view schematically illustrating the configuration of the corner module 200 according to the first embodiment of the present disclosure.

Referring to FIGS. 9 to 13, the corner module 200 according to the present embodiment includes a driving unit 2100, a braking unit 2200, a suspension unit 2300, a steering unit 2400, and a support unit 2500.

The driving unit 2100 provides drive power to a wheel 300 and thus rotates the wheel 300.

The driving unit 2100 according to the present embodiment includes an in-wheel motor 2110 and a knuckle 2120.

The in-wheel motor 2110 is installed on the inside of the wheel 300, generates rotatory power, and thus rotates the wheel 300. The in-wheel motor 2110 according to the present embodiment may be configured to include a stator and a rotor. The stator is fixed to the inside of the wheel 300, is provided with electric power from the battery 400 or the like, and thus forms a magnetic field. The rotor is rotatably installed the inside of the wheel 300 and is rotated by electromagnetic interaction with the stator, and thus rotates the wheel 300. The rotor may be integrally connected to the wheel 300 using a fastening method, such as bolting. The stator and the rotor may be disposed in such a manner that central axes thereof are positioned on the same line as a central shaft of the wheel 300 and may be disposed in such a manner as to be stacked concentrically on top of each other on the inside of the wheel 300.

The knuckle 2120 is coupled to the in-wheel motor 2110 and functions as a constituent element that mechanically supports the braking unit 2200 and the suspension unit 2300, which will be described later, with respect to the driving unit 2100. The knuckle 2120 according to the present embodiment may be coupled to the stator of the in-wheel motor 2110 using the fastening method, such as bolting, and thus may be supported thereon. The knuckle 2120 may rotatably support the rotor of the in-wheel motor 2110 with a wheel bearing or the like in between. The knuckle 2120 may be manufactured by casting a metal-series material into a mold to ensure sufficient rigidity. The knuckle 2120 is formed in such a manner that both end portions thereof extend in an upward-downward direction with respect to the central shaft of the wheel 300, that is, in a direction vertical to the ground. The knuckle 2120 is not specifically limited to a form illustrated in FIG. 13. It is possible that the knuckle 2120 is design-changed, within the technical idea of the present disclosure, to various forms in such a manner as to be coupled to the in-wheel motor 2110 and thus to possibly support the braking unit 2200 and the suspension unit 2300 that will be described later.

The braking unit 2200 applies braking power to a vehicle by interference with the rotation of the wheel 300 or no longer applies the braking power to the vehicle.

The braking unit 2200 according to the present embodiment includes a brake disc 2210 and a brake caliper 2220.

The brake disc 2210 is connected to the wheel 300 or the in-wheel motor 2110 and is rotated in conjunction with the rotation of the wheel 300. The brake disc 2210 according to the present embodiment is formed in such a manner as to have the form of a circular plate and is installed on the inside of the wheel 300. The brake disc 2210 is disposed in such a manner that the central axis thereof is positioned on the same line as the central shaft of the wheel 300. The brake disc 2210 may be integrally connected with the wheel 300 or the rotor of the in-wheel motor 2110 using the fastening method, such as bolting. Accordingly, when the wheel 300 is rotated, the brake disc 2210 may be rotated about the central axis thereof at the same angular speed as the wheel 300. It is possible that the brake disc 2210 is design-changed in such a manner that a diameter thereof varies widely with a diameter of the wheel 300, a size of the in-wheel motor 2110, or the like.

When depressing a brake pedal, the brake caliper 2220 presses against the brake disc 2210 and thus applies the braking power. The brake caliper 2220 according to the present embodiment may be configured to include a brake pad, a caliper housing, and a piston. The brake pad is disposed in a manner that faces the brake disc 2210. The caliper housing is coupled to the knuckle 2120 and supports the brake pad in a movable manner. The piston is installed on the caliper housing in a manner that is movable backward and forward, and, according to the moving direction of the piston, presses against the brake pad toward the brake disc 2210 or no longer presses against the brake pad.

The suspension unit 2300 is connected to the knuckle 2120 and, when the vehicle travels, absorbs shock transferred from a road surface.

The suspension unit 2300 according to the present embodiment includes a suspension arm 2310 and a shock absorber module 2320.

The suspension arm 2310 is rotatably connected to the knuckle 2120 and a steering main body 2410 described later, more specifically, to the knuckle 2120 and a second steering main body 2412, and thus supports the wheel 300. That is, the suspension arm 2310 connects the wheel 300 to a vehicle body with the steering main body 2410 in between. At the same time, while the vehicle travels, the suspension arm 2310 serves to absorb a load applied from the wheel 300 due to the rigidity of the suspension arm 2310 itself and to adjust a movement of the wheel 300.

The suspension arm 2310 according to the present embodiment may include a first arm 2311 and a second arm 2312.

The first arm 2311 and the second arm 2312 are disposed to extend in such a manner that length directions thereof are the same as a width direction of the vehicle, to be spaced a distance apart from each other in the upward-downward direction, and to face each other. The first arm 2311 and the second arm 2312 may be formed in such a manner as to have the form of a double wishbone or a link arm. Both end portions of the first arm 2311 are rotatably connected to an upper end portion of the knuckle 2120 and the inside of the second steering main body 2412, respectively, with a bush, a ball joint, or the like in between. Both end portions of the second arm 2312 are rotatably connected to a lower end portion of the knuckle 2120 and the inside of the second steering main body 2412, respectively, with a bush, a ball joint, or the like in between. The first arm 2311 and the second arm 2312 are not specifically limited to a form illustrated in FIG. 13. It is possible that the first arm 2311 and the second arm 2312 are design-changed, within the technical idea of the present disclosure, to various forms in such a manner as to be connected to the upper end portion and lower end portion, respectively, of the knuckle 2120 and thus to possibly support the wheel 300.

The shock absorber module 2320 is installed between the suspension arm 2310 and the steering main body 2410. The shock absorber module 2320 is provided in a manner that is expandable and contractable along a length direction thereof and absorbs shock or vibration transferred from the road surface through the wheel 300 to the suspension arm 2310. The shock absorber modules 2320 may be provided in one pair and may be disposed to be positioned on the steering main body 2410, more specifically, on both sides, respectively, of the second steering main body 2412 in a manner as to be spaced a predetermined distance apart from each other. Accordingly, the shock absorber module 2320 may be prevented from interfering with the suspension arm 2310 connected to the inside of the second steering main body 2412. The shock absorber modules 2320 in one pair distribute and absorb shock transferred to the suspension arm 2310 through the wheel 300. Accordingly, when compared with a case where one shock absorber module 2320 is formed, heights of the shock absorber modules 2320 in one pair may be reduced, and a low-floor corner module 200 may be realized.

Figure 14:
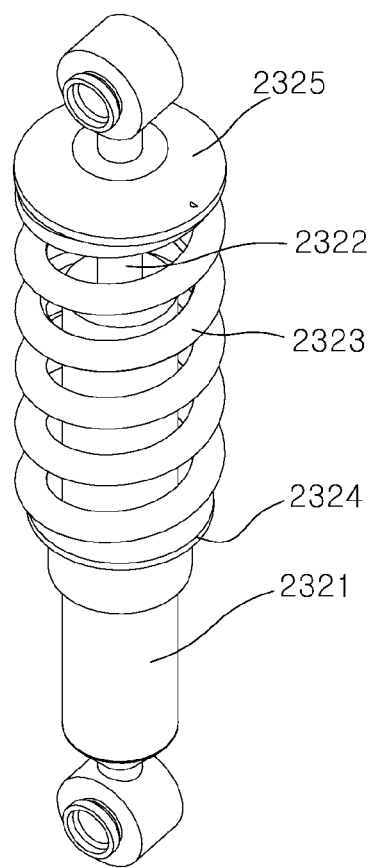
FIG. 14 is an enlarged view schematically illustrating a configuration of a shock absorber module according to the first embodiment of the present disclosure.

FIG. 14 is an enlarged view schematically illustrating a configuration of the shock absorber module 2320 according to the first embodiment of the present disclosure.

Referring to FIGS. 9 to 14, the shock absorber module 2320 according to the present embodiment includes a cylinder 2321, a rod 2322, and an elastic body 2323.

The cylinder 2321 forms an external appearance of one side of the shock absorber module 2320 and is connected to the suspension arm 2310. The cylinder 2321 according to the present embodiment may be formed in such a manner as to have an empty space inside and to have the form of a cylinder that is open at one side thereof. The cylinder 2321 is filled with a fluid, such as oil, that can serve to produce dumping. The cylinder 2321 is disposed in such a manner that both end portions thereof are spaced a distance apart from each other in the upward-downward direction. The cylinder 2321 may be disposed in such a manner that a length direction thereof is inclined to a predetermined angle with respect to the wheel 300 toward the inside in the width direction of the vehicle. In this case, the cylinder 2321 may be disposed to be lengthwise in parallel to a steering axis S described later. It is also possible that the cylinder 2321 is disposed to be inclined at a different angle than the steering axis S. A lower end portion of the cylinder 2321 may be rotatably coupled to a lateral side of the second arm 2312 with a rubber bush or the like in between.

The rod 2322 forms an external appearance of the other side of the shock absorber module 2320 and is connected to the steering main body 2410. For being installed, the rod 2322 according to the present embodiment may be formed in the form of a bar in such a manner that a lower end portion thereof is inserted into an upper end portion of the cylinder 2321 and is slidable along the length direction of the cylinder 2321. An upper end portion of the rod 2322 is rotatably coupled to the steering main body 2410, more specifically, with a lateral side of the second steering main body 2412 with a rubber bush or the like in between. The rod 2322 is slid along the length direction of the cylinder 2321 in conjunction with pressure of the fluid with which the cylinder 2321 is filled and with an elastic force of the elastic body 2323 described later.

The elastic body 2323 is provided between the cylinder 2321 and the rod 2322 and elastically supports the rod 2322 with respect to the cylinder 2321. The elastic body 2323 according to the present embodiment is disposed in such a manner to surround outside surfaces of the cylinder 2321 and the rod 2322. The elastic body 2323 may be formed in the form of a spring in such a manner as to be expandable and contractable along a length direction thereof. Both end portions of the elastic body 2323 may be coupled to a lower seat 2324 and an upper seat 2325, respectively, and thus may be supported thereon. The lower seat 2324 is fixed to the cylinder 2321, and the seat upper 2325 is fixed to the rod 2322. When the rod 2322 is slid, the elastic body 2323 contracts or expands, thereby increasing an elastic restoring force. With the increased restoring force, the elastic body 232 may absorb the shock applied from the road surface.

The steering unit 2400 is connected to the suspension unit 2300, is rotated about the steering axis S, and adjusts a steering angle of the wheel 300. The steering axis S here is a shaft inclined with respect to the wheel 300. As illustrated in FIG. 2, the steering axis S may be exemplified by a shaft that is disposed in a manner that is inclined to a predetermined angle from the wheel 300 toward the inside in the width direction of the vehicle. Accordingly, when compared with a case where the steering axis S is disposed in parallel to the wheel 300, an overall height of the steering unit 2400 can be decreased, and thus the low-floor corner module 200 can be realized.

Figure 15:
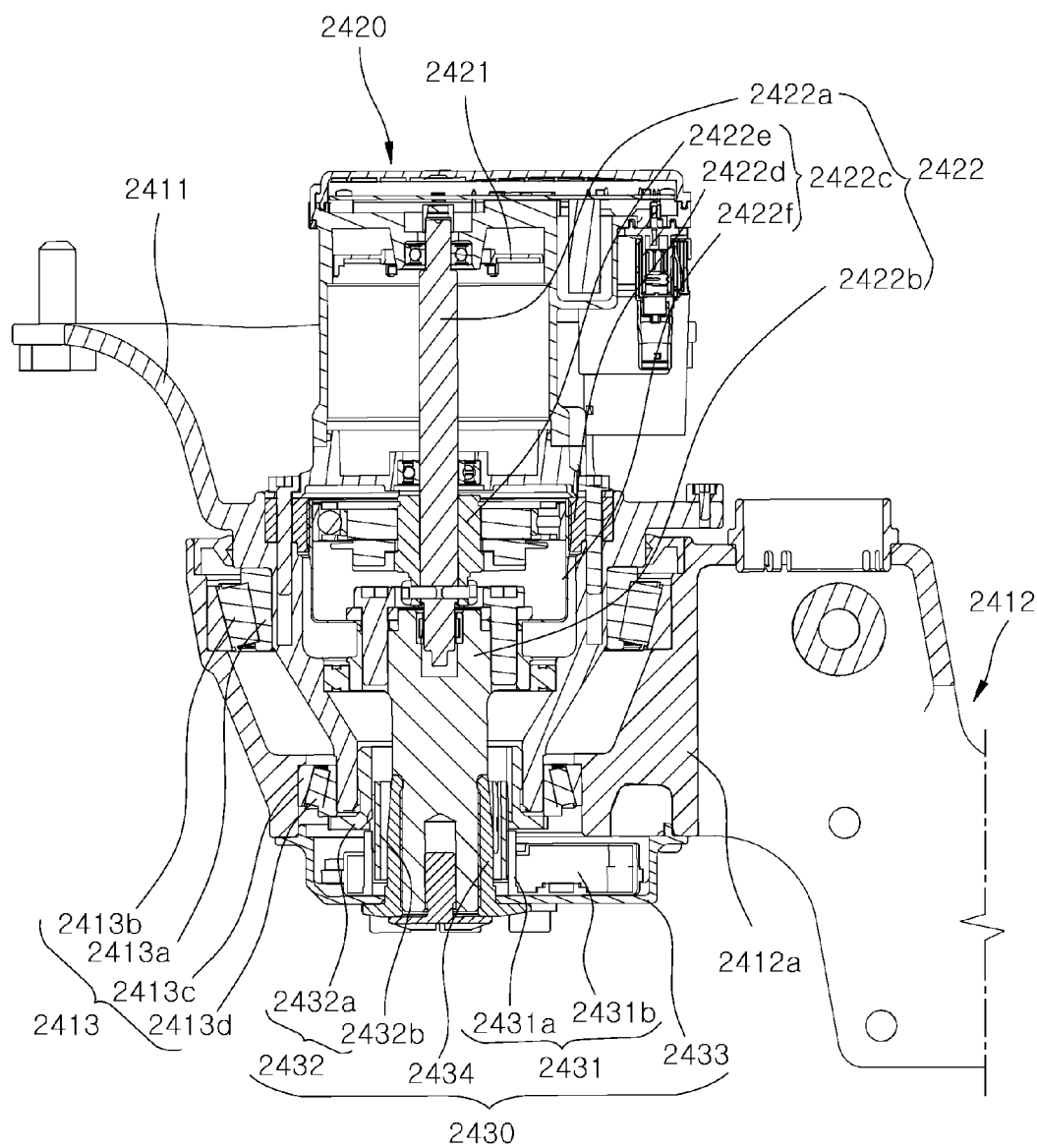
FIG. 15 is a cross-sectional view schematically illustrating a configuration of a steering unit according to the first embodiment of the present disclosure.
Figure 16:
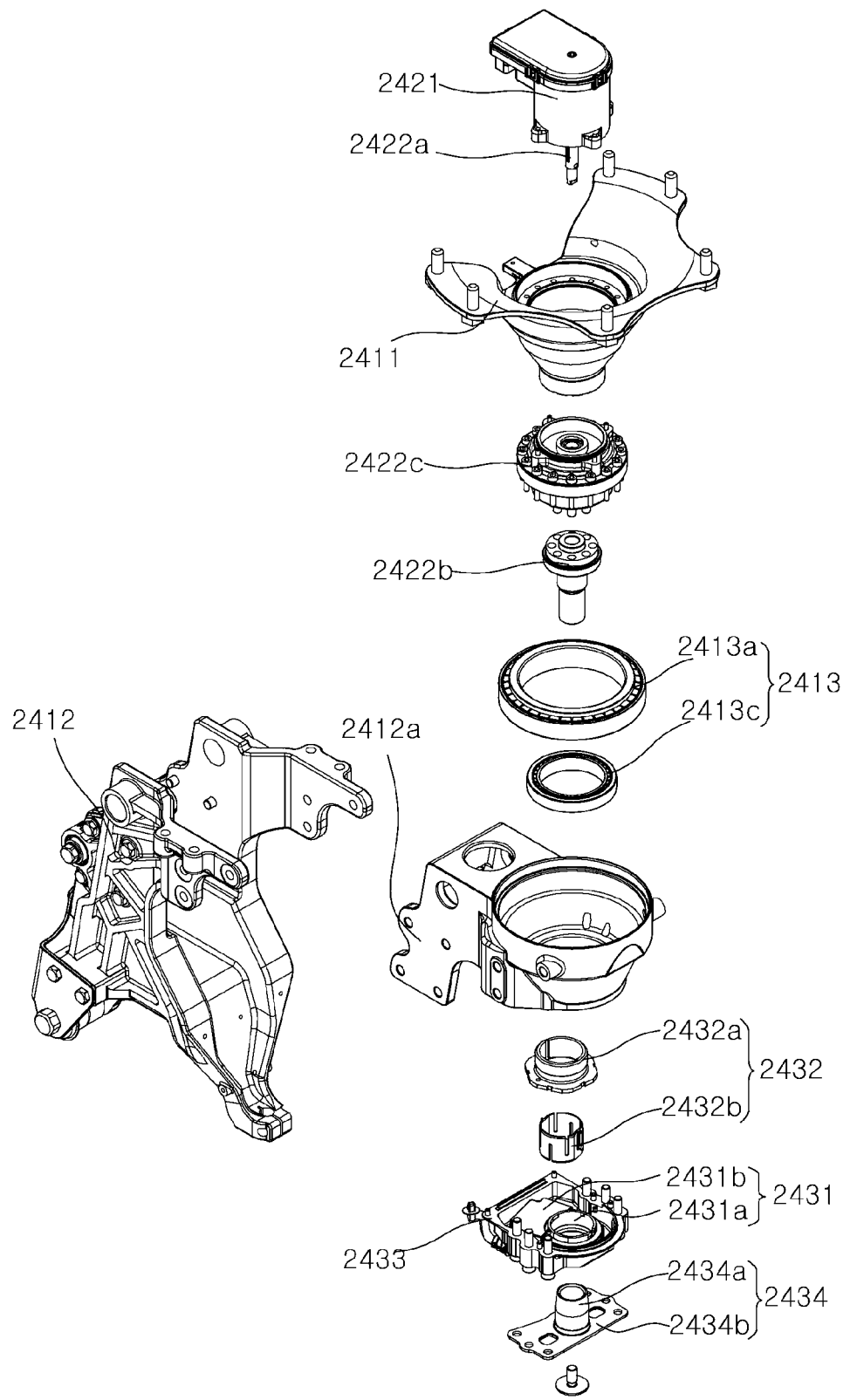
FIG. 16 is an exploded perspective view schematically illustrating the configuration of the steering unit according to the first embodiment of the present disclosure.
Figure 17:
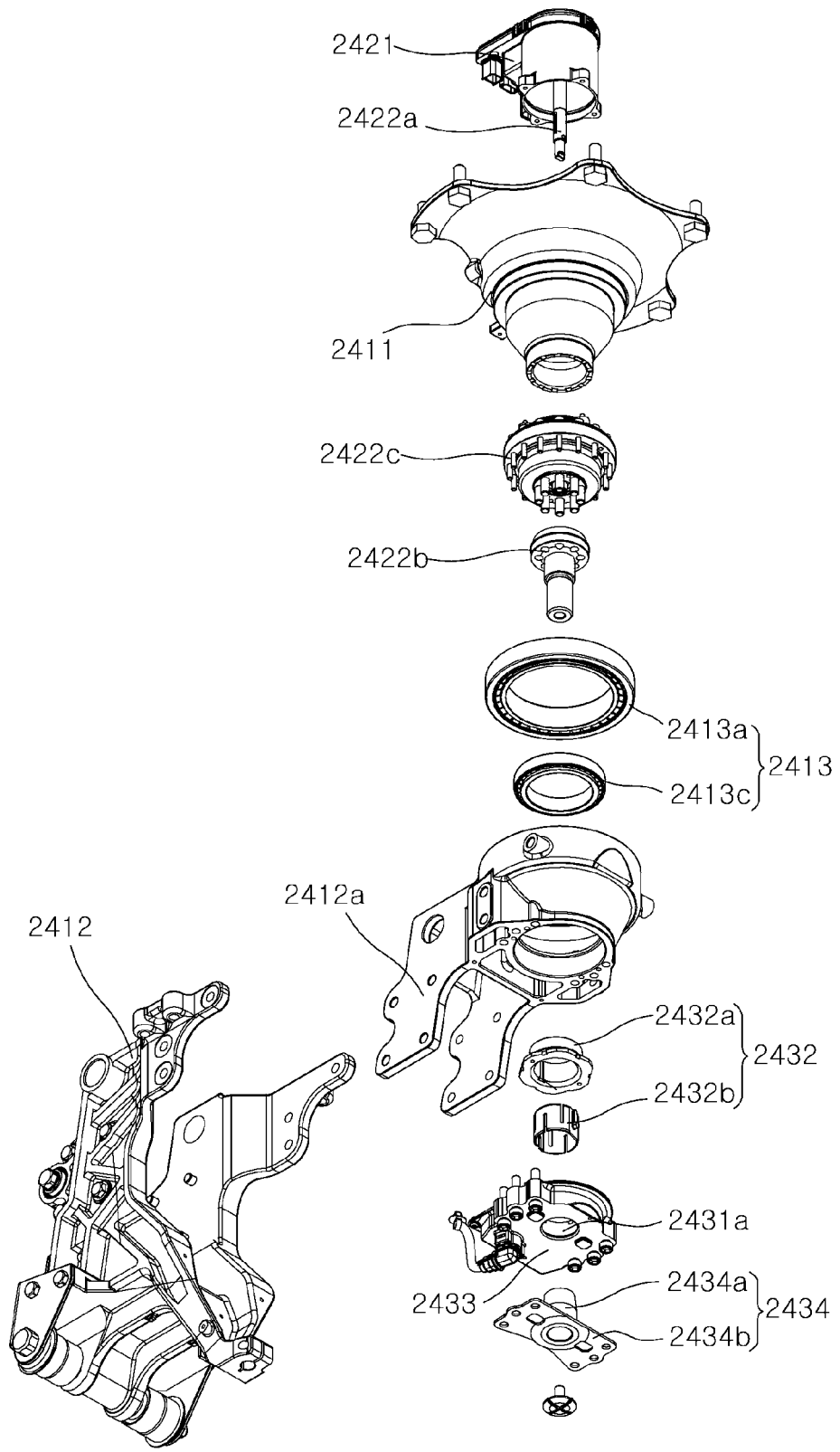
FIG. 17 is an exploded perspective view illustrating the configuration of the steering unit according to the first embodiment of the present disclosure, when viewed from a different angle than in FIG. 16.

FIG. 15 is a cross-sectional view schematically illustrating a configuration of the steering unit 2400 according to the first embodiment of the present disclosure. FIG. 16 is an exploded perspective view schematically illustrating the configuration of the steering unit 2400 according to the first embodiment of the present disclosure. FIG. 17 is an exploded perspective view illustrating the configuration of the steering unit 2400 according to the first embodiment of the present disclosure, when viewed from a different angle than in FIG. 16.

Referring to FIGS. 15 to 17, the steering unit 2400 according to the present embodiment includes the steering main body 2410, a steering driving unit 2420 and a steering angle measurement unit 2430.

One side of the steering main body 2410 is supported on a frame module 100 in a manner that is rotatable about the steering axis S and is connected to the suspension unit 2300.

The steering main body 2410 according to the present embodiment includes a first steering main body 2411, the second steering main body 2412, and a bearing unit 2413.

The first steering main body 2411 forms an external appearance of one side of the steering main body 2410 and is fixed to the frame module 100. The first steering main body 2411 according to the present embodiment may be formed in the form of a hollow cylinder in such a manner as to be open at the top and the bottom and to have a width that becomes narrower toward the lower end. The first steering main body 2411 is disposed in such a manner that the central axis thereof is positioned on the same straight line as the steering axis S. Accordingly, the first steering main body 2411 may be disposed in a manner that is inclined to the same angle as the steering axis S with respect to the wheel 300. An upper end portion of the first steering main body 2411 is detachably fixed to a lower surface of a first mounting plate 1221A or a second mounting plate 1221B that is provided on the frame module 100 using the fastening method, such as bolting. In this case, the first mounting plate 1221A or the second mounting plate 1221B, as illustrated in FIG. 11 may be formed obliquely in a manner that faces an upper end portion of the first steering main body 2411 in a parallel therewith. Otherwise, even in a case where the first mounting plate 1221A or the second mounting plate 1221B is disposed in parallel with the ground, the first steering main body 2411 may be design-changed in such a manner that the central axis thereof is inclined to the same angle as the steering axis S and that an upper end portion thereof is fixed, in various forms, to the first mounting plate 1221A or the second mounting plate 1221B.

The second steering main body 2412 forms an external appearance of the other side of the steering main body 2410 and is supported on the first steering main body 2411 in a manner that is rotatable about the steering axis S. The second steering main body 2412 is rotated, relatively to the first steering main body 2411, about the steering axis S by the steering driving unit 2420 described later. The second steering main body 2412 is connected to the suspension unit 2300 and, when rotated relatively to the first steering main body 2411, adjusts the steering angle of the wheel 300 with the suspension unit 2300 in between.

The second steering main body 2412 according to the present embodiment extends lengthwise in the upward-downward along a height direction of the vehicle. The second steering main body 2412 is formed in such a manner as to be open at the side thereof that faces the wheel 300. As described above, one end portion of each of the first arm 2311 and the second arm 2312 is rotatably connected to the inside of the second steering main body 2412. Upper end portions of the rods 2322 that are provided to the shock absorber modules 2320, respectively, in one pair, are rotatably connected to both-side surfaces, respectively, of the steering main body 2410.

An upper end portion of the second steering main body 2412 is supported on the first steering main body 2411 in a manner that is rotatable about the steering axis S. More specifically, a rotation body 2412a into which a lower end portion of the first steering main body 2411 is inserted is formed on an upper end portion of the second steering main body 2412. The rotation body 2412a may be formed in such a manner as to have the form of a cylinder that is open at the top and the bottom and to have an empty space inside. The rotation body 2412a is disposed in such a manner that the central axis thereof is positioned on the same straight line as the central axis of the first steering main body 2411 and the steering axis S. The rotation body 2412a is disposed in such a manner that an inner circumferential surface thereof is spaced a predetermined distance away from an outer circumferential surface of the first steering main body 2411. The rotation body 2412a is supported in a manner that is rotatable about the steering axis S with respect to the first steering main body 2411, with the bearing unit 2413 described later in between.

The bearing unit 2413 is provided between the first steering main body 2411 and the second steering main body 2412, more specifically, between the first steering main body 2411 and the rotation body 2412a and rotatably supports the second steering main body 2412 with respect to the first steering main body 2411.

The bearing unit 2413 according to the present embodiment includes a first bearing 2413a and a second bearing 2413c.

The first bearing 2413a may be exemplified by a roller bearing that includes a first roller 2413b that is rotated about the central axis thereof. An inner circumferential surface and an outer circumferential surface of the first bearing 2413a are fixed to the outer circumferential surface of the first steering main body 2411 and an inner circumferential surface of the rotation body 2412a, respectively. A plurality of first bearings 2413a may be provided and be disposed in such a manner as to be spaced a predetermined distance apart, along a circumferential surface of the first steering main body 2411, from each other. The first roller 2413b of the first bearing 2413a may be disposed in such a manner that the central axis thereof is inclined at a predetermined angle with respect to the central axis of the first steering main body 2411 and the steering axis S.

The second bearing 2413c may be exemplified by a roller bearing that includes a second roller 2413d that is rotated about the central axis thereof. An inner circumferential surface and an outer circumferential surface of the second bearing 2413c are fixed to the outer circumferential surface of the first steering main body 2411 and the inner circumferential surface of the rotation body 2412a, respectively. A plurality of second bearings 2413c may be provided and be disposed in such a manner as to be spaced a predetermined distance apart, along the circumferential surface of the first steering main body 2411, from each other. The second bearings 2413c are disposed in such a manner as to be spaced a distance apart, in the upward-downward direction along length directions of the first bearing 2413a and the first steering main body 2411, from each other. For example, as illustrated in FIG. 15, the first bearing 2413a and the second bearing 2413c may be fixed to inner circumferential surfaces, respectively, of an upper end portion and a lower end portion of the rotation body 2412a. The second roller 2413d of the second bearing 2413c may be disposed in such a manner that the central axis thereof is inclined to a predetermined angle with respect to the central axis of the first steering main body 2411 and the steering axis S. The second roller 2413d may be disposed in such a manner that the central axis thereof intersects the central axis of the first roller 2413b. Accordingly, the first bearing 2413a and the second bearing 2413c may cancel out bending moments, respectively, that occur when the first steering main body 2411 and the second steering main body 2412 are relatively rotated about a steering axis C inclined with respect to the wheel 300.

The steering driving unit 2420 is connected to the steering main body 2410 and thus rotates the steering main body 2410 with respect to the frame module 100. More specifically, the steering driving unit 2420 is installed on the first steering main body 2411. With drive power of the steering driving unit 2420 itself, the steering driving unit 2420 relatively rotates the second steering main body 2412 about the steering axis S in a clockwise or counterclockwise direction relatively to the first steering main body 2411.

The steering driving unit 2420 according to the present embodiment includes a steering actuator 2421 and a drive power transfer module 2422.

The steering actuator 2421 is coupled to the first steering main body 2411. The steering actuator 2421 is supplied with electric power and thus generates rotatory power. The steering actuator 2421 according to the present embodiment may be exemplified by one of various types of electric motors that convert electric power applied from the outside into rotatory power and output the resulting rotatory power. The steering actuator 2421 may be electrically connected to the battery 400 and thus may be supplied with electric power from the battery 400. The steering actuator 2421 is inserted into the first steering main body 2411. The steering actuator 2421 may be detachably fixed to the first steering main body 2411 using the fastening method, such as bolting.

The drive power transfer module 2422 rotates the second steering main body 2412 in conjunction with the rotatory power generated from the steering actuator 2421.

The drive power transfer module 2422 according to the present embodiment includes an input shaft 2422a, an output shaft 2422b, and a decelerator 2422c.

The input shaft 2422a is connected to the steering actuator 2421 and thus is rotated. The input shaft 2422a according to the present embodiment may be formed in such a manner as to have the form of a shaft having a circular cross section. An upper end portion of the input shaft 2422a is connected to the steering actuator 2421. The input shaft 2422a is supplied with rotatory power from the steering actuator 2421 and thus is rotated about the central axis thereof. The input shaft 2422a is disposed in such a manner that the central axis thereof is parallel to the steering axis S. More specifically, the input shaft 2422a may be disposed in such a manner that the central axis thereof is positioned on the same straight line as the steering axis S.

The output shaft 2422b is connected to the second steering main body 2412 and is disposed in a manner that faces the input shaft 2422a. The output shaft 2422b is supplied with rotatory power of the input shaft 2422a through the decelerator 2422c described later and thus rotates the second steering main body 2412. The output shaft 2422b according to the present embodiment may be formed in such a manner as to have the form of a shaft having a circular cross section. The output shaft 2422b is disposed under the input shaft 2422a. A lower end portion of the output shaft 2422b may be connected indirectly to the second steering main body 2412, more specifically, to the rotation body 2412a, with the steering angle measurement unit 2430 described later in between. The output shaft 2422b is disposed in such a manner that the central axis thereof is parallel to the steering axis S. More specifically, the output shaft 2422b may be disposed in such a manner that the central axis thereof is positioned on the same straight line as the steering axis S and the input shaft 2422a.

The decelerator 2422c is provided between the input shaft 2422a and the output shaft 2422b and transfers the rotatory power of the input shaft 2422a to the output shaft 2422b. More specifically, the decelerator 2422c functions as a constituent element that reduces a rotational speed of the input shaft 2422a at a preset reduction ratio and thus increases a magnitude of the rotatory power to be transferred to the output shaft 2422b. The decelerator 2422c according to the present embodiment may be a strain wave gear that includes a circular spline 2422d, a wave generator 2422e, and a flex spline 2422f.

The circular spline 2422d is fixed to the first steering main body 2411 and rotatably supports the flex spline 2422f described later. The circular spline 2422d according to the present embodiment may be formed in the form of a hollow ring in such a manner as to have gear teeth formed on an inner circumferential surface thereof. The circular spline 2422d is disposed in such a manner that the central axis thereof is positioned on the same axis as the input shaft 2422a and the output shaft 2422b. The circular spline 2422d is fixed to the first steering main body 2411 using the fastening method, such as bolting.

The wave generator 2422e is connected to the input shaft 2422a and thus is rotated. The wave generator 2422e according to the present embodiment may be formed in the form of a cam in such a manner as to have an elliptical cross section. An inner circumferential surface of the wave generator 2422e is integrally connected to an outer circumferential surface of the input shaft 2422a using a spline connection or the like. When the input shaft 2422a is rotated, the wave generator 2422e is rotated at the same angular speed as the input shaft 2422a. The wave generator 2422e is disposed in such a manner that an outer circumferential surface thereof is spaced a predetermined distance away from an inner circumferential surface of the circular spline 2422d.

The flex spline 2422f is connected to the output shaft 2422b and is engaged with the circular spline 2422d for being coupled thereto. The flex spline 2422f is provided in a transformable manner and is elastically transformed in conjunction with rotation of the wave generator 2422e. When elastically transformed by the wave generator 2422e, the flex spline 2422f is rotated, inside the circular spline 2422d, about the central axis thereof and thus rotates the output shaft 2422b.

The flex spline 2422f according to the present embodiment may be formed in such a manner as to have the form of a flexible cup that is open at one side thereof. The closed side of the flex spline 2422f is coupled to the output shaft 2422b, using the fastening method, such as bolting. The output shaft 2422b is positioned under the input shaft 2422a, and thus the flex spline 2422f is disposed in such a manner that the open side thereof faces upward. Accordingly, the flex spline 2422f may prevent lubricating oil, such as grease, accommodated thereinside, from being spilled due to gravity. The wave generator 2422e is inserted into the flex spline 2422f through the open side thereof. An inner circumferential surface of the flex spline 2422f is brought into contact with an outer circumferential surface of the wave generator 2422e. When the wave generator 2422e is rotated, a cross section of the flex spline 2422f is elastically transformed into an ellipse by the wave generator 2422e. Gear teeth that are locally engaged with gear teeth formed on an inner circumferential surface of the circular spline 2422d are formed on an outer circumferential surface of the flex spline 2422f. When the flex spline 2422f is elastically transformed by the wave generator 2422e, positions of the gear teeth of on the outer circumferential surface of the flex spline 2422f that is locally engaged with the gear teeth on the inner circumferential surface of the circular spline 2422d are sequentially moved, and thus the flex spline 2422f is rotated about the central axis thereof. In this case, the flex spline 2422f is rotated, inside the circular spline 2422d, in a direction opposite to the direction of the wave generator 2422e.

The steering angle measurement unit 2430 measures a relative rotation angle of the second steering main body 2412 to the first steering main body 2411. The steering angle measurement unit 2430 transfers data on the measured relative rotation angle of the second steering main body 2412 to a control device (for example, a controller 20 described later), such as an ECU of the vehicle, and enables the control device to perform rolling control, circling control, or the like of the vehicle.

Figure 18:
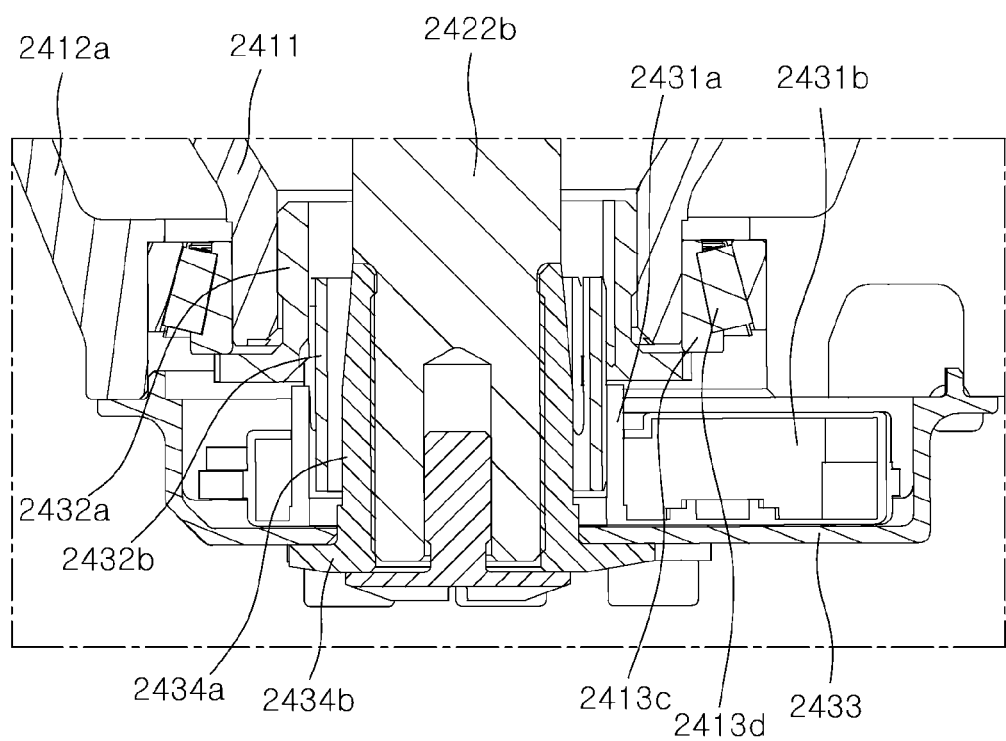
FIG. 18 is an enlarged view schematically illustrating a configuration of a steering angle measurement unit according to the first embodiment of the present disclosure.
Figure 19:
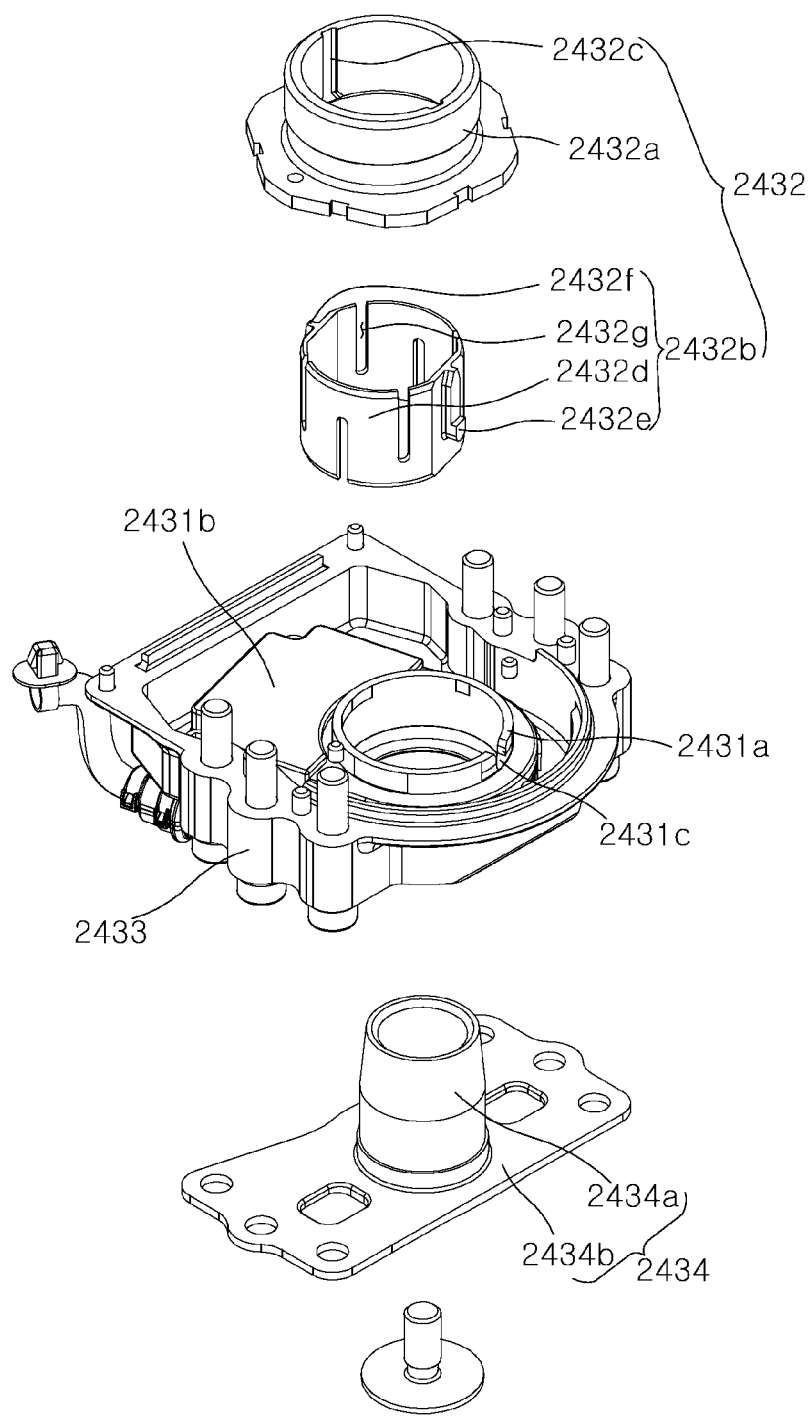
FIG. 19 is an exploded perspective view schematically illustrating the configuration of the steering angle measurement unit according to the first embodiment of the present disclosure.

FIG. 18 is an enlarged view schematically illustrating a configuration of the steering angle measurement unit 2430 according to the first embodiment of the present disclosure. FIG. 19 is an exploded perspective view schematically illustrating the configuration of the steering angle measurement unit 2430 according to the first embodiment of the present disclosure.

Referring to FIGS. 18 and 19, the steering angle measurement unit 2430 according to the present embodiment includes a steering angle sensor 2431, a plug unit 2432, a sensor housing 2433, and a sensor holder 2434.

The steering angle sensor 2431 may be exemplified by one of various types of rotational angle sensors, each of which includes a sensor ring 2431a and a sensor body 2431b that are connected to each other in such a manner that is rotatable relatively to each other and each of which measures relative rotational angles of the sensor ring 2431a and the sensor body 2431b by outputting in the form of an electric signal a magnetic field change or an electric change that occurs when the sensor ring 2431a and the sensor body 2431b are rotated relatively to each other. The steering angle sensor 2431 is disposed in such a manner that an upper surface thereof faces a lower end portion of the rotation body 2412a.

The sensor ring 2431a according to the present embodiment may be formed in such a manner as to have the form of a hollow cylinder. The sensor ring 2431a is supported on the sensor body 2431b in such a manner as to be rotatable about the central axis thereof. An upper end portion of the sensor ring 2431a protrudes above the sensor body 2431b. A first assembling groove 2431c is formed in the sensor ring 2431a by concavely recessing the upper end portion of the sensor ring 2431a along a length direction of the sensor ring 2431a.

The plug unit 2432 is coupled to the sensor ring 2431a and is fixed to the first steering main body 2411. That is, the plug unit 2432 functions as a constituent element that, when the first steering main body 2411 and the second steering main body 2412 are rotated relatively to each other, fixes the sensor ring 2431a to the first steering main body 2411 and thus restricts rotation of the sensor ring 2431a.

The plug unit 2432 according to the present embodiment includes a plug 2432a and a sensor core 2432b.

The plug 2432a is coupled to an inner circumferential surface of the lower end portion of the first steering main body 2411. The plug 2432a according to the present embodiment is formed in such a manner as to substantially have the form of a hollow cylinder, and an upper end portion thereof is inserted into the first steering main body 2411 through the lower end portion of the first steering main body 2411. A screw thread is formed on outer circumferential surface of the plug 2432a, and the plug 2432a is coupled to an inner circumferential surface of the lower end portion of the first steering main body 2411 using a thread connection. The plug 2432a is formed in such a manner as to have a greater diameter than the output shaft 2422b and is disposed in such a manner that an inner circumferential surface thereof is positioned a predetermined distance away from an outer circumferential surface of the output shaft 2422b. A lower end portion of the plug 2432a extends from the outside in a radial direction of the plug 2432a and is brought into contact with an edge of the lower end portion of the first steering main body 2411.

A second assembling groove 2432c is formed in the plug 2432a by concavely recessing an inner circumferential surface of the plug 2432a toward the radial direction of the plug 2432a. The second assembling groove 2432c may extend lengthwise in a direction parallel to a length direction of the plug 2432a.

The sensor core 2432b is disposed between the plug 2432a and the sensor ring 2431a, and both sides thereof are coupled to the plug 2432a and the sensor ring 2431a, respectively. That is, the sensor core 2432b functions as a constituent element that couples the plug 2432a and the sensor ring 2431a to each other.

The sensor core 2432b according to the present embodiment includes a core body 2432d, a first fastening part 2432e, and a second fastening part 2432f.

The core body 2432d forms a schematic external appearance of the sensor core 2432b and is inserted into the plug 2432a and the sensor ring 2431a. The core body 2432d according to the present embodiment may be formed in such a manner as to substantially have the form of a cylinder. The core body 2432*d* is disposed in such a manner that outer circumferential surfaces of an upper end portion and a lower end portion thereof face inner circumferential surfaces, respectively, the plug 2432*a* and the sensor ring 2431*a*. The core body 2432*d* is formed in an elastically transformable manner so that the core body 2432*d* is smoothly inserted into the plug 2432*a* and the sensor ring 2431*a* and that an outer circumferential surface thereof is at the same time brought into close contact with the inner circumferential surfaces of the plug 2432*a* and the sensor ring 2431*a*. In this case, a plurality of cut grooves 2432*g* may be formed in the core body 2432*d*. The plurality of cut grooves 2432*g* are formed in the core body 2432*a* in a manner that passes therethrough and thus guides elastic transformation of the core body 2432*d*.

The first fastening part 2432*e* extends from the core body 2432*d* and is fastened to the first assembling groove 2431*c* formed in the sensor ring 2431*a*. The first fastening part 2432*e* according to the present embodiment may be formed in the form of a protrusion in such a manner as to protrude from an outer circumferential surface of the core body 2432*d* toward a radial direction of the core body 2432*d*. As a lower end portion of the core body 2432*d* is inserted into the sensor ring 2431*a*, the first fastening part 2432*e* is inserted into the first assembling groove 2431*c*.

The second fastening part 2432*f* extends from the core body 2432*d* and is fastened to the second assembling groove 2432*c* formed in the plug 2432*a*. The second fastening part 2432*f* according to the present embodiment may be formed in the form of a protrusion in such a manner as to protrude from an outer circumferential surface of the core body 2432*d* toward the radial direction of the core body 2432*d*. As an upper end portion of the core body 2432*d* is inserted into the plug 2432*a*, the second fastening part 2432*f* is inserted into the second assembling groove 2432*c*. Accordingly, with the first fastening part 2432*e* and the second fastening part 2432*f*, the sensor core 2432*b* may prevent relative rotation of the plug 2432*a* and the sensor ring 2431*a*.

The sensor housing 2433 is coupled to the sensor body 2431*b* and is fixed to the second steering main body 2412. That is, the sensor housing 2433 functions as a constituent element that supports the sensor body 2431*b* with respect to the second steering main body 2412 and, at the same time, is rotated together with the second steering main body 2412, thereby guiding relative rotation of the sensor ring 2431*a* and the sensor body 2431*b*. The sensor housing 2433 according to the present embodiment may be formed in the form of a casing that is open at the top. The sensor body 2431*b* is seated inside the sensor housing 2433, and the sensor housing 2433 is integrally coupled to the sensor body 2431*b* using the fastening method, such as bolting. An upper end portion of the sensor housing 2433 is integrally coupled to the lower end portion of the rotation body 2412*a* using the fastening method, such as bolting.

The sensor holder 2434, for example, functions as a constituent element for connecting the output shaft 2422*b* and the sensor housing 2433 to each other and transferring rotatory power of the output shaft 2422*b* to the second steering main body 2412.

The sensor holder 2434 according to the present embodiment includes a first sensor holder 2434*a* and a second sensor holder 2434*b*.

The first sensor holder 2434*a* according to the present embodiment may be formed in such a manner as to substantially have the form of a hollow cylinder. An upper end portion of the first sensor holder 2434*a* passes through a lower end portion of the sensor housing 2433 and is inserted into the sensor ring 2431*a*. An inner circumferential surface of the first sensor holder 2434*a* is coupled to the outer circumferential surface of the output shaft 2422*b* using the spline connection or the thread connection and thus is rotated together with the output shaft 2422*b*. The first sensor holder 2434*a* is disposed in such a manner that an outer circumferential surface thereof is spaced a predetermined distance away from the inner circumferential surface of the sensor ring 2431*a*.

The second sensor holder 2434*b* according to the present embodiment may be formed in the form of a plate in such a manner as to extend from a lower end portion of the first sensor holder 2434*a* toward a radial direction of the first sensor holder 2434*a*. When the first sensor holder 2434*a* is coupled to an outer circumferential surface of the output shaft 2422*b* using the spline connection or the thread connection, an upper surface of the second sensor holder 2434*b* is brought into contact with a lower surface of the sensor housing 2433. The second sensor holder 2434*b* is integrally coupled to the lower surface of the sensor housing 2433 using the fastening method, such as bolting.

The support unit 2500 extends from the frame module 100 and supports the other side of the steering main body 2410. That is, the support unit 2500 functions as a constituent element that additionally supports a lower end portion of the steering main body 2410 of which an upper end portion has the form of a cantilever and is rotatably connected to the frame module 100. Accordingly, the support unit 2500 may distribute a load applied to the first mounting plate 1221A or the second mounting plate 1221B due to a weight of the steering unit 2400 itself and thus may much more improve structural stability of the corner module 200 during corning.

Figure 20:
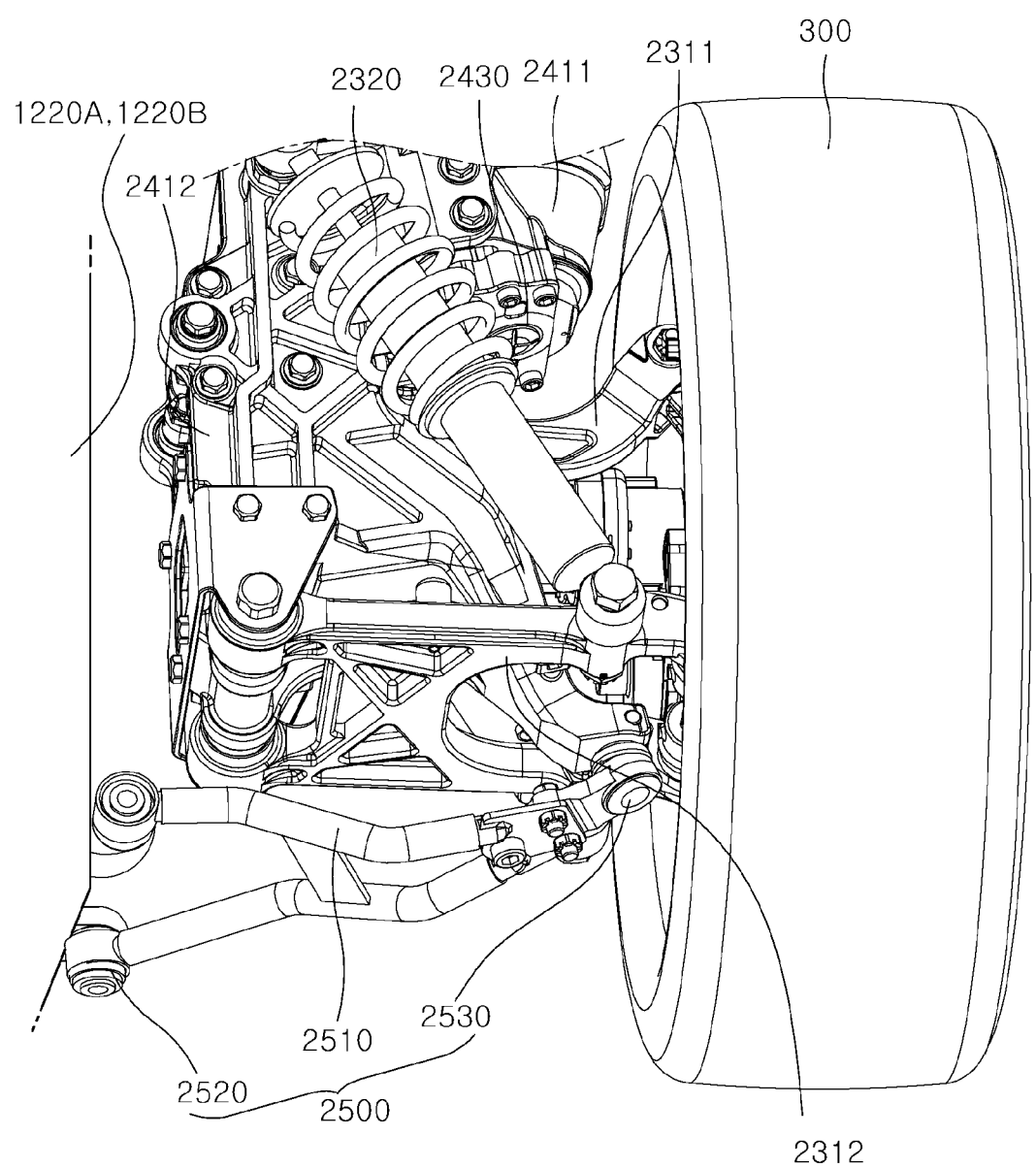
FIG. 20 is a view schematically illustrating an installed state of a support unit according to the first embodiment of the present disclosure.
Figure 21:
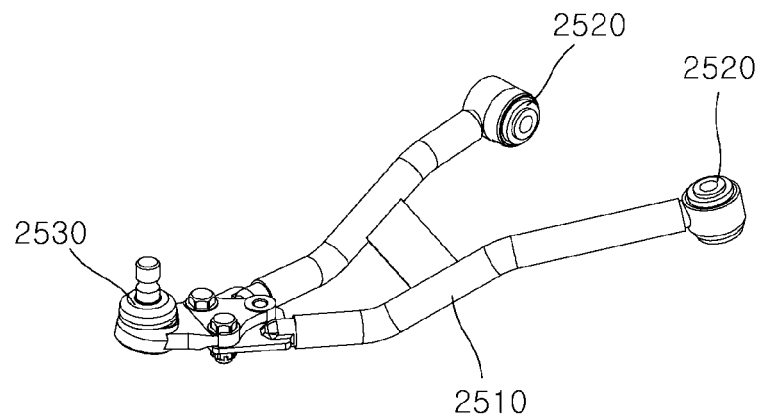
FIG. 21 is a perspective view schematically illustrating a configuration of the support unit according to the first embodiment of the present disclosure.

FIG. 20 is a view schematically illustrating an installed state of the support unit 2500 according to the first embodiment of the present disclosure. FIG. 21 is a perspective view schematically illustrating a configuration of the support unit 2500 according to the first embodiment of the present disclosure.

Referring to FIGS. 20 and 21, the support unit 2500 according to the present embodiment includes a support body 2510, a first joint 2520, and a second joint 2530.

The support body 2510 forms a schematic external appearance of the support unit 2500 and supports both the first joint 2520 and the second joint 2530 that will be described later. The support body 2510 according to the present embodiment may be formed in such a manner that one side thereof is bifurcated in the form of the letter "Y" and may be disposed in such a manner as to face the other side of the steering main body 2410, more specifically, a lower side of the second steering main body 2412. The support body 2510 extends in such a manner that a length direction thereof is parallel to the width direction of the vehicle. The support body 2510 may be formed of a high-rigidity material, such as a metal, in such a manner as to possibly support a load applied from the steering main body 2410 without shaking.

The first joint 2520 is coupled to one side of the support body 2510 and is connected to the frame module 100. That is, the first joint 2520 functions as a constituent element that connects one side of the support body 2510 with respect to the frame module 100.

The first joint 2520 according to the present embodiment may be exemplified by a rubber bush that is configured with an elastic material installed on an outer wheel and an inner wheel and between the outer wheel and the inner wheel. An outer circumferential surface of the first joint 2520 is integrally coupled to an inner circumferential surface of one end portion of the support body 2510. In this case, the first joints 2520 may be provided in one pair and may be coupled to both branch ends, respectively, of one end portion of the support body 2510 that is bifurcated. An inner circumferential surface of the first joint 2520 is connected to a lateral surface of a first corner module wheel housing 1220A or a second corner module wheel housing 1220B of the frame module 100 using a pin connection or the like.

The second joint 2530 is coupled to the other side of the support body 2510 and is connected to the other side of the steering main body 2410. That is, the second joint 2530 functions as a constituent element that connects the other side of the support body 2510 to the steering main body 2410.

The second joint 2530 according to the present embodiment may be exemplified by a ball joint that is configured with a ball stud on which a ball in the form of a sphere is formed, and a socket that supports a ball on the ball stud in a manner that is rotatable about multiple axes. The second joint 2530 is detachably coupled to a single branch end of the other end portion of the support body 2510, using the fastening method, such as bolting. With integral connection of an end portion of the ball stud to a lower end portion of the second steering main body 2412, the second joint 2530 supports the lower end portion of the second steering main body 2412 in a manner that is rotatable about multiple axes, with respect to the support body 2510. Accordingly, the second joint 2530 may support a load applied from the second steering main body 2412 and at the same time may guide smooth rotation of the second steering main body 2412 without any particular interference during vehicle steering.

A configuration of a corner module according to a second embodiment of the present disclosure will be described in detail below.

Figure 22:
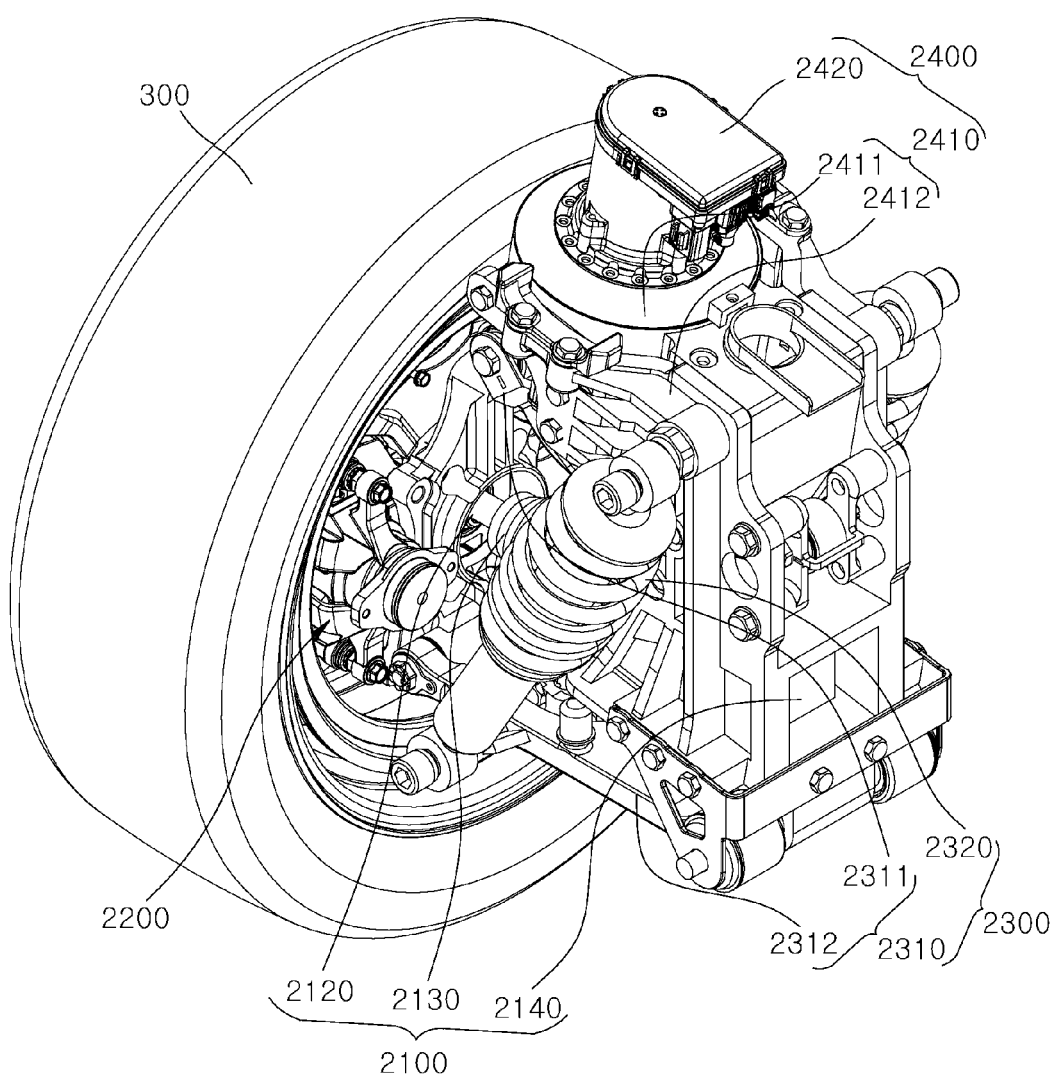
FIG. 22 is a perspective view schematically illustrating a configuration of a corner module according to a second embodiment of the present disclosure.
Figure 23:
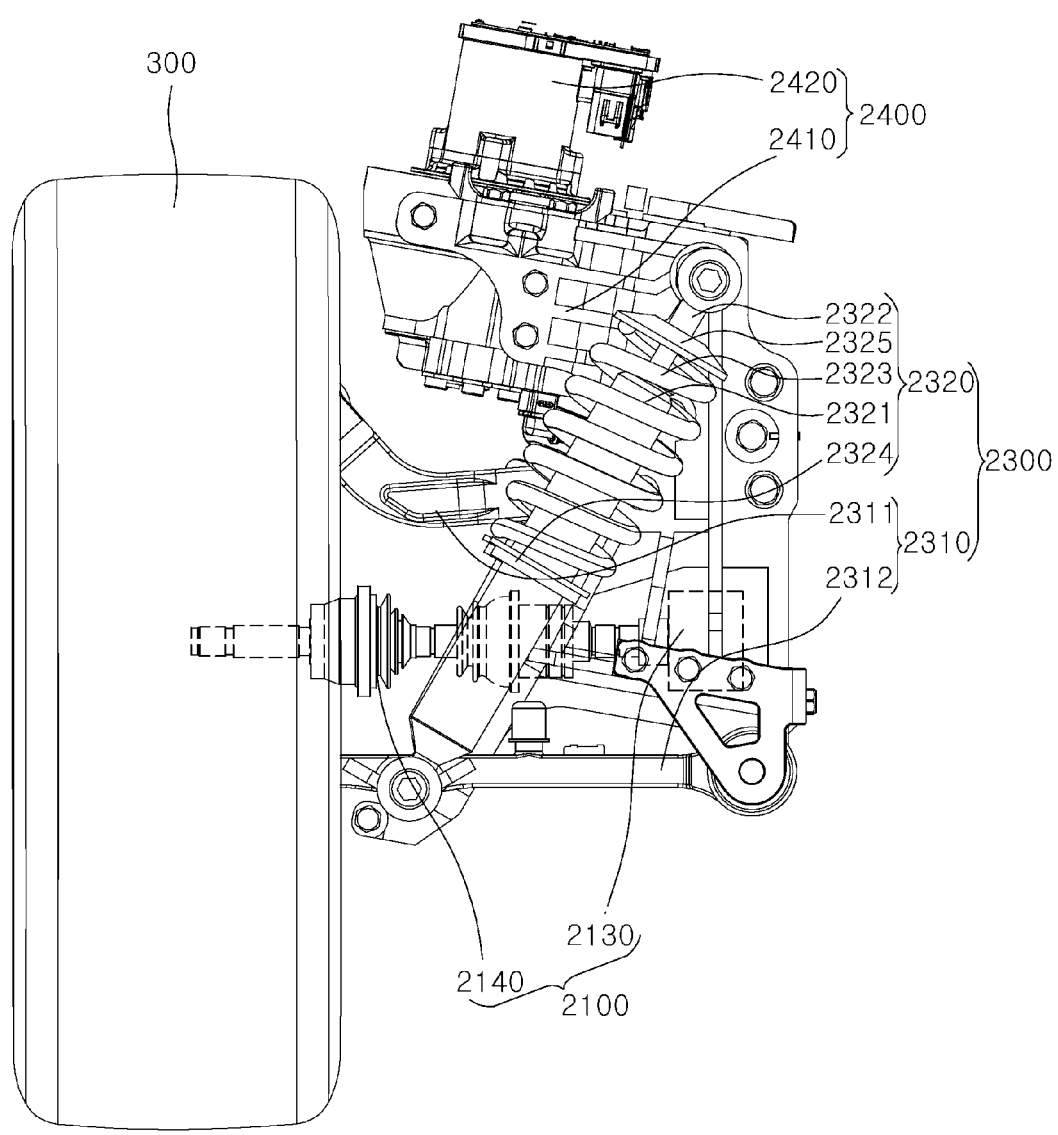
FIG. 23 is a front view schematically illustrating the configuration of the corner module according to the second embodiment of the present disclosure.
Figure 24:
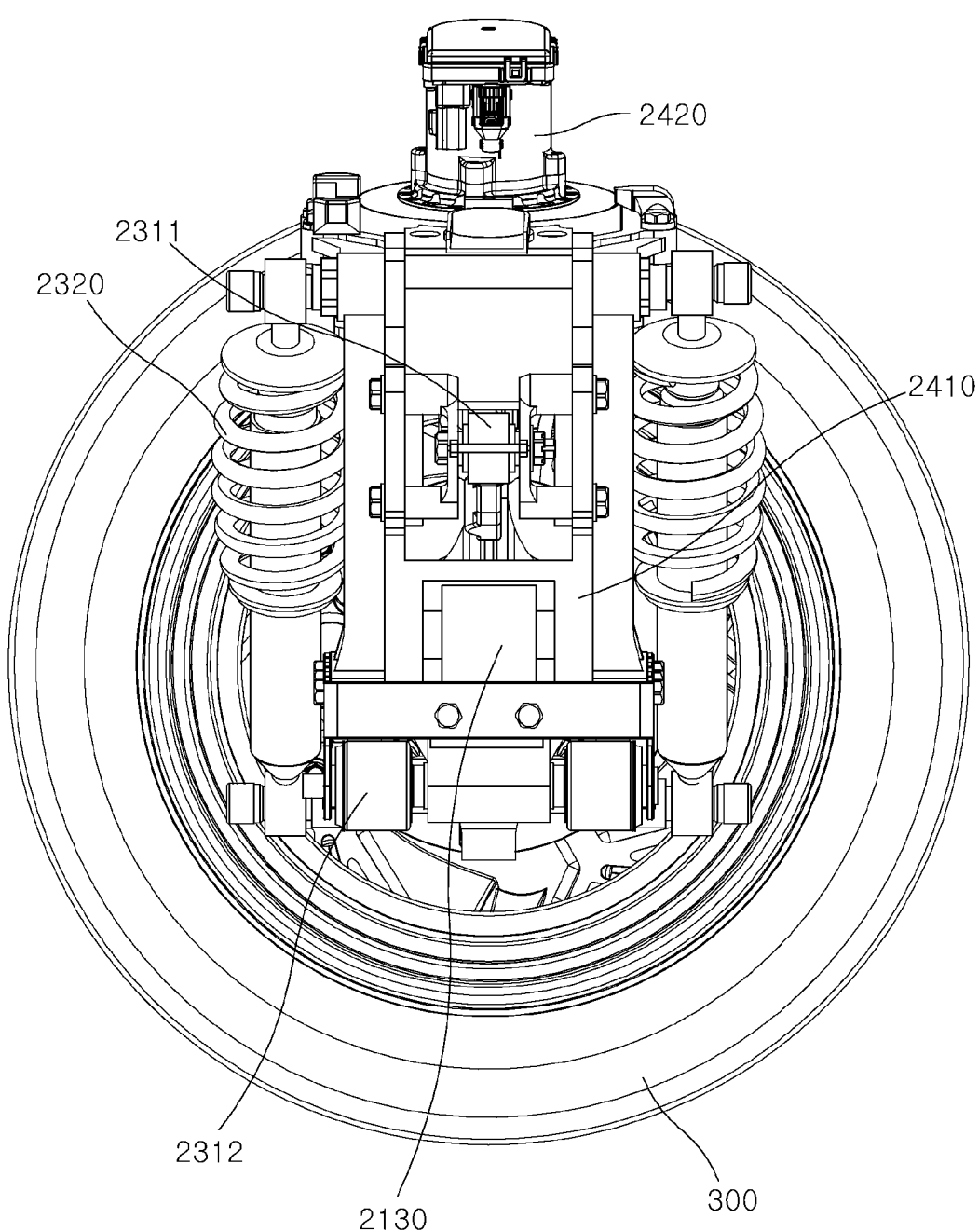
FIG. 24 is a side view schematically illustrating the configuration of the corner module according to the second embodiment of the present disclosure.
Figure 25:
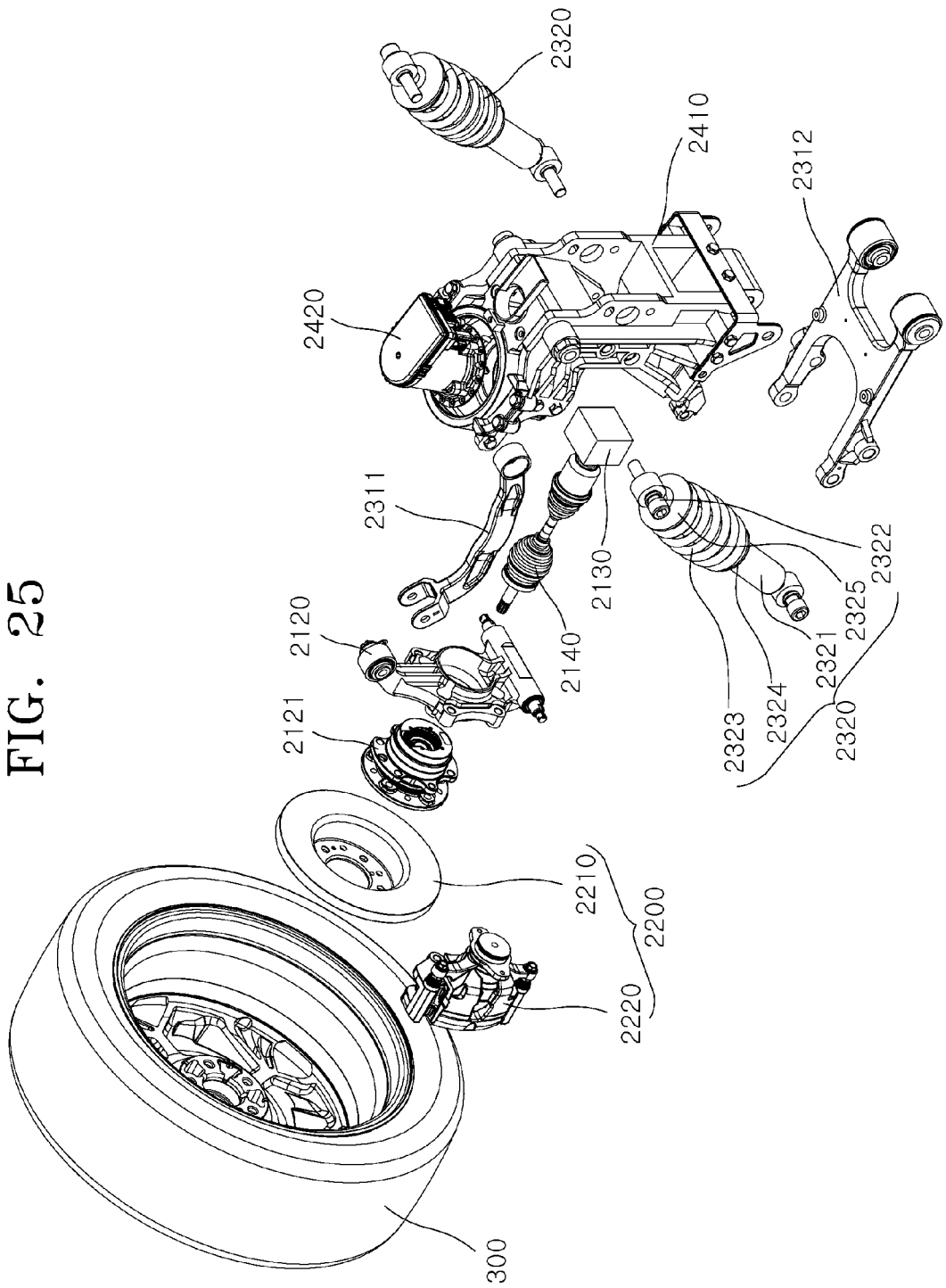
FIG. 25 is an exploded perspective view schematically illustrating the configuration of the corner module according to the second embodiment of the present disclosure.

FIG. 22 is a perspective view schematically illustrating the configuration of the corner module according to the second embodiment of the present disclosure. FIG. 23 is a front view schematically illustrating the configuration of the corner module according to the second embodiment of the present disclosure. FIG. 24 is a side view schematically illustrating the configuration of the corner module according to the second embodiment of the present disclosure. FIG. 25 is an exploded perspective view schematically illustrating the configuration of the corner module according to the second embodiment of the present disclosure.

Referring to FIGS. 22 to 25, a corner module 200 according to the present embodiment includes a driving unit 2100, the braking unit 2200, the suspension unit 2300, and the steering unit 2400.

The corner module 200 according to the second embodiment of the present disclosure is configured to include the driving unit 2100 that is different only in detailed structure and function from that of the corner module 200 according to the first embodiment of the present disclosure. Therefore, only the driving unit 2100 of the corner module 200 according to the second embodiment of the present disclosure, which is different from that of the corner module 200 according to the first embodiment of the present disclosure, is described. The other constituents of the corner module 200 according to the second embodiment of the present disclosure are the same as the corresponding constituents of the corner module 200 according to the first embodiment of the present disclosure, and thus descriptions thereof are omitted.

The driving unit 2100 provides drive power to the wheel 300 and thus rotates the wheel 300.

Figure 26:
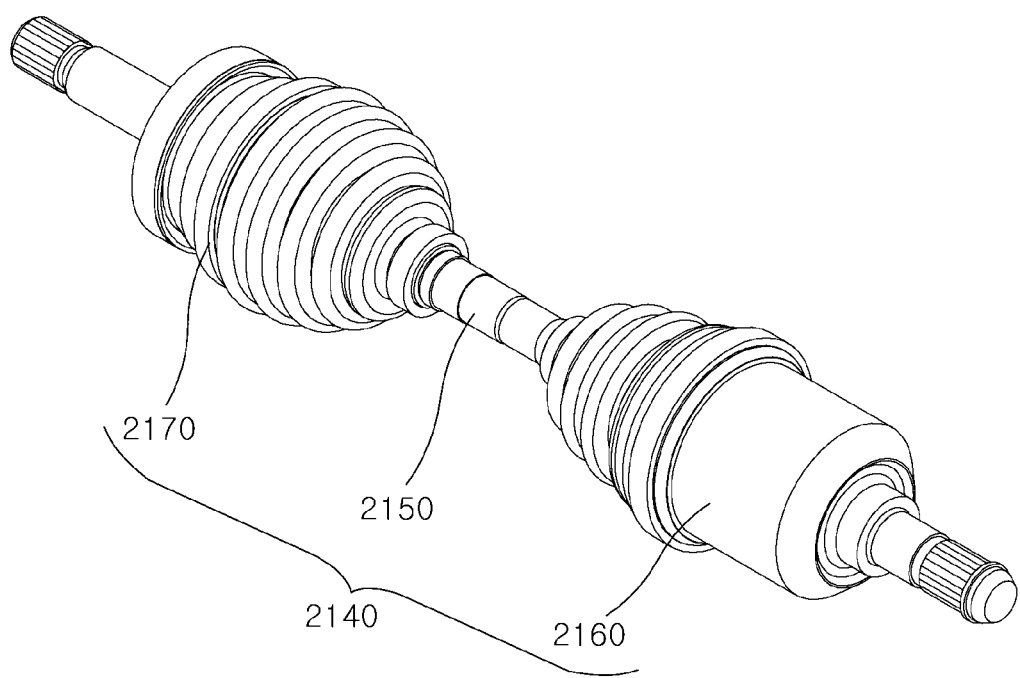
FIG. 26 is an enlarged perspective view schematically illustrating the configuration of a driving unit according to the second embodiment of the present disclosure.
Figure 27:
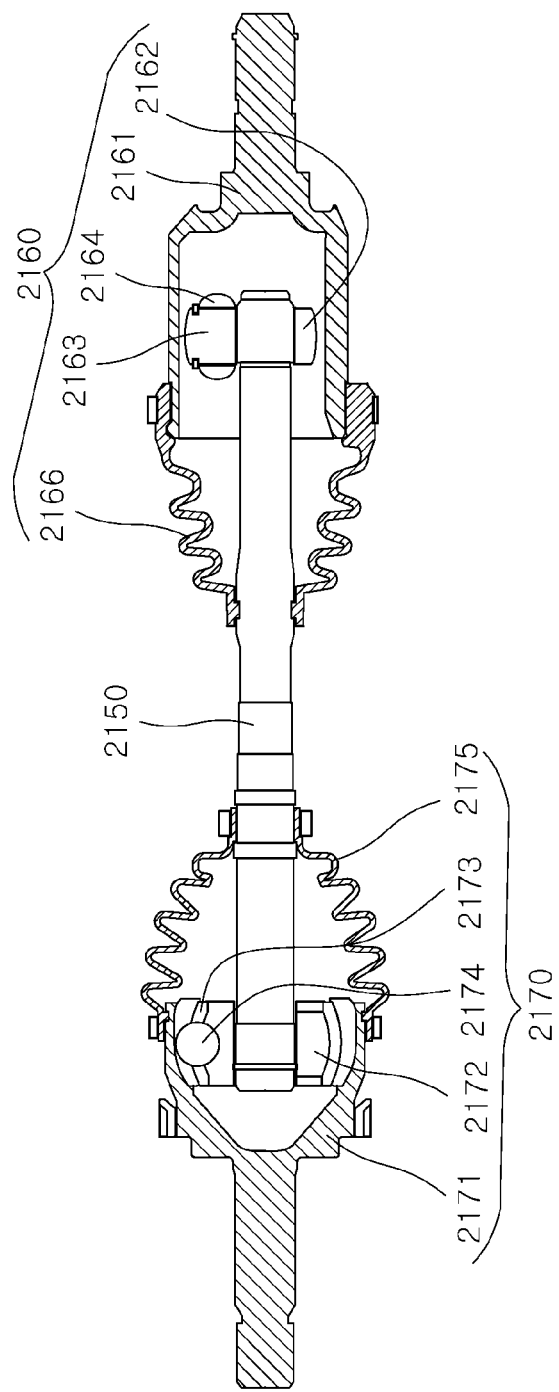
FIG. 27 is a cross-sectional view schematically illustrating the configuration of the driving unit according to the second embodiment of the present disclosure.

FIG. 26 is an enlarged perspective view schematically illustrating the configuration of the driving unit 2100 according to the second embodiment of the present disclosure. FIG. 27 is a cross-sectional view schematically illustrating the configuration of the driving unit 2100 according to the second embodiment of the present disclosure.

Referring to FIGS. 26 and 27, the driving unit 2100 according to the present embodiment includes the knuckle 2120, a drive motor 2130, and a transfer shaft module 2140.

The knuckle 2120 is coupled to a wheel bearing 2121 that rotatably supports the wheel 300. More specifically, the wheel bearing 2121 includes a rotation element that is connected to the central shaft of the wheel 300 and thus is rotated, and a fixation element that rotatably supports the rotation element with a bearing or the like in between. The knuckle 2120 is coupled to the fixation element of the wheel bearing 2121 at a position facing an inside surface of the wheel 300 and is supported thereon. The knuckle 2120 functions as a constituent element that is connected to the braking unit 2200 and the suspension unit 2300 that will be described and thus supports the braking unit 2200 inside the wheel 300 and at the same time provides a mechanical connection between the wheel 300 and the suspension unit 2300. An insertion hole into which the wheel bearing 2121 is inserted is formed in a center portion of the knuckle 2120 according to the present embodiment. The knuckle 2120 may be formed in such a manner that both end portions thereof extend in the upward-downward direction with respect to the insertion hole. The knuckle 2120 may be coupled to the fixation element of the wheel bearing 2121 using the fastening method, such as bolting, and may be supported thereon. The knuckle 2120 may be manufactured by casting a metal-series material into a mold or using another method in order to ensure sufficient rigidity.

The drive motor 2130 is disposed in a manner that is spaced a distance away from the wheel 300, and generates drive power. The drive motor 2130 according to the present embodiment may be configured with a stator that is supplied with electric power from the battery 400 and thus forms a magnetic field, and a rotor that is rotated about the central axis thereof by electromagnetic interaction with the stator. The drive motor 2130 is disposed in such a manner as to be spaced a distance away from the inside surface of the wheel 300 toward the width direction of the vehicle. Since the drive motor 2130 is disposed outside the wheel 300, the degree of freedom in disposing the braking unit 2200 or the like inside the wheel 300 can be improved, and a system can be prevented from being damaged due to heat generated by the drive motor 2130 in a small space. The drive motor 2130 may be coupled to the steering main body 2410, more specifically, with the inside of the second steering main body 2412 and may be supported thereof. In this case, the drive motor 2130 may be coupled to the inside of the second steering main body 2412 using various fastening methods, such as welding and bolting.

The transfer shaft module 2140 is provided between the wheel 300 and the drive motor 2130 and transfers drive power generated from the drive motor 2130 the wheel 300.

The transfer shaft module 2140 according to the present embodiment includes a main shaft 2150, a first joint unit 2160, and a second joint unit 2170.

The main shaft 2150 is disposed in such a manner that both sides thereof face the wheel bearing 2121 and the drive motor 2130, respectively. The main shaft 2150 according to the present embodiment may be formed in such a manner as to have the form of a bar substantially having a circular cross section. The main shaft 2150 is disposed in such a manner that one side (the right side in FIG. 27) thereof faces the drive motor 2130 and that the other side (the left side in FIG. 27) thereof faces the wheel bearing 2121.

The first joint unit 2160 is provided between one side of the main shaft 2150 and the drive motor 2130 and transfers rotatory power generated from the drive motor 2130 to the main shaft 2150. The first joint unit 2160 is installed between one side of the main shaft 2150 and the drive motor 2130 in such a manner as to be angle-adjustable. Accordingly, the first joint unit 2160 may vary an installation angle of the main shaft 2150 in a manner that corresponds to a change in relative position between the drive motor 2130 and the wheel bearing 2121, and may guide smooth transfer of the drive power through the main shaft 2150 at the changed installation angle.

Figure 28:
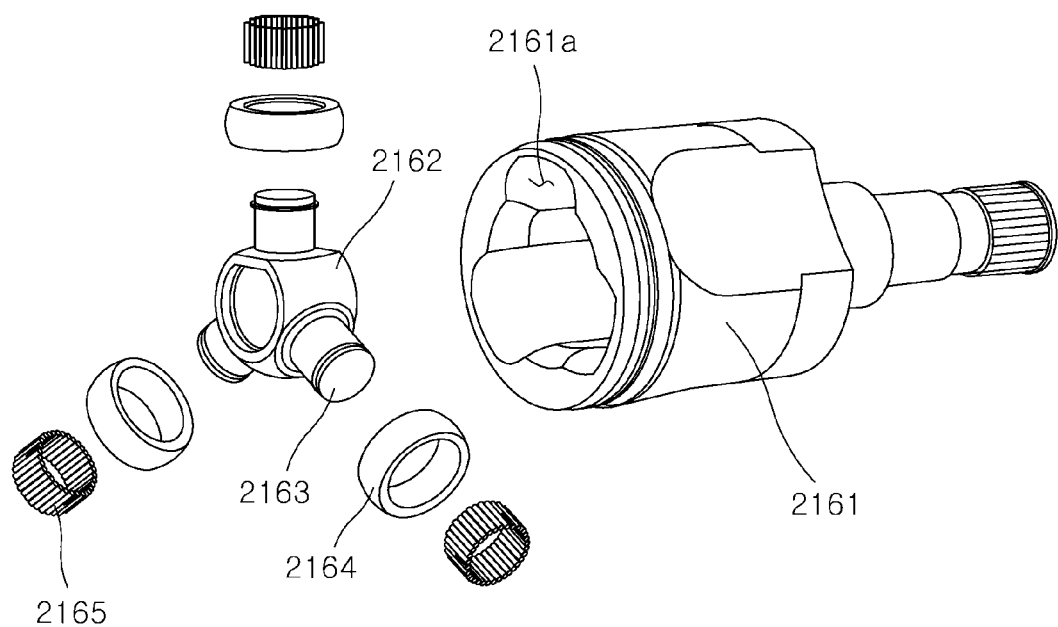
FIG. 28 is an exploded perspective view schematically illustrating a configuration of a first joint unit according to the second embodiment of the present disclosure.

FIG. 28 is an exploded perspective view schematically illustrating a configuration of the first joint unit 2160 according to the second embodiment of the present disclosure.

Referring to FIGS. 27 and 28, the first joint unit 2160 according to the present embodiment includes a first outer member 2161, a first inner member 2162, a journal 2163, a roller 2164, and a first boot 2166.

The first outer member 2161 forms a schematic external appearance of the first joint unit 2160 and is connected to the drive motor 2130. The first outer member 2161 according to the present embodiment may have the form of a pipe that is open at one side thereof (the left side in FIG. 27). The other side of the first outer member 2161 protrudes toward an axial direction of the first outer member 2161 and is inserted into the drive motor 2130. Spline teeth are formed on an outer circumferential surface of the other side of the first outer member 2161, and the outer circumferential surface thereof is coupled to an inner circumferential surface of the rotor of the drive motor 2130 using the spline connection. Accordingly, the first outer member 2161 may be rotated about the central axis thereof in conjunction with the rotatory power generated from the drive motor 2130.

A plurality of tracks 2161a are formed on an inner circumferential surface of the first outer member 2161. The track 2161a according to the present embodiment may be formed in the form of a groove by concavely recessing the inner circumferential surface of the first outer member 2161 toward a radial direction of the first outer member 2161. The track 2161a extends along a length direction of the first outer member 2161. The plurality of tracks 2161a may be provided and may be disposed in such a manner as to be spaced a predetermined distance apart, along a circumferential direction of the first outer member 2161, from each other. As an example, three tracks 2161a may be formed on an outer circumferential surface of the first outer member 2161 and may be disposed in such a manner as to be spaced an equal distance apart, along the radial direction of the first outer member 2161, from each other.

The first inner member 2162 is connected to the main shaft 2150 and is disposed inside the first outer member 2161 in such a manner as to be angle-adjustable. The first inner member 2162 according to the present embodiment may be formed in such a manner as to substantially have the form of a hollow ring. Spline teeth are formed on an inner circumferential surface of the first inner member 2162, and the inner circumferential surface thereof is coupled to an end portion of one side of the main shaft 2150 using the spline connection. Accordingly, the first inner member 2162 may be rotated together with the main shaft 2150. The first inner member 2162 is disposed inside the first outer member 2161 and is installed in a tiltable manner so that the first inner member 2162 is movable toward an axial direction relatively to the first outer member 2161 and that, at the same time, a tilting angle is realizable with respect to the first outer member 2161.

The journal 2163 extends from the first inner member 2162 toward the track 2161a. The journal 2163 according to the present embodiment may be formed in the form of a cylinder in such a manner as extend vertically from an outer circumferential surface of the first inner member 2162 toward a radial direction of the first inner member 2162. A plurality of journals 2163 are provided and individually extend toward the tracks 2161a, respectively. The plurality of journals 2163 are disposed in such a manner as to be spaced a predetermined distance apart, along a circumferential surface of the first inner member 2162, from each other. The plurality of journals 2163 are formed in such a manner that the number thereof and the distance between each thereof correspond to the number of tracks 2161a and the distance between each thereof, respectively.

The roller 2164 is rotatably supported on the journal 2163, and is brought into contact with the track 2161a in a rolling manner. That is, the roller 2164 functions as a constituent element that serves as a medium for transferring drive power between the first outer member 2161 and the first inner member 2162 and at the same time supports the first inner member 2162 with respect to the first outer member 2161 in a slidable and tiltable manner. The roller 2164 according to the present embodiment is formed in such a manner as to substantially have the form of a hollow ring. The journal 2163 is inserted into a center portion of the roller 2164 in a manner that passes therethrough. An inner circumferential surface of the roller 2164 is rotatably supported by an outer circumferential surface of the journal 2163 with a needle bearing 2165 in between. The roller 2164 is formed in such a manner that an outer circumferential surface thereof substantially has the form of a spherical surface, and the circumferential surface thereof is brought into contact with an inside surface of the track 2161a in a rolling manner. The first outer member 2161 is rotated about the central axis thereof with drive power of the drive motor 2130. Thus, the roller 2164 are kept in contact with the track 2161a and rotates the first inner member 2162 at the same angular speed as it does the first outer member 2161. The roller 2164 is installed in such a manner as to be slidable along a length direction of the track 2161a and at the same time in such a manner to be angle-adjustable in a state of being in contact with the track 2161a. When the first inner member 2162 is slid or tilted, the roller 2164 may stably support the first inner member 2162 with respect to the first outer member 2161.

Both sides of the first boot 2166 are coupled to the main shaft 2150 and the first outer member 2161, respectively and thus makes the first outer member 2161 airtight. That is, the first boot 2166 closes an open side of the first outer member 2161, and thus blocks a lubricant from being spilled out of the first outer member 2161 or prevents a foreign material from being introduced into the first outer member 2161. The first boot 2166 according to the present embodiment may be formed in such a manner to have the form of a pipe having an empty space inside. Both end portions of the first boot 2166 are coupled to the outer circumferential surface of the first outer member 2161 and an outer circumferential surface of the main shaft 2150, respectively. In this case, a separate fixation ring (not illustrated) or the like may bring both end portions of the first boot 2166 into close contact with the outer circumferential surface of the first outer member 2161 and the outer circumferential surface of the main shaft 2150 for fixation thereon. The first boot 2166 may be formed in the form of an expandable and contractable flexible corrugated pipe in such a manner as to absorb a displacement between the first outer member 2161 and the main shaft 2150 due to sliding and tilting of the first inner member 2162.

The second joint unit 2170 is provided between the other side of the main shaft 2150 and the wheel bearing 2121 and transfers rotatory power of the main shaft 2150 to the wheel bearing 2121, thereby rotating the wheel 300. The second joint unit 2170 is installed between the other side of the main shaft 2150 and the wheel bearing 2121 in an angle-adjustable manner. Accordingly, the second joint unit 2170 may vary an installation angle of the main shaft 2150 in a manner that corresponds to a change in relative position between the drive motor 2130 and the wheel bearing 2121, and may guide the smooth transfer of the drive power through the main shaft 2150 at the changed installation angle.

Figure 29:
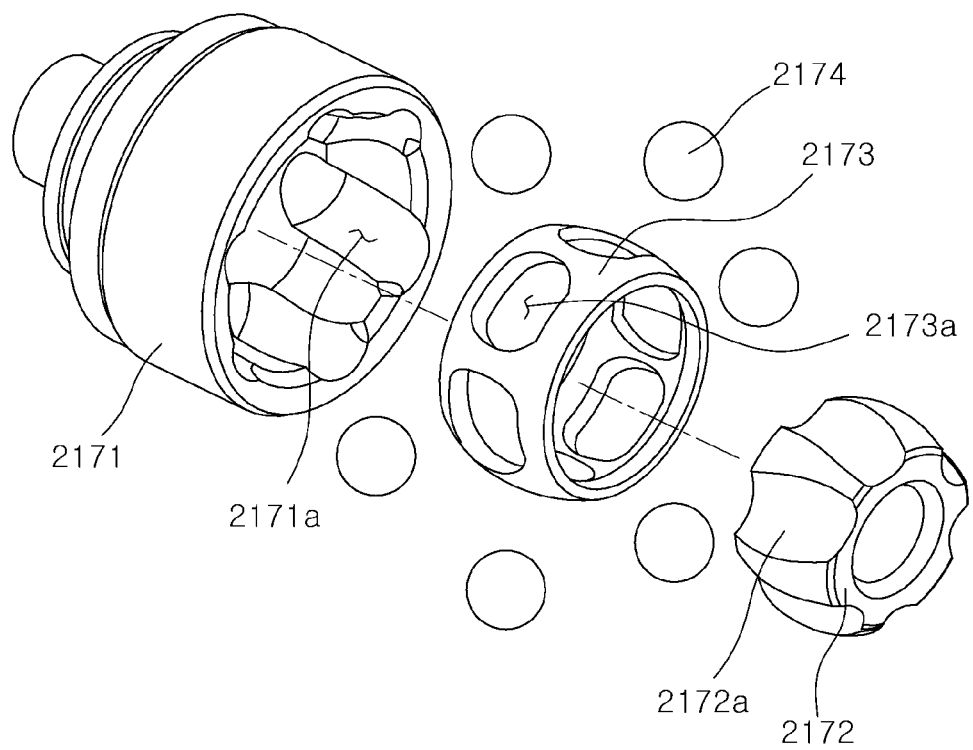
FIG. 29 is an exploded perspective view schematically illustrating a configuration of a second joint unit according to the second embodiment of the present disclosure.

FIG. 29 is an exploded perspective view schematically illustrating a configuration of the second joint unit 2170 according to the second embodiment of the present disclosure.

Referring to FIGS. 27 and 29, the second joint unit 2170 according to the present embodiment includes a second outer member 2171, a second inner member 2172, a cage 2173, a ball 2174, and a second boot 2175.

The second outer member 2171 forms a schematic external appearance of the second joint unit 2170 and is connected to the wheel bearing 2121. The second outer member 2171 according to the present embodiment may have the form of a pipe that is open at one side thereof (the right side in FIG. 27). The other side (the left side in FIG. 27) of the second outer member 2171 protrudes an axial direction of the second outer member 2171 and is inserted into the wheel bearing 2121. Spline teeth are formed on an outer circumferential surface of the other side of the second outer member 2171, and the outer circumferential surface thereof is coupled to an inner circumferential surface of the rotation element of the wheel bearing 2121 using the spline connection. Accordingly, the second outer member 2171 may be rotated about the central axis thereof in conjunction with the rotatory power of the main shaft 2150, together with the rotation element of the wheel bearing 2121.

A plurality of first grooves 2171*a* are formed in an inner circumferential surface of the second outer member 2171. The first groove 2171*a* according to the present embodiment may be formed in the form of a groove by concavely recessing the inner circumferential surface of the second outer member 2171. The first groove 2171*a* extends along a length direction of the second outer member 2171. The plurality of first grooves 2171*a* may be provided and may be disposed in such a manner as to be spaced a predetermined distance apart, along a circumferential direction of the second outer member 2171, from each other. The first groove 2171*a* may be disposed in such manner as to make an inclination angle with the central axis of the second outer member 2171.

The second inner member 2172 is connected to the main shaft 2150 and is disposed inside the second outer member 2171 in such a manner as to be angle-adjustable. The second inner member 2172 according to the present embodiment may be formed in such a manner as to substantially have the form of a hollow ring. Spline teeth are formed on an inner circumferential surface of the second inner member 2172, and the inner circumferential surface thereof is coupled to an end portion of the other side of the main shaft 2150 using the spline connection. Accordingly, the second inner member 2172 may be rotated together with the main shaft 2150. The second inner member 2172 is installed in such a manner as to be disposed inside the second outer member 2171 in a tiltable way so that tilting is realizable with respect to the second outer member 2171.

A plurality of second grooves 2172*a* are formed in an outer circumferential surface of the second inner member 2172. The second groove 2172*a* according to the present embodiment may be formed in the form of a groove by concavely recessing the outer circumferential surface of the second inner member 2172. The second groove 2172*a* extends along a length direction of the second inner member 2172, that is, along an axial direction thereof. The second inner member 2172 may be disposed in such a manner as to make an inclination angle with respect to the central axis of the second inner member 2172. The plurality of second grooves 2172*a* may be provided and may be disposed in such a manner as to be spaced, a predetermined distance apart along a circumferential direction of the second inner member 2172, from each other. In this case, the plurality of second grooves 2172*a* may be formed in such a manner that the number of second grooves 2172*a* and a distance between each thereof correspond to the number of first grooves 2171*a* and a distance between each thereof, respectively. The plurality of second grooves 2172*a* are disposed in such a manner as to individually face the first grooves 2171*a*, respectively.

The cage 2173 is disposed between the second outer member 2171 and the second inner member 2172 and rotatably supports the ball 2174 described later. That is, the cage 2173 functions as a constituent element that guides maintaining by a plurality of balls 2174 of a uniform-motion plane and rotating of the plurality of balls 2174 between the second outer member 2171 and the second inner member 2172. The cage 2173 according to the present embodiment may be formed in such a manner as to syntactically have the form of a hollow ring. An outer circumferential surface and an inner circumferential surface of The cage 2173 are disposed in such a manner as to face an inner circumferential surface of the second outer member 2171 and the outer circumferential surface of the second inner member 2172, respectively.

A plurality of accommodation holes 2173*a* are formed in the cage 2173. The accommodation hole 2173*a* according to the present embodiment is a hole that is formed in an outer circumferential surface of the cage 2173 in a manner that vertically passes through the cage 2173 toward a radial direction of the cage 2173. The plurality of accommodation holes 2173*a* may be provided. In this case, the plurality of accommodation holes 2173*a* are disposed in such a manner as to be spaced a predetermined distance, apart along a circumferential direction of the cage 2173, from each other. The plurality of accommodation holes 2173*a* may be formed in such a manner that the number of accommodation holes 2173*a* and a distance between each thereof correspond to the number of first grooves 2171*a* and a distance between each thereof, respectively.

The ball 2174 is rotatably supported on the cage 2173, and circumferences of both sides thereof are brought into contact with the first groove 2171*a* and the second groove 2172*a*, respectively, in a rolling manner. That is, the ball 2174 functions as a constituent element that serves as a medium for transferring drive power between the second outer member 2171 and the second inner member 2172 and at the same time supports the second inner member 2172 in a manner that is possibly tilted with respect to the second outer member 2171. The ball 2174 according to the present embodiment is formed in such a manner as to have the form of a sphere and is inserted into the accommodation hole 2173a. A plurality of balls 2174 are provided and are disposed in such a manner as to be spaced a distance apart, along the circumferential direction of the second inner member 2172, from each other. The plurality of balls 2174 are individually inserted into the accommodation holes 2173a, respectively and are rotatably supported therein. Circumferences of both sides of the ball 2174 are inserted into the first groove 2171a and the second groove 2172a, respectively, and are brought into contact with inside surfaces of the first groove 2171a and the second groove 2172a, respectively, in a rolling manner.

The second outer member 2171 is rotated about the central axis of the main shaft 2150. Thus, the ball 2174 is kept in contact with the first groove 2171a and the second groove 2172a and rotates the second outer member 2171 at the same angular speed as it does the second inner member 2172. The ball 2174 is rotated in a state of being in contact with the first groove 2171a and the second groove 2172a and, when the second inner member 2172 is tilted, may stably support the second inner member 2172 with respect to the second outer member 2171.

Both sides of the second boot 2175 are coupled to the main shaft 2150 and the second outer member 2171, respectively and makes the second outer member 2171 airtight. That is, the second boot 2175 closes an open side of the second outer member 2171, and thus blocks a lubricant from being spilled out of the second outer member 2171 or prevents a foreign material from being introduced into the second outer member 2171. The second boot 2175 according to the present embodiment may be formed in such a manner to have the form of a pipe having an empty space inside. Both end portions of the second boot 2175 are coupled to an outer circumferential surface of the second outer member 2171 and the outer circumferential surface of the main shaft 2150, respectively. In this case, a separate fixation ring (not illustrated) or the like may bring both end portions of the second boot 2175 into close contact with the outer circumferential surface of the second outer member 2171 and the outer circumferential surface of the main shaft 2150 for fixation thereon. The second boot 2175 may be formed in the form of an expandable and contractable flexible corrugated pipe in such a manner as to absorb a displacement between the second outer member 2171 and the main shaft 2150 due to tilting of the second inner member 2172.

A configuration of a corner module 200 according to a third embodiment of the present disclosure will be described below.

Figure 30:
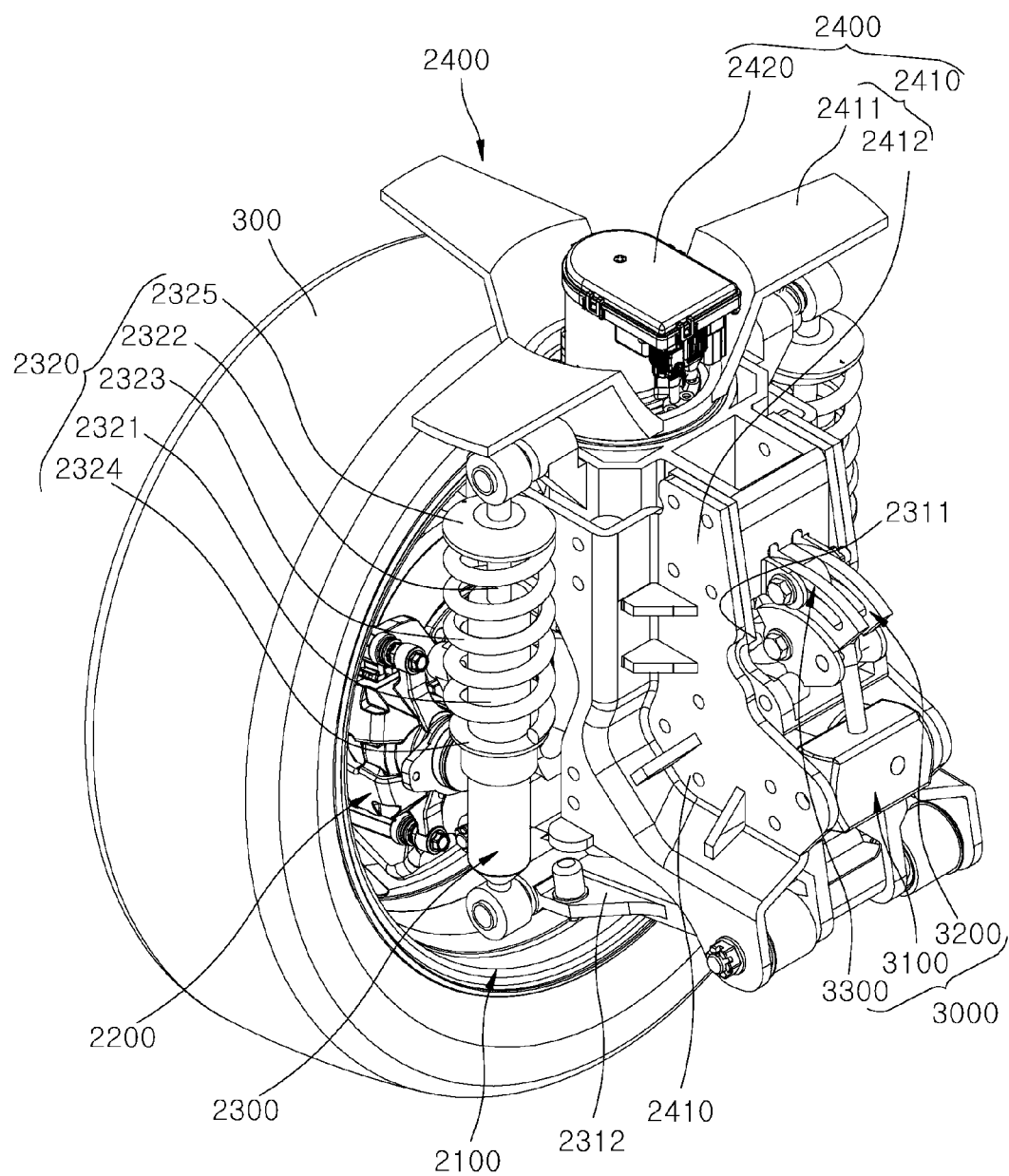
FIG. 30 is a perspective view schematically illustrating a configuration of a corner module according to a third embodiment of the present disclosure.
Figure 31:
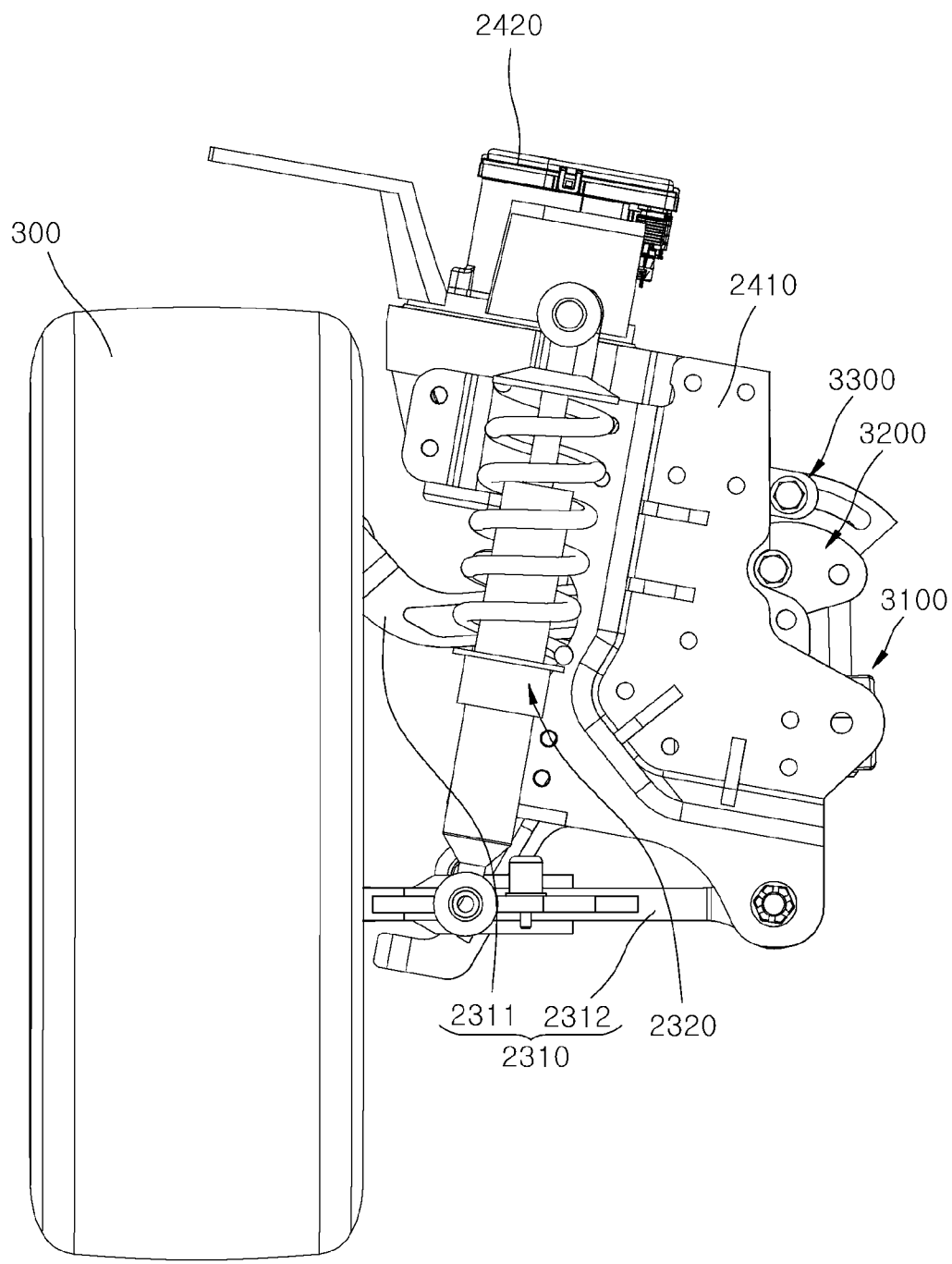
FIG. 31 is a front view schematically illustrating the configuration of the corner module according to the third embodiment of the present disclosure.
Figure 32:
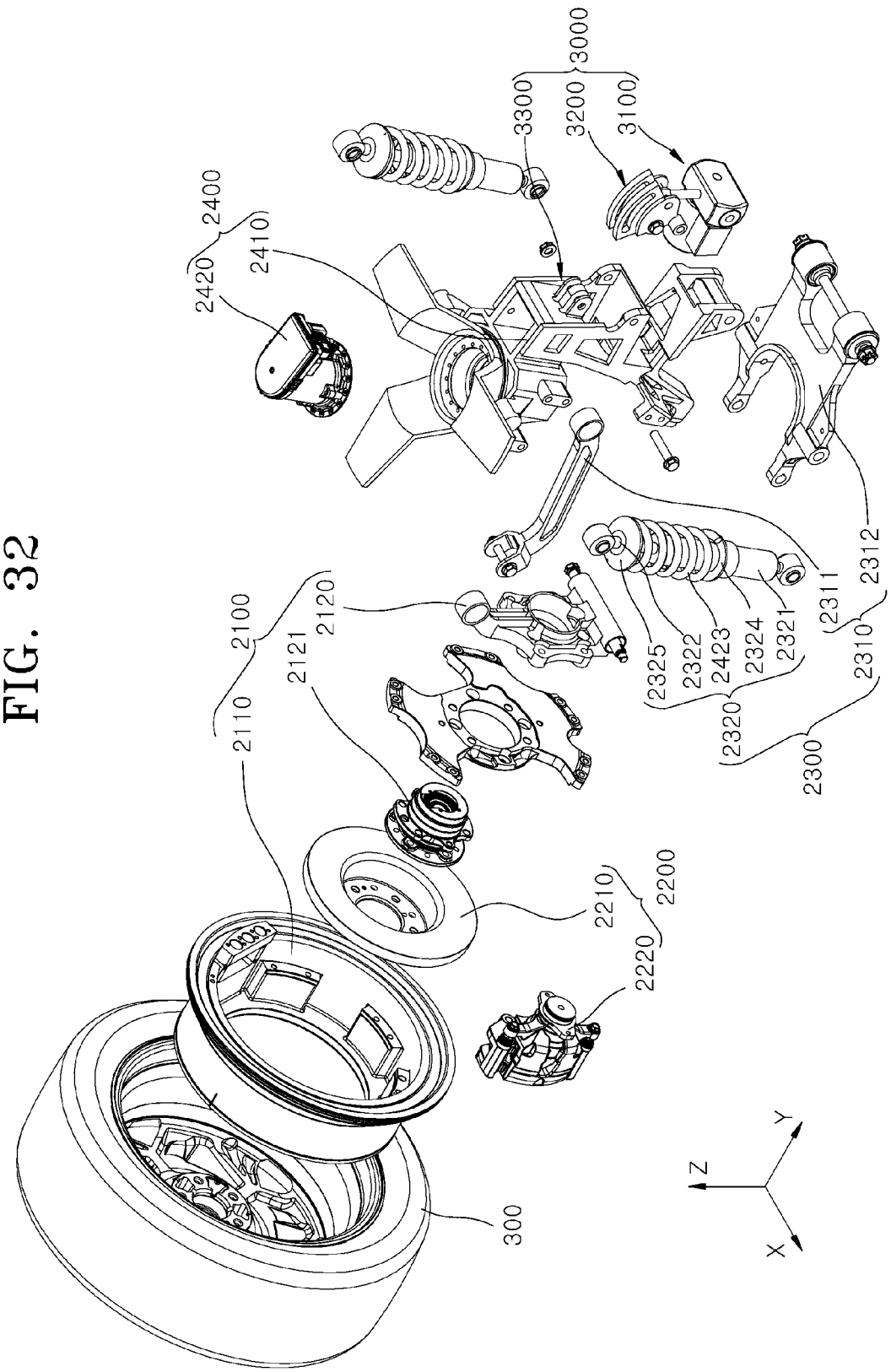
FIG. 32 is an exploded perspective view schematically illustrating the configuration of the corner module according to the third embodiment of the present disclosure.
Figure 33:
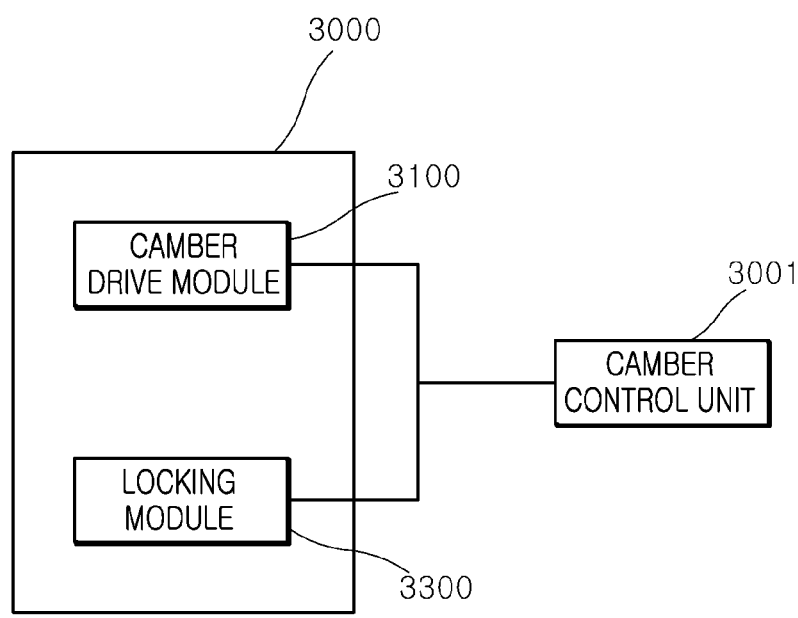
FIG. 33 is a block diagram schematically illustrating a configuration of a camber control unit according to the third embodiment of the present disclosure.

FIG. 30 is a perspective view schematically illustrating the configuration of the corner module 200 according to the third embodiment of the present disclosure. FIG. 31 is a front view schematically illustrating the configuration of the corner module 200 according to the third embodiment of the present disclosure. FIG. 32 is an exploded perspective view schematically illustrating the configuration of the corner module 200 according to the third embodiment of the present disclosure. FIG. 33 is a block diagram schematically illustrating a configuration of a camber control unit according to the third embodiment of the present disclosure.

Referring to FIGS. 30 to 33, the corner module 200 according to the third embodiment of the present disclosure includes the driving unit 2100, the braking unit 2200, the suspension unit 2300, the steering unit 2400, a camber adjustment unit 3000, and a camber control unit 3001.

The corner module 200 according to the third embodiment of the present disclosure is configured to include the camber adjustment unit 3000 and the camber control unit 3001 that are not included in the corner module 200 according to the first embodiment of the present disclosure. Therefore, only the camber adjustment unit 3000 and the camber control unit 3001 of the corner module 200 according to the third embodiment of the present disclosure that are not included in the corner module 200 according to the first embodiment of the present disclosure are described. The other constituents of the corner module 200 according to the third embodiment of the present disclosure are the same as the corresponding constituents of the corner module 200 according to the first embodiment of the present disclosure, and thus descriptions thereof are omitted.

The camber adjustment unit 3000 adjusts a camber angle of the wheel 300 by moving the first arm 2311 or the second arm 2312. An example in which the camber adjustment unit 3000 adjusts the camber angle of the wheel 300 by moving the first arm 2311 will be described below. However, the camber adjustment unit 3000 is not limited to this example. It is also possible that the camber angle of the wheel 300 is adjusted by moving the second arm 2312.

Figure 34:
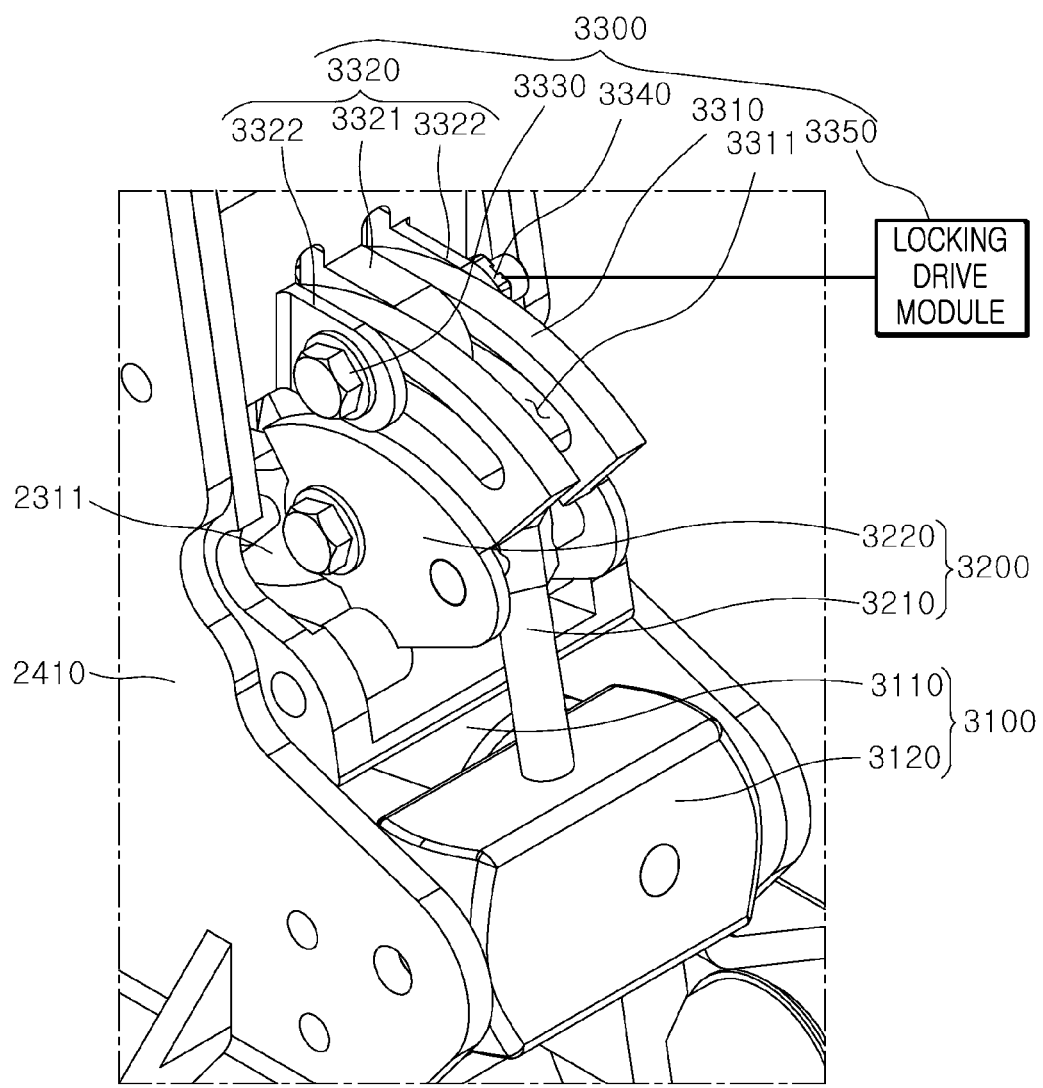
FIG. 34 is an enlarged view schematically illustrating a configuration of a camber adjustment unit according to the third embodiment of the present disclosure.
Figure 35:
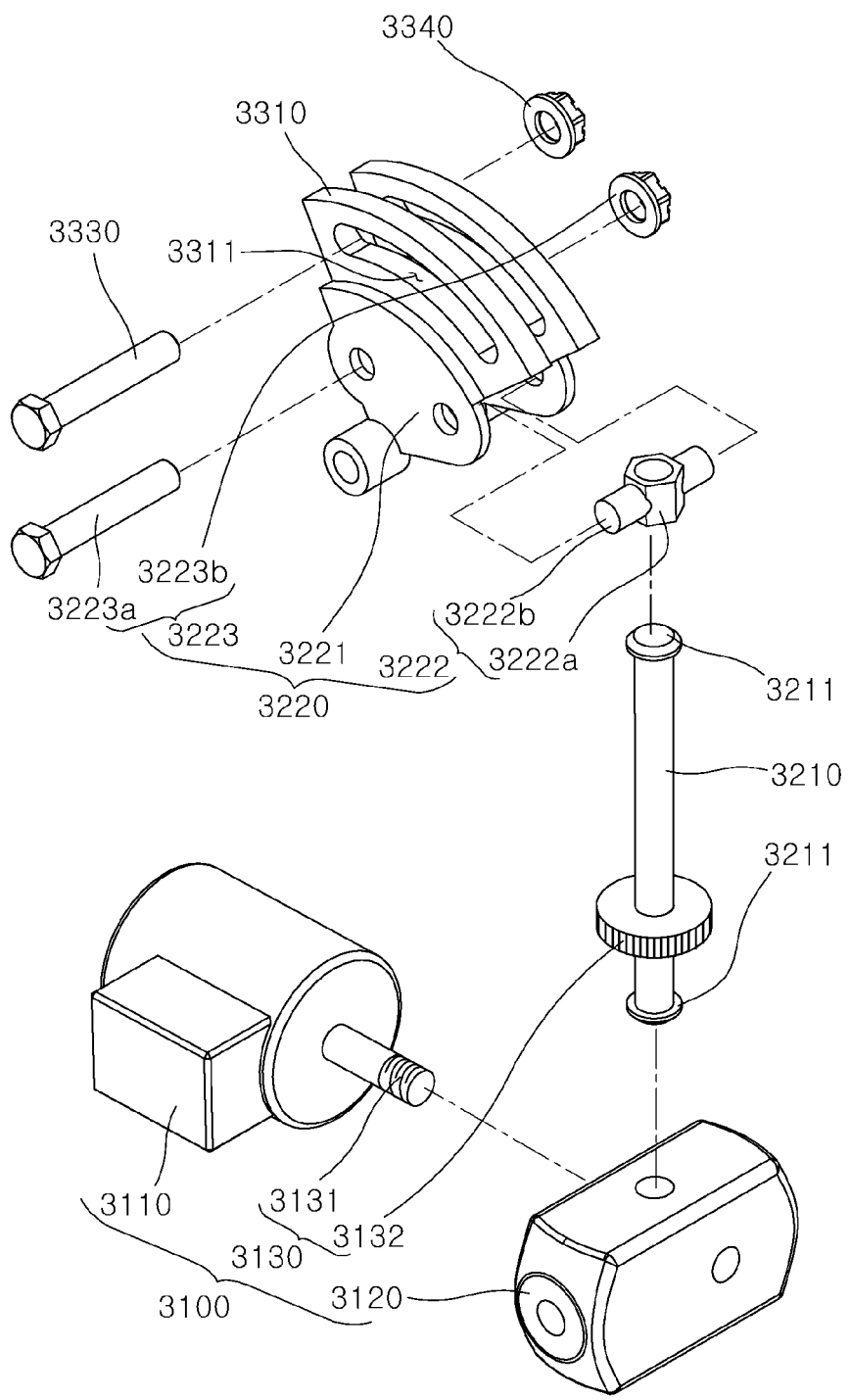
FIG. 35 is an exploded perspective view schematically illustrating the configuration of the camber adjustment unit according to the third embodiment of the present disclosure.

FIG. 34 is an enlarged view schematically illustrating a configuration of the camber adjustment unit 3000 according to the third embodiment of the present disclosure. FIG. 35 is an exploded perspective view schematically illustrating the configuration of the camber adjustment unit 3000 according to the third embodiment of the present disclosure.

Referring to FIGS. 33 and 35, the camber adjustment unit 3000 according to the present embodiment includes a camber drive module 3100, a link module 3200, and a locking module 3300.

The camber drive module 3100 is coupled to the steering unit 2400 and generates drive power for operating the link module 3200 described later.

The camber drive module 3100 according to the present embodiment includes a camber motor 3110, a motor holder 3120, and a deceleration module 3130.

The camber motor 3110 is supplied with electric power from the outside and generates rotatory power. The camber motor 3110 according to the present embodiment may be exemplified by one of various types of electric motors each of which is configured to include a stator that is supplied with electric power from the battery 400 of the vehicle or the like and thus forms a magnetic field, and a rotor that is rotated by electromagnetic interaction with the stator and rotates an output shaft.

The motor holder 3120 is coupled to the steering unit 2400 and supports the camber motor 3110 and a thread rod 3210 described later with respect to the steering unit 2400. The motor holder 3120 according to the present embodiment may be formed in such a manner as to have the form of a case having an empty space inside. One surface of the motor holder 3120 is integrally coupled to the camber motor 3110 using the fastening method, such as welding or bolting. An output shaft of the camber motor 3110 is inserted into the motor holder 3120 in a manner that passes through one surface of the motor holder 3120.

The motor holder 3120 is disposed inside the steering main body 2410, more specifically, inside the second steering main body 2412, and both sides thereof are rotatably connected to an inside surface of the second steering main body 2412 with a pin or like in between. In this case, the motor holder 3120 may be supported in a manner that is rotatable about a direction parallel to a length direction of the vehicle. When a pivot bracket 3220 described later reciprocates, the motor holder 3120 is rotated about the steering main body 2410 and varies installation angles of the camber motor 3110 and the thread rod 3210. Accordingly, the motor holder 3120 may prevent the camber motor 3110 and the thread rod 3210 from being damaged due to torque that is generated when the pivot bracket 3220 reciprocates.

The deceleration module 3130 is installed inside the motor holder 3120 and transfers rotary power generated from the camber motor 3110 to the link module 3200, more specifically, to the thread rod 3210.

The deceleration module 3130 according to the present embodiment includes a first speed reduction gear 3131 and a second speed reduction gear 3132.

The first speed reduction gear 3131 is connected to the output shaft of the camber motor 3110 and thus is rotated. The first speed reduction gear 3131 according to the present embodiment, as illustrated in FIG. 35, may be formed in such a manner as to substantially have the form of a cylinder and may be connected directly to the output shaft of the camber motor 3110. Alternatively, it is also possible that the first speed reduction gear 3131 is connected indirectly to the output shaft of the camber motor 3110 with a separate gear or the like in between.

The second speed reduction gear 3132 is engaged with the first speed reduction gear 3131 for being coupled thereto and is rotated together with the thread rod 3210 described later. The second speed reduction gear 3132 according to the present embodiment, as illustrated in FIG. 35, may be formed in such a manner as to substantially have the form of a ring, and an inner circumferential surface thereof may be connected directly to the outer circumferential surface of the thread rod 3210. Alternatively, it is also possible that the second speed reduction gear 3132 is connected indirectly to the thread rod 3210 with a separate gear or the like in between.

The first speed reduction gear 3131 and the second speed reduction gear 3132 are disposed in such a manner that the central axes thereof are not aligned with each other. More specifically, the first speed reduction gear 3131 and the second speed reduction gear 3132 may be exemplified by gears that are engaged with each other in a state where the central axes thereof are orthogonal to each other. For example, the first speed reduction gear 3131 may be exemplified by a worm gear, and the second speed reduction gear 3132 may be exemplified by a worm wheel. Alternatively, it is also possible that the first speed reduction gear 3131 is exemplified by a hypoid pinion gear and that the second speed reduction gear 3132 is exemplified by a hypoid ring gear. Accordingly, the first speed reduction gear 3131 and the second speed reduction gear 3132 allow transfer of rotatory power from the camber motor 3110 to the thread rod 3210 and at the same time block transfer of rotatory power from the thread rod 3210 to the camber motor 3110. Thus, when the camber motor 3110 stops operating, a phenomenon where the thread rod 3210 operates reversely can be prevented.

The link module 3200 is connected to the camber drive module 3100 and moves backward and backward the first arm 2311 or the second arm 2312 in conjunction with drive power generated from the camber drive module 3100, thereby adjusting the camber angle of the wheel 300.

The link module 3200 according to the present embodiment includes the thread rod 3210 and the pivot bracket 3220.

The thread rod 3210 is connected to the camber drive module 3100. The thread rod 3210 is supplied with drive power from the camber drive module 3100, and thus is rotated about the central axis thereof. The thread rod 3210 according to the present embodiment may be formed in the form of a bar substantially having a circular cross section. A lower end portion of the thread rod 3210 is inserted into the motor holder 3120 in such a manner as to pass through the motor holder 3120 vertically from an upper surface thereof to a lower surface thereof. The second speed reduction gear 3132 integrally coupled to an outer circumferential surface of the thread rod 3210 is engaged with the first speed reduction gear 3131 for being coupled thereto. Thus, the thread rod 3210 is rotatably supported inside the motor holder 3120. A screw thread that extends in the form of a helix along a length direction of the thread rod 3210 is formed on the outer circumferential surface of the thread rod 3210.

A stopper 3211 is formed on the thread rod 3210. The stopper 3211 prevents the thread rod 3210 from deviating from the camber drive module 3100 and the pivot bracket 3220 described later. The stoppers 3211 according to the present embodiment are provided in one pair and are disposed on both end portions, respectively, of the thread rod 3210. The stopper 3211 is formed in a manner that has a greater diameter than the thread rod 3210. The stoppers 3211 in one pair may be detachably coupled to both end portions, respectively, of the thread rod 3210, using the thread connection or in a manner that is inserted for coupling.

One stopper 3211 of the stoppers 3211 in one pair that is disposed on the lower end portion of the thread rod 3210 is disposed in a manner that faces a lower surface of the motor holder 3120. The other stopper 3211 of the stoppers 3211 in one pair that is disposed on an upper end portion of the thread rod 3210 is disposed in a manner that faces the pivot bracket 3220 described later, more specifically, an upper surface of a first conversion unit 3222.

The pivot bracket 3220 is connected to the thread rod 3210 and reciprocates along a direction of rotation of the thread rod 3210.

While reciprocating, the pivot bracket 3220 adjusts the camber angle of the wheel 300 by pushing or pulling any one of the first arm 2311 and the second arm 2312 toward the width direction of the vehicle.

The pivot bracket 3220 according to the present embodiment includes a pivot body 3221, the first conversion unit 3222, and a second conversion unit 3223.

The pivot body 3221 forms a schematic external appearance of the pivot bracket 3220 and is installed in a manner that is bi-directionally rotatable about the steering unit 2400. The pivot body 3221 according to the present embodiment may be formed in the form of a sector in such a manner that a lower end portion thereof is smaller in width than an upper end portion thereof. The pivot body 3221 is disposed in a manner that is spaced a distance away from the upper end portion of the thread rod 3210 inside the steering main body 2410, more specifically, inside the second steering main body 2412. A lower end portion of the pivot body 3221 is rotatably connected to the second steering main body 2412, with a pin or the like in between, in such a manner that the pivot body 3221 may pivot about the lower end portion thereof. In this case, like the motor holder 3120, the pivot body 3221 may be supported in a manner that is rotatable about a direction parallel to a length direction of the vehicle.

The first conversion unit 3222 is disposed on one side of the pivot body 3221 and is connected to the thread rod 3210. When the thread rod 3210 is rotated, the first conversion unit 3222 is moved in a straight line along the length direction of the thread rod 3210 and thus rotates the pivot body 3221.

The first conversion unit 3222 according to the present embodiment includes a first conversion member 3222a and a first conversion support unit 3222b.

The first conversion member 3222a forms an external appearance of a center portion of the first conversion unit 3222 and converts an axial rotational motion of the thread rod 3210 into a pivoting motion of the pivot body 3221. The first conversion member 3222a according to the present embodiment is formed in such a manner as to have the form of a hollow cylinder and is disposed inside one side (the right side in FIG. 35) of the pivot body 3221. A screw thread is formed on an inner circumferential surface of the first conversion member 3222a. The inner circumferential surface of the first conversion member 3222a is coupled to the outer circumferential surface of the thread rod 3210 using the thread connection. Accordingly, when the thread rod 3210 undergoes a rotational motion, the first conversion member 3222a may reciprocate in a straight line along a length direction of the thread rod 3210.

The first conversion support unit 3222b extends from the first conversion member 3222a and is rotatably connected to one side of the pivot body 3221. The first conversion support unit 3222b according to the present embodiment may be formed in such a manner as to have the form of a pair of cylinders that extend toward both sides, respectively, of the first conversion member 3222a. In this case, the first conversion support unit 3222b may extend from an outside surface of the first conversion member 3222a in a direction parallel to the length direction of the vehicle. The first conversion support unit 3222b passes through an inside surface of the pivot body 3221 and rotatably supports the first conversion member 3222a relatively to the pivot body 3221. Accordingly, when the thread rod 3210 undergoes the rotational motion, the first conversion support unit 3222b may guide smooth moving of the first conversion member 3222a in a straight line along the length direction of the thread rod 3210 without axially rotating the first conversion member 3222a together with the thread rod 3210.

The second conversion unit 3223 is disposed on the other side of the pivot body 3221 and is connected to the first arm 2311 or the second arm 2312, thereby transferring rotatory power of the pivot body 3221 to the first arm 2311 or the second arm 2312. The second conversion unit 3223 rotatably supports an end portion of the first arm 2311 or the second arm 2312 with respect to the other side of the pivot body 3221 and thus converts a rotational motion of the pivot body 3221 into a backward-forward motion of the first arm 2311 or the second arm 2312.

The second conversion unit 3223 according to the present embodiment may include a second conversion member 3223a and a second conversion support unit 3223b. The second conversion member 3223a has the form of a bolt and passes through an end portion of the first arm 2311 and the other side (the left side in FIG. 35) of the pivot body 3221. The second conversion support unit 3223b has the form of a nut and is fastened to an end portion of the second conversion member 3223a. The second conversion member 3223a is disposed in the direction parallel to the length direction of the vehicle.

The locking module 3300 is installed in a manner that possibly interferes with rotation of the pivot body 3221 and selectively restricts the rotation of the pivot body 3221. Accordingly, in a case where the thread rod 3210, the first conversion unit 3222, or the like is damaged and thus where the pivoting motion of the pivot body 3221 is difficult to control, the locking module 3300 may prevent the camber angle of the wheel 300 from being unnecessarily changed, by fixing the pivot body 3221 to a setting angle.

Figure 36:
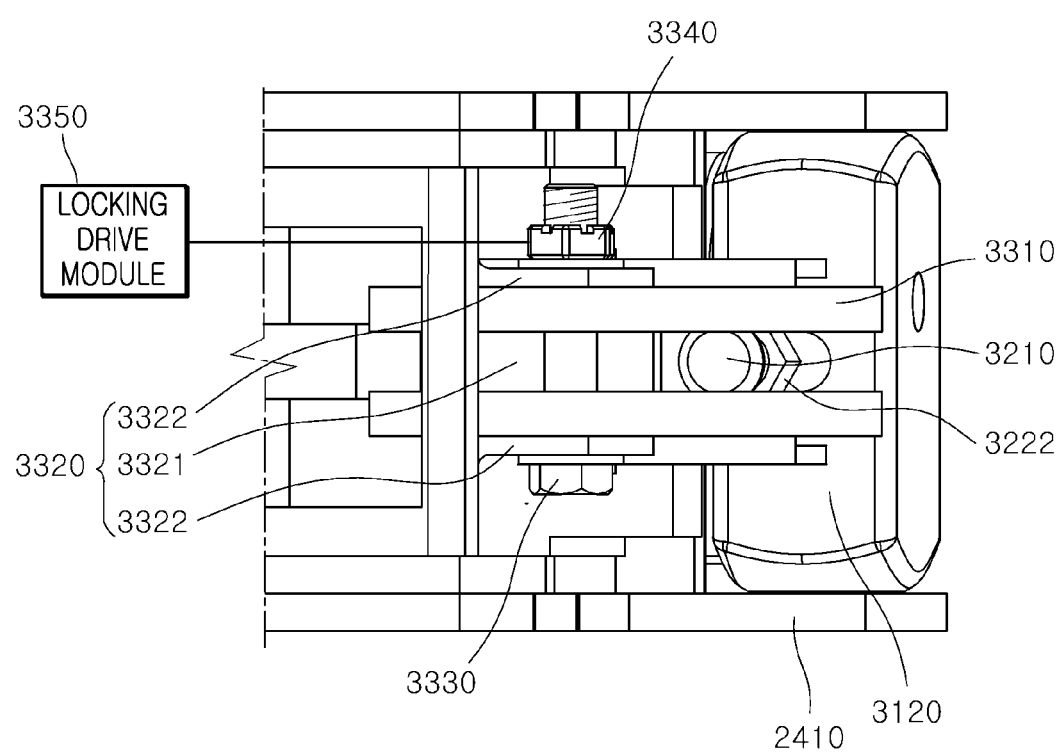
FIG. 36 is a plan view schematically illustrating a configuration of a locking module according to the third embodiment of the present disclosure.
Figure 37:
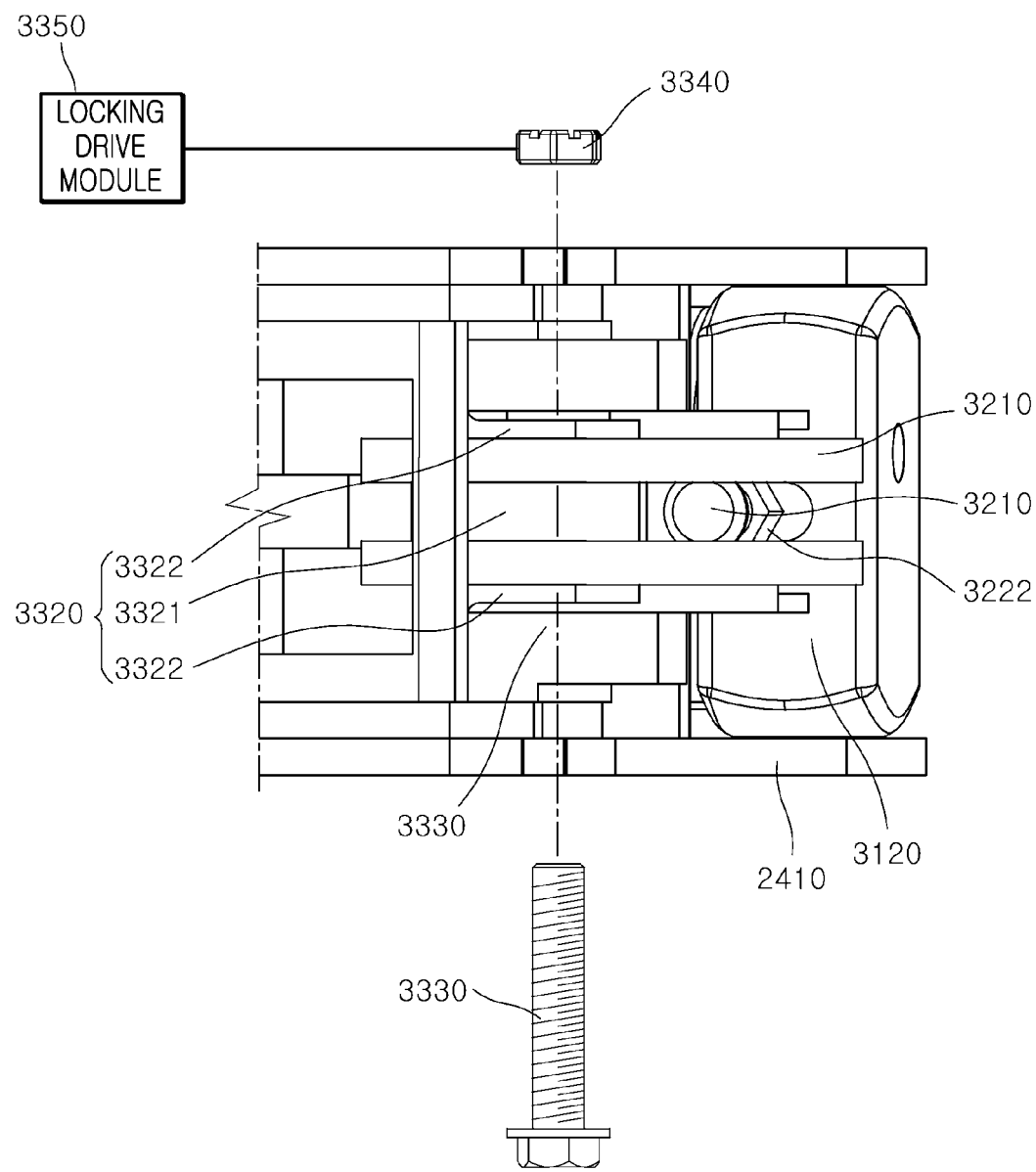
FIG. 37 is an exploded view schematically illustrating the configuration of the locking module according to the third embodiment of the present disclosure.

FIG. 36 is a plan view schematically illustrating a configuration of the locking module 3300 according to the third embodiment of the present disclosure. FIG. 37 is an exploded view schematically illustrating the configuration of the locking module 3300 according to the third embodiment of the present disclosure.

Referring to FIGS. 34 to 37, the locking module 3300 according to the present embodiment includes a guide unit 3310, a locking bracket 3320, a first locking member 3330, a second locking member 3340, and a locking drive module 3350.

The guide unit 3310 extends from the pivot body 3221, is connected to the first locking member 3330 described later, and guides the rotational motion of the pivot body 3221. The guide unit 3310 according to the present embodiment may be formed in the form of a plate in such a manner as to extend from an upper end portion of the pivot body 3221 in a radial direction of the pivot body 3221. The guide units 3310 are provided in one pair and are disposed in such a manner as to be spaced a predetermined distance apart in an axial direction of the pivot body 3221, from each other.

A guide rail 3311 into which the first locking member 3330 described later is inserted is formed on the guide unit 3310. The guide rail 3311 according to the present embodiment may be formed in the form of a hole in such a manner as to pass through the guide unit 3310 along the axial direction of the pivot body 3221. The guide rail 3311 extends in a manner that is curved at a curvature corresponding to a rotational curvature of the pivot body 3221. Accordingly, when the pivot body 3221 is rotated, the guide rail 3311 may guide smooth moving of the first locking member 3330 inside the guide rail 3311.

The locking bracket 3320 extends from the steering unit 2400 and is disposed in a manner that faces the guide unit 3310.

The locking bracket 3320 according to the present embodiment includes a first locking bracket 3321 and a second locking bracket 3322.

The first locking bracket 3321 is formed in the form of a plate in such a manner as to extend from the steering main body 2410, more specifically, from the second steering main body 2412 and is disposed between the guide units 3310 in one pair. The first locking bracket 3321 is disposed in such a manner that both-side surfaces thereof face inside surfaces of the guide units 3310, respectively, in one pair. In this case, the first locking bracket 3321 may be disposed in such a manner as to be spaced a predetermined distance away from an inside surface of the guide unit 3310 in order not to interfere with the rotation of the pivot body 3221 when the locking module 3300 does not operate.

The second locking bracket 3322 is formed in the form of a plate in such a manner as to extend from the steering main body 2410 and is disposed in such a manner as to be spaced a distance away from the first locking bracket 3321 in the axial direction of the pivot body 3221. The second locking bracket 3322 is disposed in such a manner that an inside surface thereof faces an outside surface of the guide unit 3310. The second locking brackets 3322 may be provided in one pair and may be disposed in such a manner that inside surfaces thereof face outside surfaces, respectively, of the guide units 3310 in one pair. In this case, the first locking bracket 3321 may be disposed in such a manner as to be spaced a predetermined distance away from the outside surface of the guide unit 3310 in order not to interfere with the rotation of the pivot body 3221 when the locking module 3300 does not operate.

The second locking bracket 3322 may be formed of an elastically transformable material, such as plastic. Accordingly, with fastening forces of the first locking member 3330 and the second locking member 3340 that will be described later, the second locking bracket 3322 may be brought into close contact with the outside surface of the guide unit 3310, thereby generating a frictional force. Thus, the rotation of the pivot body 3221 may be restricted.

In this case, the guide units 3310 in one pair may also be formed of an elastically transformable material, such as plastic. Accordingly, with the fastening forces of the first locking member 3330 and the second locking member 3340 that will be described later, outside surface and inside surfaces of the guide unit 3310 may be brought into close contact with an inside surface of the second locking bracket 3322 and both-side surfaces of the first locking bracket 3321, respectively, thereby generating a greater frictional force. Thus, the rotation of the pivot body 3221 can be restricted more effectively.

The first locking member 3330 passes through the locking bracket 3320 and is inserted into the guide rail 3311. A screw thread may be formed on an outer circumferential surface of the first locking member 3330 according to the present embodiment, and the first locking member 3330 may be formed in the form of a bolt in such a manner as to have a head on one end portion thereof. The first locking member 3330 passes through any one of the second locking brackets 3322 and is inserted into the guide rail 3311, and the other end portion of the first locking member 3330 protrudes out of the other one of the second locking brackets 3322. When the pivot body 3221 is rotated, the first locking member 3330 guides moving of the guide unit 3310 along a length direction of the guide rail 3311 and thus guides the rotation of the pivot body 3221.

The second locking member 3340 is fastened to, or separated from, the first locking member 3330 and restricts or allows a relative movement of the guide unit 3310 to the locking bracket 3320. The second locking member 3340 according to the present embodiment may have the form of a nut having a screw thread formed on an inner circumferential surface thereof. An inner circumferential surface of the second locking member 3340 is coupled to the outer circumferential surface of the first locking member 3330 using the thread connection. The second locking member 3340 is rotated to one side and thus brings the locking bracket 3320 and the guide unit 3310 into close contact with each other. More specifically, when rotated to one side, the second locking member 3340 is fastened to the first locking member 3330, applies a pressing force to the second locking bracket 3322, and brings the guide unit 3310, the first locking bracket 3321, and the second locking bracket 3322 into close contact with each other. In addition, when rotated to the other side, the second locking member 3340 is separated from the first locking member 3330, no longer applies the pressing force to the second locking bracket 3322, and separates the guide unit 3310, the first locking bracket 3321, and the second locking bracket 3322 from each other.

The locking drive module 3350 is connected to any one of the first locking member 3330 and the second locking member 3340, generates drive power, and thus adjusts a fastened state of the second locking member 3340 and the first locking member 3330. An example in which the connection of the locking drive module 3350 is connected to the second locking member 3340 will be described below. Alternatively, it is also possible that the locking drive module 3350 is connected to the first locking member 3330. The locking drive module 3350 according to the present embodiment may be exemplified by an electric motor or the like that is supplied with electric power from the outside and thus generates rotatory power. The locking drive module 3350 may be coupled to the steering main body 2410, more specifically, to the second steering main body 2412 and may be supported thereon. An output shaft of the locking drive module 3350 may be connected to the second locking member 3340 with a transmission gear (not illustrated) in between and thus may rotate the second locking member 3340 about the central axis thereof. In this case, gear teeth may be formed on an outer circumferential surface of the second locking member 3340 in such a manner as to be engaged with the transmission gear. Accordingly, the second locking member 3340 may be fastened to, or separated from, the first locking member 3330 in conjunction with drive power generated from the locking drive module 3350.

The camber control unit 3001 is connected to the camber adjustment unit 3000 and controls overall operation of the camber adjustment unit 3000.

That is, when the vehicle drives around, the camber control unit 3001 controls operation of the camber adjustment unit 3000, more specifically, operation of the camber drive module 3100 in such a manner that the camber angle of the wheel 300 varies in the direction of canceling out a slope of the wheel 300 due to lateral acceleration. Accordingly, the camber control unit 3001 may improve driving stability by increasing a tractive force of the wheel 300 when the vehicle drives around.

In addition, the camber control unit 3001 controls the operation of the camber adjustment unit 3000, more specifically, the operation of the locking module 3300 in such a manner as to selectively restrict the rotation of the pivot body 3221 according to whether or not the thread rod 3210, the first conversion unit 3222, or the like is damaged. Accordingly, in a case where the link module 3200 does not function properly due to damage to the thread rod 3210 or the first conversion unit 3222 or for other reasons, the camber control unit 3001 can prevent the camber angle of the wheel 300 from varying arbitrarily and thus can prevent the driving stability from being decreased.

The camber control unit 3001 according to the present embodiment may be exemplified by an electric circuit, a processor, or the like that receives an input signal from a user, an ECU of the vehicle, or the like and generates various types of control signals that determine whether the camber motor 3110 and the locking drive module 3350 are turned on or off, and adjust magnitudes, directions, or the like of drive power generated from the camber motor 3110 and the locking drive module 3350.

Operation of the corner module 200 according to the third embodiment of the present disclosure will be described in detail below.

Figure 38:
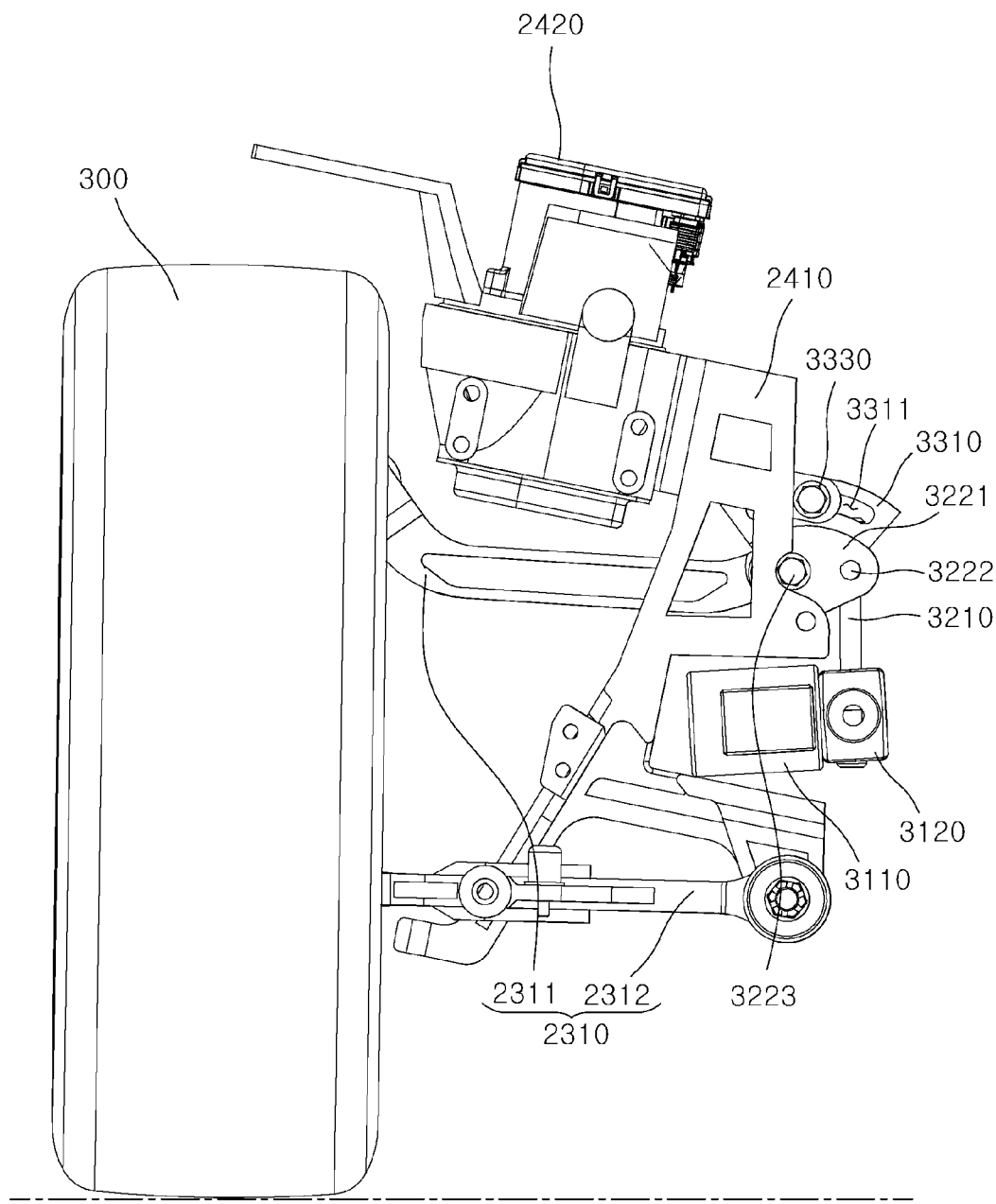
FIG. 38 is a view schematically illustrating a state where a camber angle of a wheel is kept at a neutral state by the corner module according to the third embodiment of the present disclosure.
Figure 39:
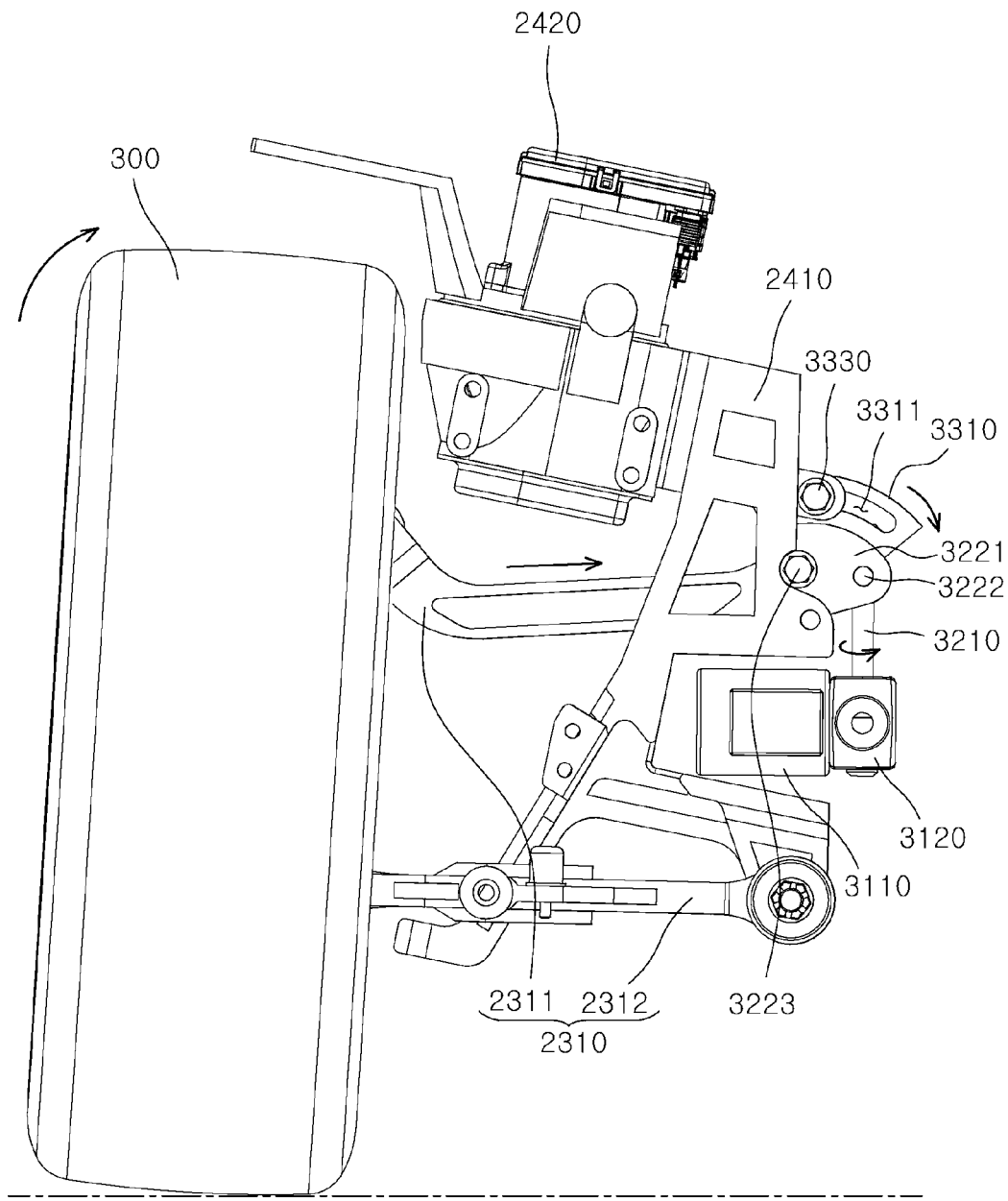
FIG. 39 is a view schematically illustrating an operation in which the corner module according to the third embodiment of the present disclosure makes an adjustment in such a manner that the wheel has a negative camber angle.
Figure 40:
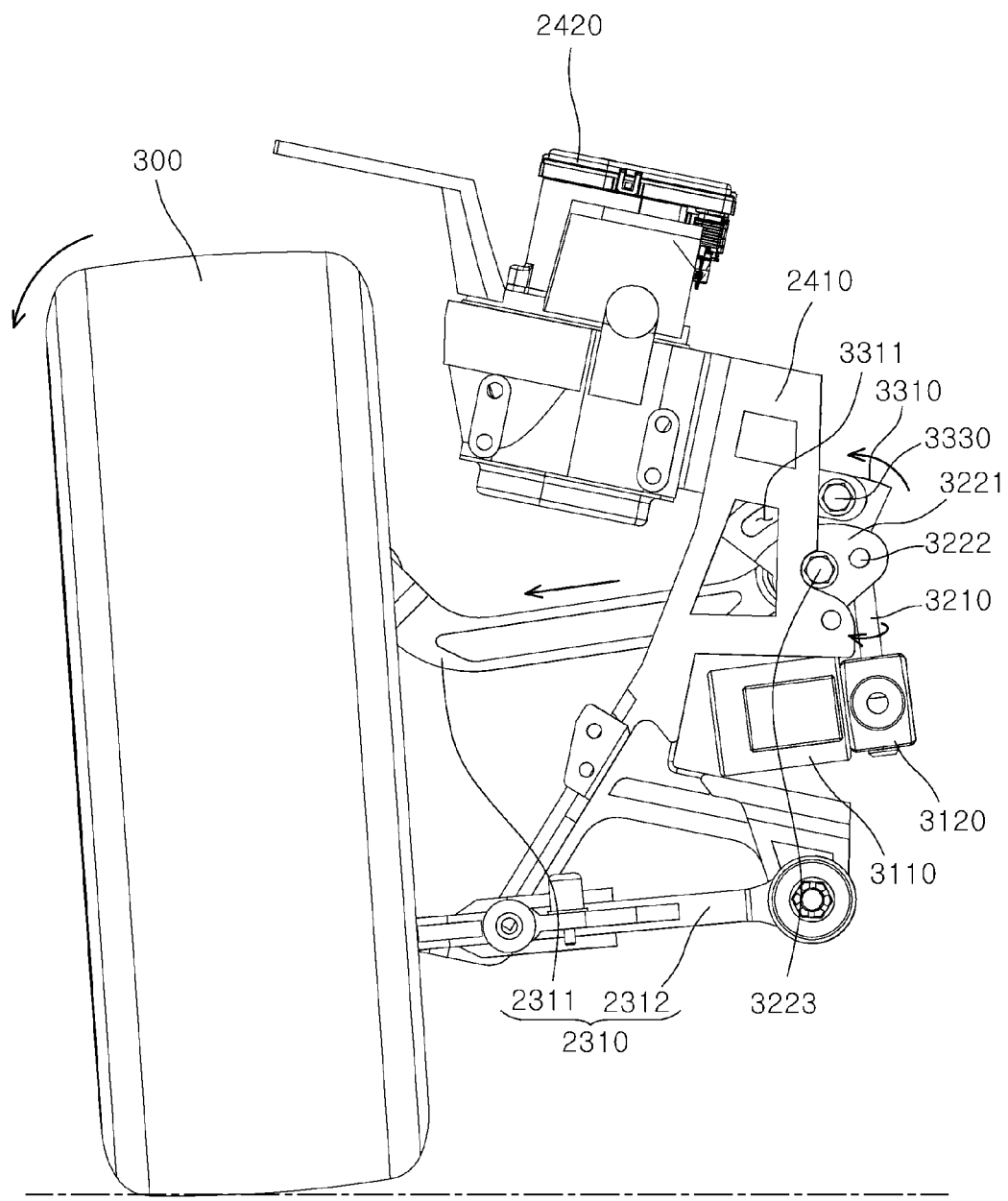
FIG. 40 is a view schematically illustrating an operation in which the corner module according to the third embodiment of the present disclosure makes an adjustment in such a manner that the wheel has a positive camber angle.

FIG. 38 is a view schematically illustrating a state where the camber angle of the wheel 300 is kept at a neutral state by the corner module 200 according to the third embodiment of the present disclosure. FIG. 39 is a view schematically illustrating an operation in which the corner module 200 according to the third embodiment of the present disclosure makes an adjustment in such a manner that the wheel 300 has a negative camber angle. FIG. 40 is a view schematically illustrating an operation in which the corner module 200 according to the third embodiment of the present disclosure makes an adjustment in such a manner that the wheel 300 has a positive camber angle.

At this point, the camber angle at the neural state means a state where the wheel 300 is perpendicular to the ground, the negative camber angle means a state where an upper end portion of the wheel 300 is inclined toward the inside in the width direction of the vehicle with respect to the ground, and the negative camber angle means a state where the upper end portion of the wheel 300 is inclined toward the outside in the width direction of the vehicle with respect to the ground.

Referring to FIGS. 38 and 39, in a case where an adjustment is made in such a manner that the wheel 300 has the negative camber angle, the camber control unit 3001 receives the input signal from the user or the ECU of the vehicle and operates the camber motor 3110 of the camber drive module 3100.

The thread rod 3210 is supplied with rotatory power generated from the camber motor 3110, through the deceleration module 3130 and is rotated clockwise (as illustrated in FIG. 39) about the central axis thereof.

The first conversion member 3222a that is coupled to the thread rod 3210 using the thread connection is moved downward along the length direction of the thread rod 3210 in conjunction with the rotation of the thread rod 3210.

When the first conversion member 3222a is moved downward, the first conversion support unit 3222b pulls downward a right-side end portion (illustrated in FIG. 39) of the pivot body 3221 and thus rotates the pivot body 3221 in a clockwise direction (illustrated in FIG. 39).

The second conversion unit 3223 is rotated in the clockwise direction, together with the pivot body 3221 and pulls an end portion of the first arm 2311 toward the inside in the width direction of the vehicle.

With a tensile force applied from the second conversion unit 3223, the first arm 2311 is moved toward the inside in the width direction of the vehicle, and with this movement of the first arm 2311, the upper end portion of the wheel 300 is inclined toward the inside in the width direction of the vehicle, thereby forming the negative camber angle.

Referring to FIGS. 38 and 40, in a case where an adjustment is to be made in such a manner that the wheel 300 has the positive camber angle, the camber control unit 3001 receives the input signal from the user or the ECU of the vehicle and operates the camber motor 3110 of the camber drive module 3100.

The thread rod 3210 is supplied with the rotatory power generated from the camber motor 3110, through the deceleration module 3130 and is rotated counterclockwise (as illustrated in FIG. 40) about the central axis thereof.

The first conversion member 3222a that is coupled to the thread rod 3210 using the thread connection is moved upward along the length direction of the thread rod 3210 in conjunction with the rotation of the thread rod 3210.

When the first conversion member 3222a is moved upward, the first conversion support unit 3222b pulls upward a right-side end portion (illustrated in FIG. 40) of the pivot body 3221 and thus rotates the pivot body 3221 in a counterclockwise direction (illustrated in FIG. 40).

The second conversion unit 3223 is rotated in the counterclockwise direction, together with the pivot body 3221 and pulls the end portion of the first arm 2311 toward the outside in the width direction of the vehicle. With a pressing force applied from the second conversion unit 3223, the first arm 2311 is moved toward the outside in the width direction of the vehicle, and with this movement of the first arm 2311, the upper end portion of the wheel 300 is inclined toward the outside in the width direction of the vehicle, thereby forming the positive camber angle.

Figure 41:
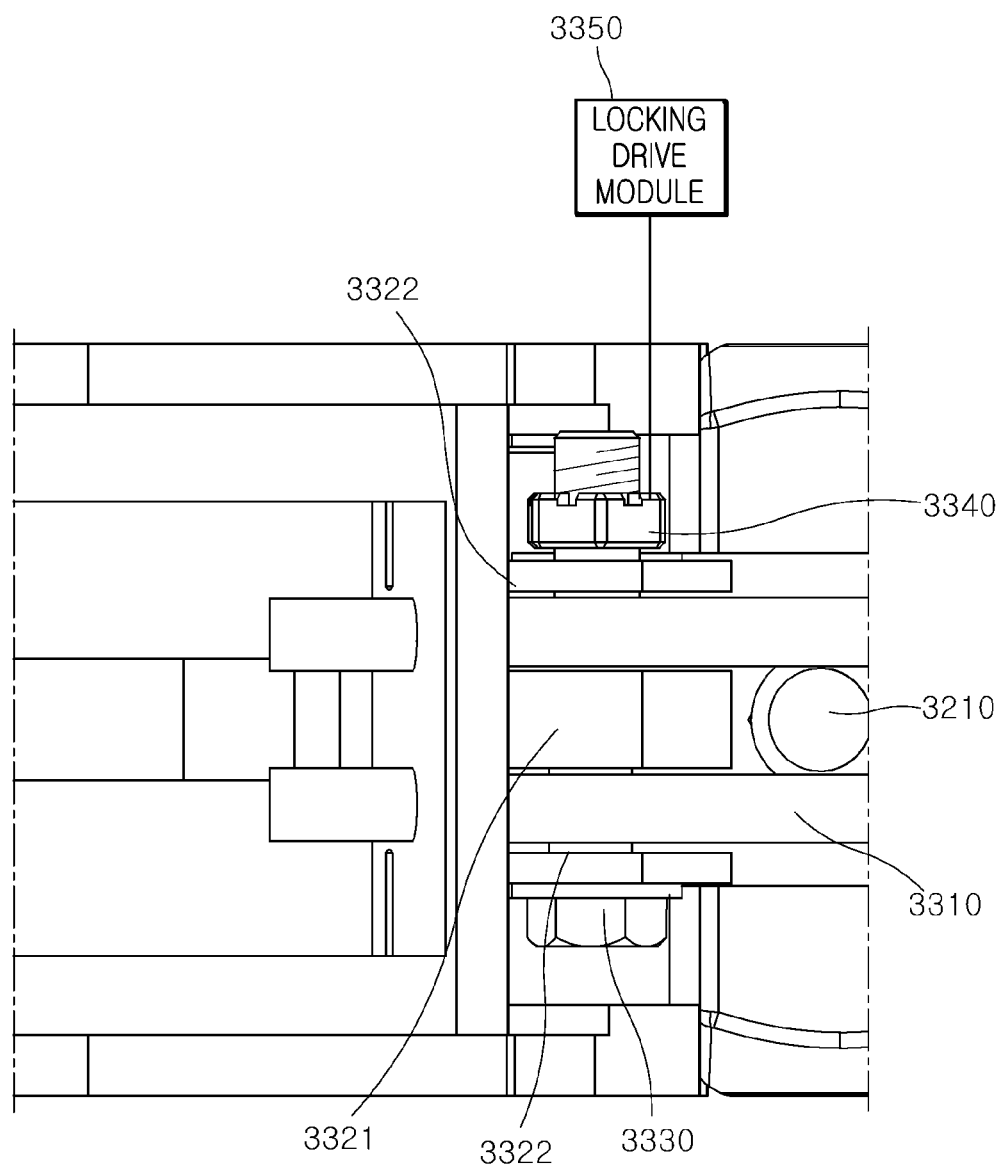
FIGS. 41 and 42 are views schematically illustrating an operating state of the locking module according to the third embodiment of the present disclosure.
Figure 42:
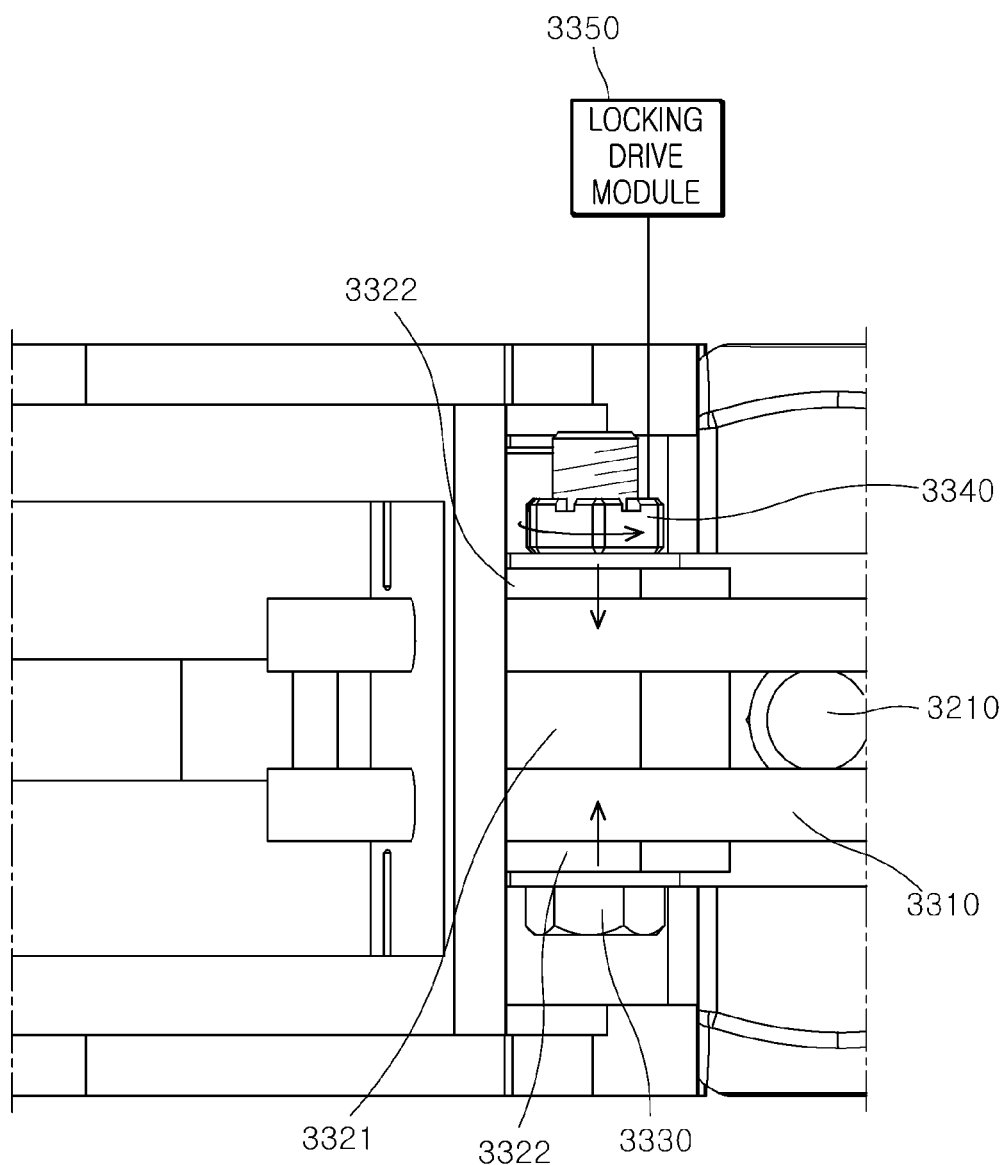

FIGS. 41 and 42 are views schematically illustrating an operating state of the locking module 3300 according to the third embodiment of the present disclosure.

Referring to FIGS. 41 and 42, in the case where the link module 3200 does not function properly due to damage to the thread rod 3210 or the first conversion unit 3222 or for other reasons, the camber control unit 3001 receives the input signal from the user or the ECU of the vehicle and operates the locking drive module 3350 in such a manner that the second locking member 3340 is rotated in the direction (in the counterclockwise direction in FIG. 42) of being fastened to the first locking member 3330.

When the second locking member 3340 is rotated a preset number of times or greater, an inside surface thereof is brought into contact with an outside surface of the second locking bracket 3322, and the first locking member 3330 and the second locking member 3340 press against the outside surfaces of the second locking brackets 3322 in one pair.

The second locking brackets 3322 in one pair are transformed with pressing forces applied from the first locking member 3330 and the second locking member 3340 and are brought into close contact with the outside surfaces, respectively, of the guide units 3310 in one pair.

In the case, the guide units 3310 in one pair are also transformed with the pressing force applied from the second locking bracket 3322, and inside surfaces thereof are brought into close contact with both-side surfaces, respectively, of the first locking bracket 3321.

Accordingly, a frictional force is generated between the guide unit 3310 and the first locking bracket 3321 and between the guide unit 3310 and the second locking bracket 3322. This frictional force cancels out the rotatory power of the pivot body 3221 and restricts the rotation of the pivot body 3221.

Subsequently, in a case where the link module 3200 resumes functioning properly after component replacement or the like, the camber control unit 3001 operates the locking drive module 3350 in such a manner that the locking module 3300 performs an operation of reversing the above-described operation, thereby allowing the rotation of the pivot body 3221.

Operation of the corner module 200 according to the third embodiment of the present disclosure that corresponds to a situation where the vehicle travels will be described in detail below.

Figure 43A:
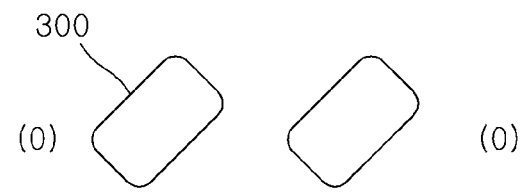
FIGS. 43A and 43B are views schematically illustrating a state where a vehicle travels straight.
Figure 43A:
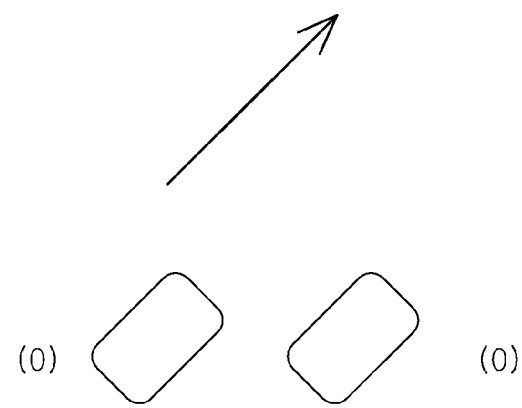
Figure 43B:
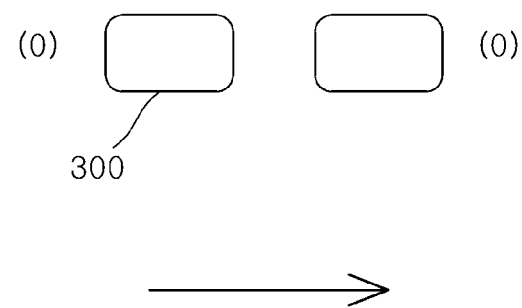
Figure 43B:
Figure 44A:
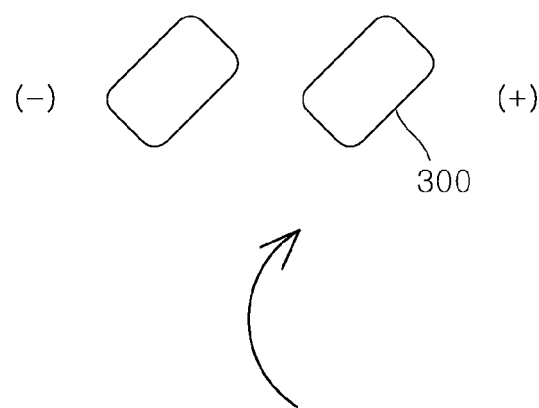
FIGS. 44A and 44B are views schematically illustrating a state where the vehicle drives around.
Figure 44B:
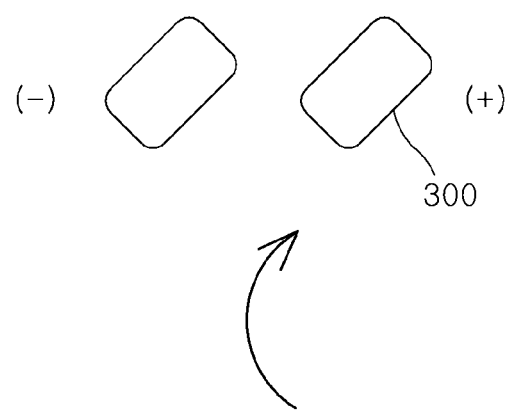
Figure 45:
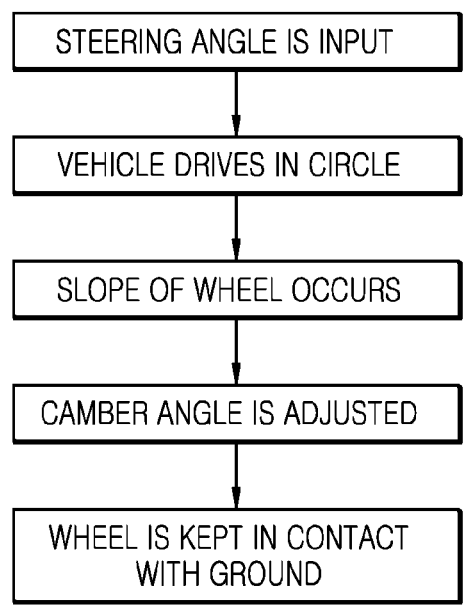
FIG. 45 is a flowchart schematically illustrating a process of adjusting the camber angle of the wheel when the vehicle drives around.

FIGS. 43A and 43B are views schematically illustrating a state where the vehicle travels straight. FIGS. 44A and 44B are views schematically illustrating a state where the vehicle drives around. FIG. 45 is a flowchart schematically illustrating a process of adjusting the camber angle of the wheel 300 when the vehicle drives around.

Figure 46:
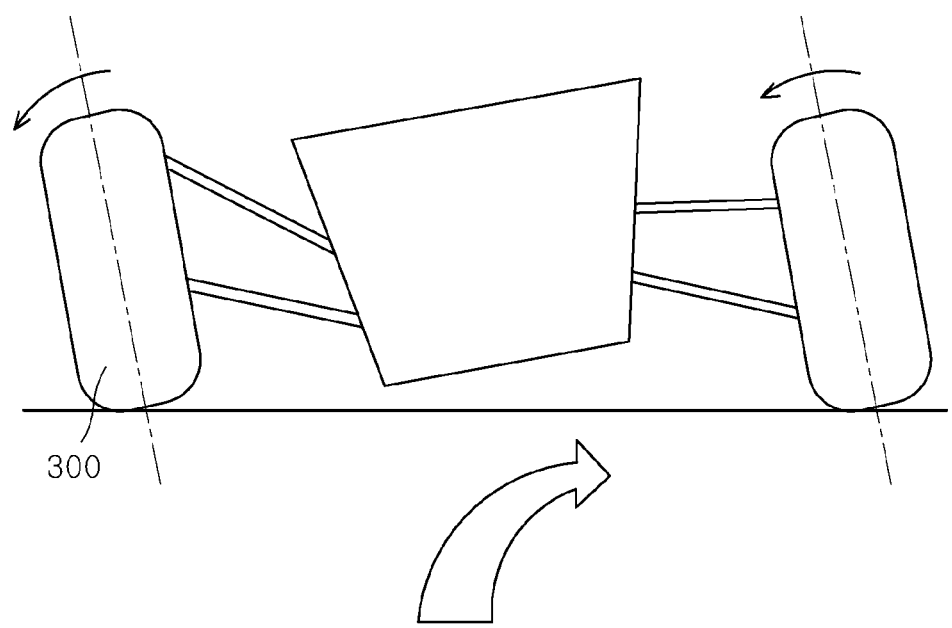
FIGS. 46 and 47 are views schematically illustrating the process of adjusting the camber angle of the wheel when the vehicle drives around.
Figure 47:
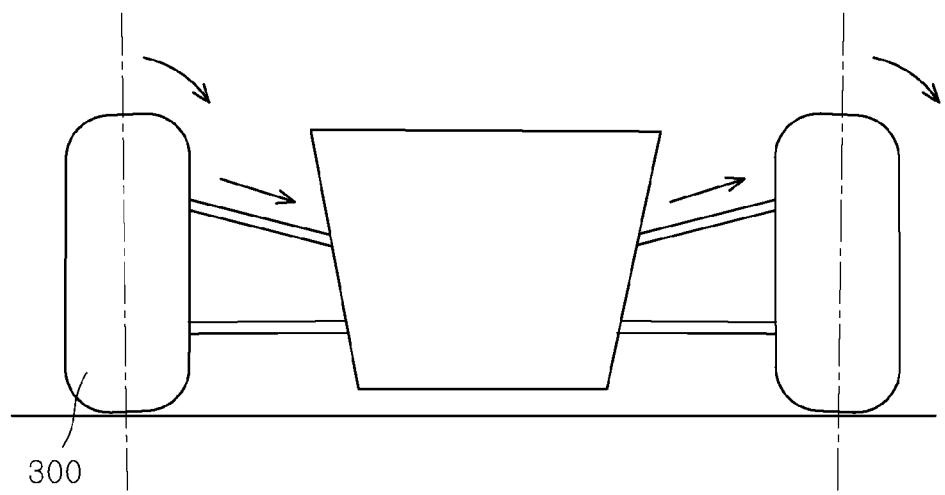

FIGS. 46 and 47 are views schematically illustrating the process of adjusting the camber angle of the wheel 300 when the vehicle drives around.

The number "0" and the signs "+" and "−" that are shown in FIGS. 43A to 44B mean that an adjustment is made by the camber adjustment unit 3000 in such a manner that the wheel 300 has the neural camber angle, a positive camber angle, and the negative camber angle, respectively.

Referring to FIG. 46, when the vehicle travels straight, the steering unit 2400 rotates the wheel 300 about a vehicle body and thus aligns the steering angle of the wheel 300 and a traveling direction of the vehicle in such a manner as to be parallel to each other.

When receiving information on the traveling state of the vehicle from the ECU of the vehicle or the like, as an input, and determining that the vehicle is traveling straight, the camber control unit 3001 operates the camber adjustment unit 3000 in such a manner that the camber angle of the wheel 300, as illustrated in FIG. 41, is kept at the neutral state.

Referring to FIGS. 38 to 40 and 44A to 47, when the vehicle drives around, the steering unit 2400 rotates the wheel 300 about the vehicle body in such a manner that the steering angle of the wheel 300 and the vehicle makes a predetermined angle to each other.

Accordingly, the lateral acceleration is applied to the vehicle body outward from a radius of the circle in which the vehicle drives, and the wheel 300 is inclined in a direction in which the lateral acceleration is applied. More specifically, as illustrated in FIG. 46, in a case where the vehicle drives around, the wheel 300 that is disposed to the outer wheel side is inclined in a direction of having the positive camber angle, and the wheel 300 that is disposed to the inner wheel side is inclined in a direction of having the negative camber angle.

The camber control unit 3001 receives the information on the traveling state of the vehicle from the ECU of the vehicle or the like, as an input. In a case where it is determined that the vehicle is driving around, the camber control unit 3001 individually adjusts the camber angle of the wheel 300 that is disposed to the outer wheel side and the camber angle of the wheel 300 that is disposed to the inner wheel side.

More specifically, the camber control unit 3001 operates the camber adjustment unit 3000 in such a manner that the wheel 300 that is disposed to the outer wheel side, as illustrated in FIG. 39, has the negative camber angle, and operates the camber adjustment unit 3000 in such a manner that the wheel 300 that is disposed to the inner wheel side, as illustrated in FIG. 40, has the positive camber angle.

Accordingly, when the vehicle drives around, the wheel 300 disposed to the outer wheel side and the wheel 300 disposed to the inner wheel side cancel out slopes due to the lateral acceleration, through the negative camber angle and the positive camber angle that are formed by the camber adjustment unit 3000. Thus, the wheel 300 may be constantly kept in contact with the ground.

Hereinafter, a configuration of a vehicle including a corner module apparatus according to another embodiment of the present disclosure is described.

In this process, a description redundant with that of the vehicle including the corner module apparatus according to the aforementioned embodiment of the present disclosure is omitted for convenience of description.

Figure 48:
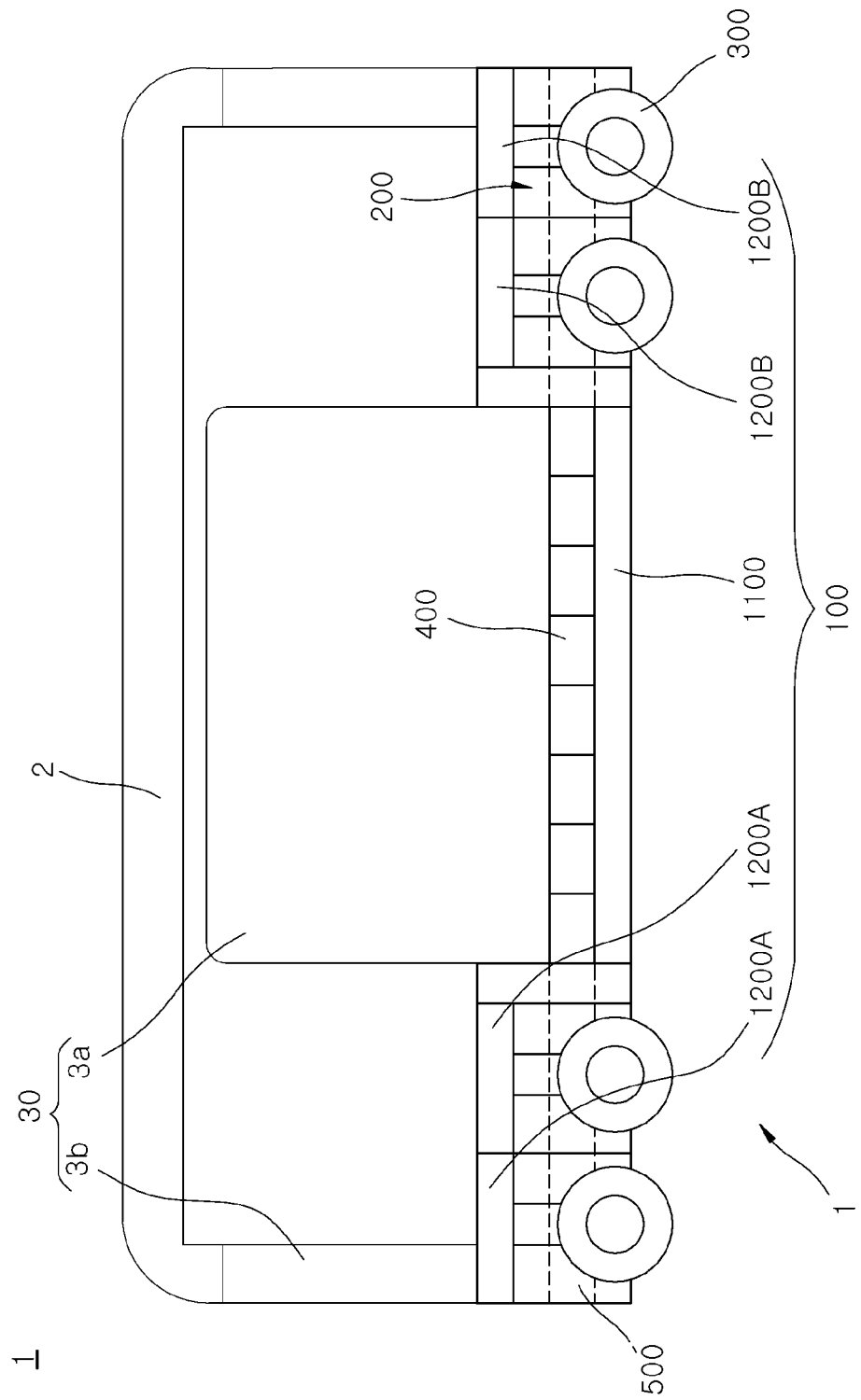
FIG. 48 is a diagram schematically illustrating a configuration of a vehicle including a corner module apparatus for a vehicle according to another embodiment of the present disclosure.

FIG. 48 is a front view schematically illustrating a configuration of a vehicle including a corner module apparatus according to another embodiment of the present disclosure.

Referring to FIG. 48, a frame module 100 according to another embodiment of the present disclosure includes a plurality of first corner module platforms 1200A and a plurality of second corner modules platforms 1200B.

The plurality of first corner module platforms 1200A and the plurality of second corner module platforms 1200B are extended in the length direction of a vehicle body from one side and the other side of a main platform 1100.

More specifically, the neighboring first corner module platforms 1200A are connected in series in the length direction of the vehicle body from one side of the main platform 1100. The neighboring second corner module platforms 1200B are connected in series in the length direction of the vehicle body from the other side of the main platform 1100. In this case, the numbers of plurality of first corner module platforms 1200A and plurality of second corner module platforms 1200B may be identical and may be different. Accordingly, the number of corner modules 200 installed in the frame module 100 according to another embodiment of the present disclosure may be freely expanded to both sides of the main platform 1100 based on a purpose of a vehicle.

Figure 49:
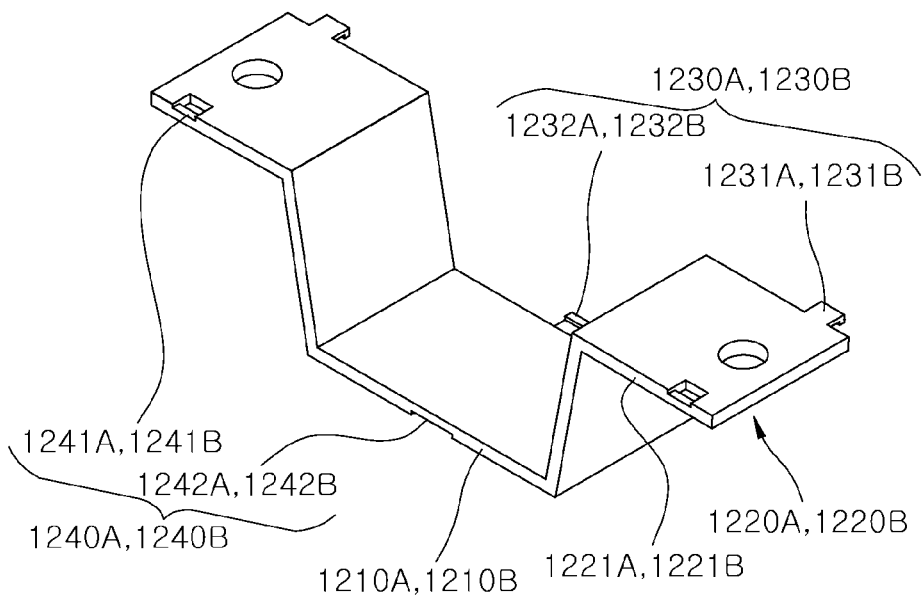
FIG. 49 is a diagram schematically illustrating a configuration of a first corner module platform and a second corner module platform according to another embodiment of the present disclosure.

FIG. 49 is a diagram schematically illustrating a configuration of a first corner module platform and a second corner module platform according to another embodiment of the present disclosure.

Referring to FIG. 49, the first corner module platform 1200A and the second corner module platform 1200B according to the present embodiment further include a first corner module extension fastening part 1240A and a second corner module extension fastening part 1240B, respectively.

The first corner module extension fastening part 1240A includes a first corner module plate 1210A and a first corner module wheel housing 1220A. The first corner module extension fastening part 1240A is disposed on the opposite side of a first corner module fastening part 1230A in the first corner module platform 1200A. That is, the first corner module fastening part 1230A and the first corner module extension fastening part 1240A are disposed at both ends of the first corner module platform 1200A.

The first corner module extension fastening part 1240A provided in any one first corner module platform 1200A is detachably coupled to the first corner module fastening part 1230A provided in a neighbor first corner module platform 1200A. More specifically, the first corner module extension fastening part 1240A is locked and coupled with the first corner module fastening part 1230A as neighbor first corner module platforms 1200A come into contact with each other in a direction parallel to the length direction of a vehicle. Accordingly, the plurality of first corner module platforms 1200A that are extended in series may be sequentially connected in the length direction of the vehicle.

Figure 50:
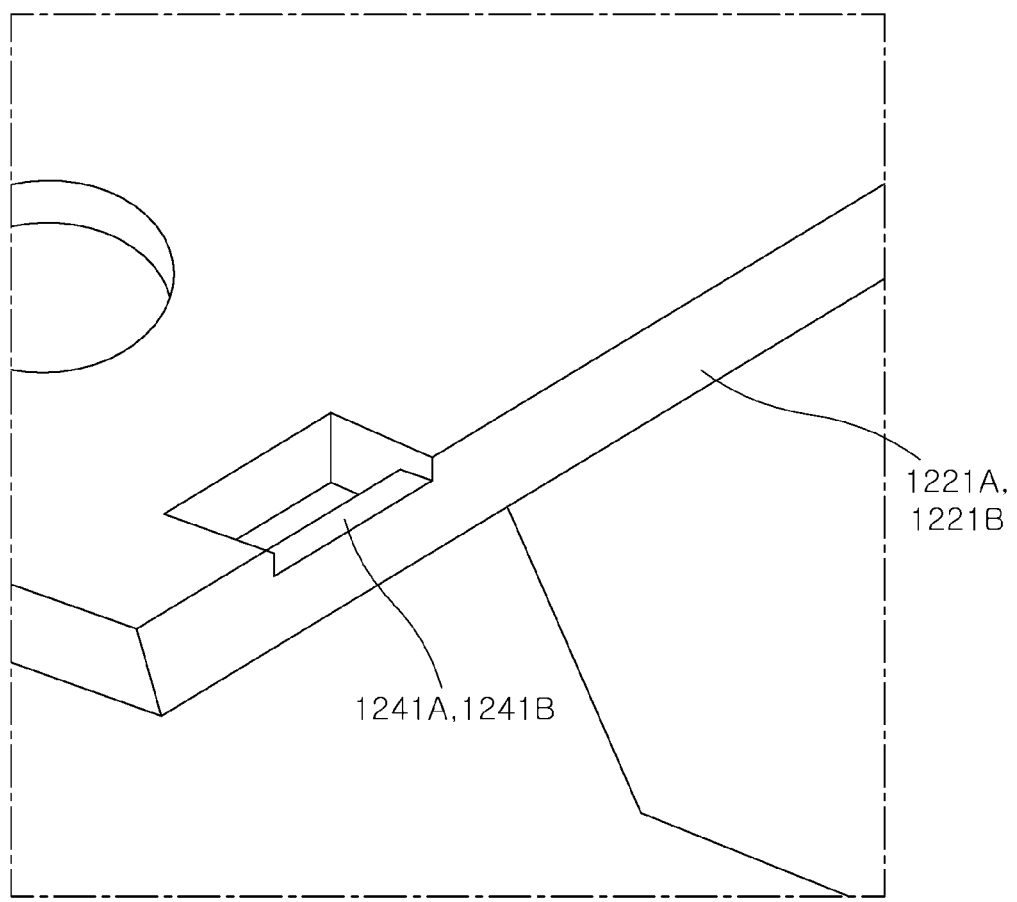
FIGS. 50 and 51 are enlarged views schematically illustrating a configuration of a first corner module extension fastening part and a second corner module extension fastening part according to an embodiment of the present disclosure.
Figure 51:
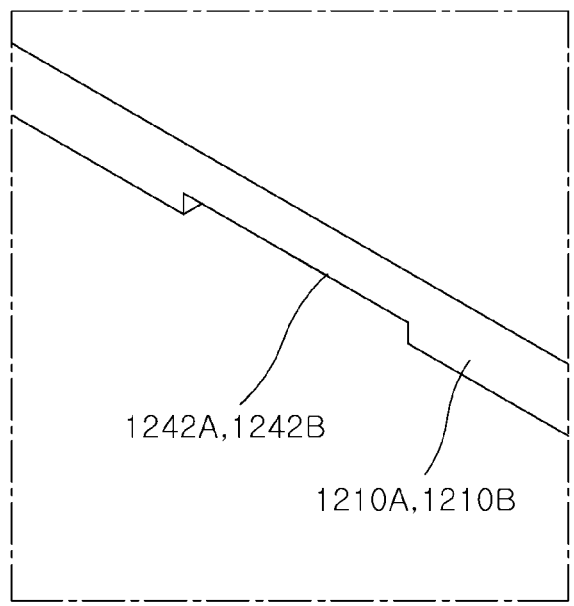

FIGS. 50 and 51 are enlarged views schematically illustrating a configuration of the first corner module extension fastening part and the second corner module extension fastening part according to another embodiment of the present disclosure.

Referring to FIGS. 50 and 51, the first corner module extension fastening part 1240A according to the present embodiment includes a first corner module upper-extension fastening part 1241A and a first corner module lower-extension fastening part 1242A.

The first corner module upper-extension fastening part 1241A according to the present embodiment may be formed to have a form of a groove that is concavely recessed and formed from the first corner module wheel housing 1220A, more specifically, an outside surface of a first mounting plate 1221A. The first corner module upper-extension fastening part 1241A is perpendicularly downward extended from the top of the first corner module wheel housing 1220A. The first corner module upper-extension fastening part 1241A is disposed at the end of the other of the front or rear of the first corner module wheel housing 1220A, that is, on a side opposite to the first corner module upper-fastening part 1231A. The first corner module upper-extension fastening part 1241A may have a cross-sectional form having a step form so that the first corner module upper-extension fastening part 1241A is locked and coupled with a first corner module upper-fastening part 1231A provided in a neighbor first corner module platform 1200A. The first corner module upper-extension fastening part 1241A may be provided in plural, and may be individually provided in the first corner module wheel housings 1220A.

The first corner module lower-extension fastening part 1242A according to the present embodiment may be formed to have a form of a groove that is concavely recessed and formed from an outside surface of the first corner module plate 1210A.

The first corner module lower-extension fastening part 1242A is extended in a direction opposite to a direction of the first corner module upper-extension fastening part 1241A. More specifically, the first corner module lower-extension fastening part 1242A is perpendicularly upward extended from the bottom of the first corner module plate 1210A. Accordingly, when being fastened to the first corner module fastening parts 1230A, the first corner module upper-extension fastening part 1241A and the first corner module lower-extension fastening part 1242A can prevent the first corner module fastening part 1230A from deviating to any one direction.

The first corner module lower-extension fastening part 1242A is disposed at the end of the other of the front or rear of the first corner module plate 1210A, that is, on a side opposite to the first corner module lower-fastening part 1232A. The first corner module lower-extension fastening part 1242A may have a cross-sectional form having a step form so that the first corner module lower-extension fastening part 1242A is locked and coupled with a first corner module lower-fastening part 1232A provided in a neighbor first corner module platform 1200A.

The second corner module extension fastening part 1240B is provided in the second corner module plate 1210B and the second corner module wheel housing 1220B. The second corner module extension fastening part 1240B is disposed on the opposite side of a second corner module fastening part 1230B in the second corner module platform 1200B. That is, the second corner module fastening part 1230B and the second corner module extension fastening part 1240B are disposed at both ends of the second corner module platform 1200B, respectively.

The second corner module extension fastening part 1240B provided in any one second corner module platform 1200B is detachably coupled the second corner module fastening part 1230B provided in a neighbor second corner module platform 1200B. More specifically, when neighbor second corner module platforms 1200B are brought into contact with each other in a direction parallel to the length direction of the vehicle, the second corner module extension fastening part 1240B is locked and coupled with the second corner module fastening part 1230B. Accordingly, a plurality of second corner module platforms 1200B that are extended in series may be sequentially connected in the length direction of the vehicle.

The second corner module extension fastening part 1240B according to the present embodiment includes a second corner module upper-extension fastening part 1241B and a second corner module lower-extension fastening part 1242B.

The second corner module upper-extension fastening part 1241B according to the present embodiment may be formed to have a form of a groove that is concavely recessed and formed from the second corner module wheel housing 1220B, more specifically, an outside surface of a second mounting plate 1221B. The second corner module upper-extension fastening part 1241B is perpendicularly downward extended from the top of the second corner module wheel housing 1220B. The second corner module upper-extension fastening part 1241B is disposed at the end of the other of the front or rear of the second corner module wheel housing 1220B, that is, on the opposite side of a second corner module upper-fastening part 1231B. The second corner module upper-extension fastening part 1241B may have a cross-sectional form having a step form so that the second corner module upper-extension fastening part 1241B can be locked and coupled with the second corner module upper-fastening part 1231B provided in a neighbor second corner module platform 1200B. The second corner module upper-extension fastening part 1241B may be provided in plural and individually provided in the second corner module wheel housing 1220B.

The second corner module lower-extension fastening part 1242B according to the present embodiment may be formed to have a form of a groove that is concavely recessed and formed from the outside surface of the second corner module plate 1210B.

The second corner module lower-extension fastening part 1242B is extended in a direction opposite to the direction of the second corner module upper-extension fastening part 1241B. More specifically, the second corner module lower-extension fastening part 1242B is perpendicularly upward extended from the bottom of the second corner module plate 1210B. Accordingly, when being fastened to the second corner module fastening part 1230B, the second corner module upper-extension fastening part 1241B and the second corner module lower-extension fastening part 1242B can prevent the second corner module fastening part 1230B from deviating in any direction thereof.

The second corner module lower-extension fastening part 1242B is disposed at the end of the other of the front or rear of the second corner module plate 1210B, that is, on the opposite side of the second corner module lower-fastening part 1232B. The second corner module lower-extension fastening part 1242B may have a cross-sectional form having a step form so that the second corner module lower-extension fastening part 1242B can be locked and coupled with the second corner module lower-fastening part 1232B provided in a neighbor second corner module platform 1200B.

A second door 3*b* according to the present embodiment is provided in pair. The pair of second doors 32*b* is installed on sides of the top hat 2 in forward and backward directions in a way to be opened and closed. The pair of second doors 3*b* may be disposed on the first corner module platform 1200A and the second corner module platform 1200B disposed on the outermost side thereof in the length direction of a vehicle body, respectively, among a plurality of first corner module platforms 1200A and second corner module platforms 1200B.

Hereinafter, a configuration of a vehicle including a corner module apparatus for a vehicle according to still another embodiment of the present disclosure is described in detail.

In this process, a description redundant with that of a vehicle including a corner module apparatus for a vehicle according to the embodiment or another embodiment of the present disclosure is omitted for convenience of description.

Figure 52:
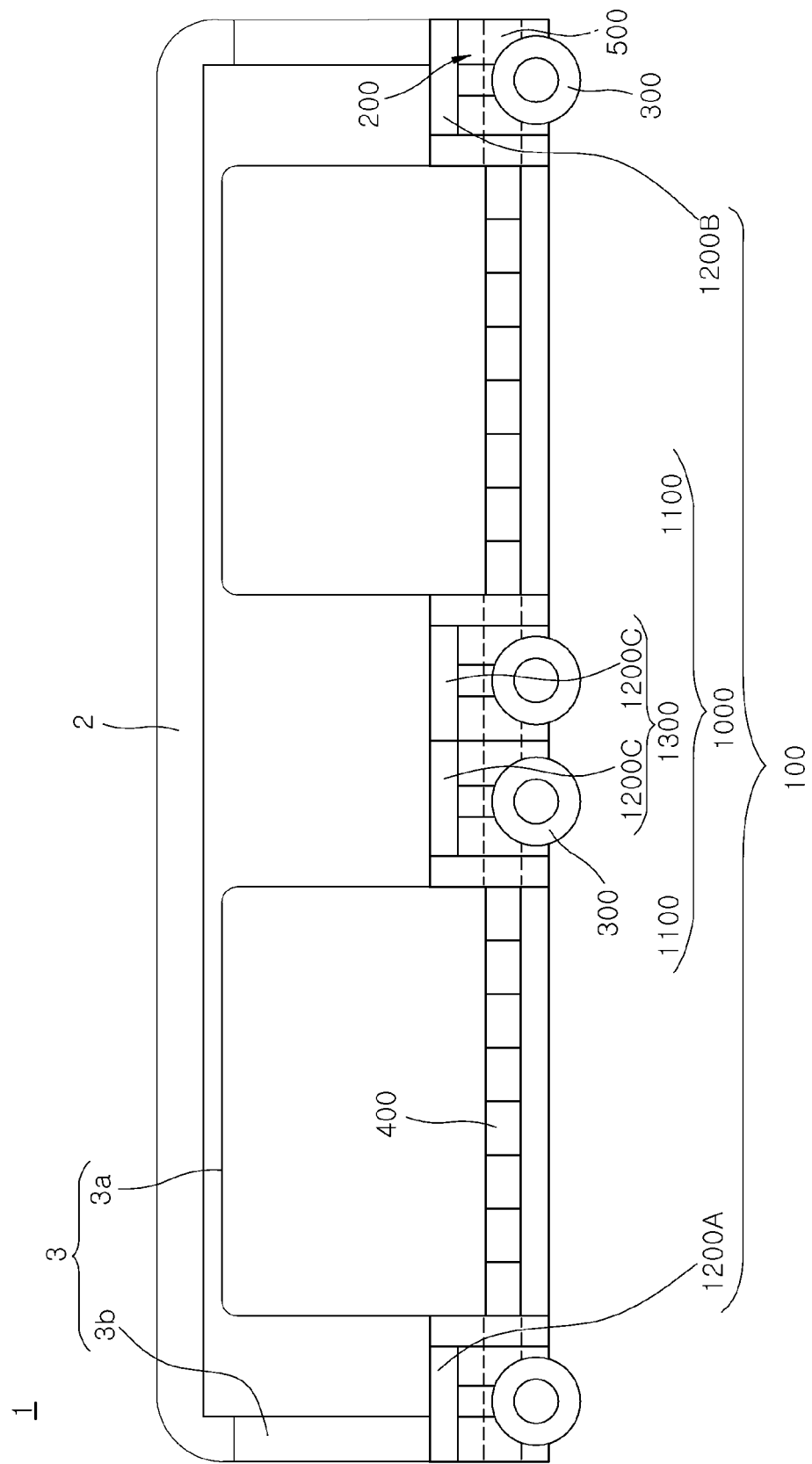
FIG. 52 is a diagram schematically illustrating a configuration of a vehicle including a corner module apparatus for a vehicle according to still another embodiment of the present disclosure.

FIG. 52 is a front view schematically illustrating a configuration of a vehicle including a corner module apparatus for a vehicle according to still another embodiment of the present disclosure.

Referring to FIG. 52, the vehicle including the corner module apparatus for a vehicle according to still another embodiment of the present disclosure includes a main platform assembly 1000, a first corner module platform 1200A, and a second corner module platform 1200B.

The main platform assembly 1000 includes a middle module platform 1300 disposed between at least two main platforms 1100 and a main platform.

Neighbor main platforms 1100 are disposed to be spaced apart from each other at a given interval in a length direction of the vehicle. In this case, the first corner module platform 1200A is detachably coupled to one side (a left side of FIG. 52) of the main platform 1100 disposed on the outermost side of one side (the left side of FIG. 52) among the plurality of main platforms 1100. The second corner module platform 1200A is detachably coupled to the other side (a right side of FIG. 52) of the main platform 1100 disposed on the outermost side of the other side (the right side of FIG. 52) among the plurality of main platforms 1100. Accordingly, the frame module 100 according to still another embodiment of the present disclosure may also be applied to a vehicle having a vehicle body whose length is relatively long, such as a tram, a bus, or a trailer, because weight of a battery 400 can be distributed through the plurality of main platforms 1100.

The middle module platform 1300 includes a third corner module platform 12000 disposed between neighbor main platforms 1100 and supporting a corner module 200.

At least one third corner module platform 12000 may be provided between neighbor main platforms 1100. If the third corner module platform 12000 is provided in plural, the plurality of third corner module platforms 12000 may be connected in series in the length direction of the vehicle body. The third corner module platform 12000 disposed on the outermost side of the plurality of third corner module platforms 12000 is detachably coupled to an end that belongs to the end of a neighbor main platform 1100 and with which the first corner module platform 1200A and the second corner module platform 1200B are not coupled.

The third corner module platform 12000 has a bottom coupled with the corner module 200 described later and supports the corner module 200. The corner module 200 and an inverter 500 for converting, into AC power, DC power supplied from the battery 400 and delivering the AC power to the corner module 200 are mounted within the third corner module platform 12000.

The third corner module platform 12000 according to the present embodiment includes a third corner module plate, a third corner module housing, and a third corner module fastening part.

Detailed shapes of the third corner module plate, the third corner module housing, the third corner module fastening part, and the third corner module extension fastening part may be identical with the shapes of the first corner module plate 1210A, the first corner module wheel housing 1220A, the first corner module fastening part 1230A, and the first corner module extension fastening part 1240A illustrated in FIG. 10.

For the smooth coupling of the main platform 1100, the third corner module extension fastening part provided in the third corner module platform 12000 disposed at any one end among the plurality of third corner module platforms 12000 disposed between neighbor main platforms 1100 may be formed to have a form of a hook that protrudes from the third corner module plate and the third corner module housing.

The top of a mounting part 2422a provided in the plurality of corner modules 200 according to the present embodiment may be detachably coupled with the bottom of the first mounting plate 1221A, the second mounting plate 1221B, or the third mounting plate by bolting, etc. depending on a location.

An opened bottom of a top hat 2 according to the present embodiment is disposed to face the top of the frame module 100, that is, the tops of the main platform assembly 1000, the first corner module platform 1200A, and the second corner module platform 1200B. The top hat 2 may have the bottom coupled with the tops of the main wheel housing 1120, the first corner module wheel housing 1220A, the second corner module wheel housing 1220B, and the third corner module housing by bolting, and may be detachably fixed to the frame module 100.

A first door 3a according to the present embodiment may be provided in plural. The first doors 3a may be spaced apart from each other at a given interval in the length direction of the top hat 2, and may be individually disposed on the main platform 1100 provided in the main platform assembly 1000.

II. Application of Corner Module Apparatus for Vehicle

Figure 53:
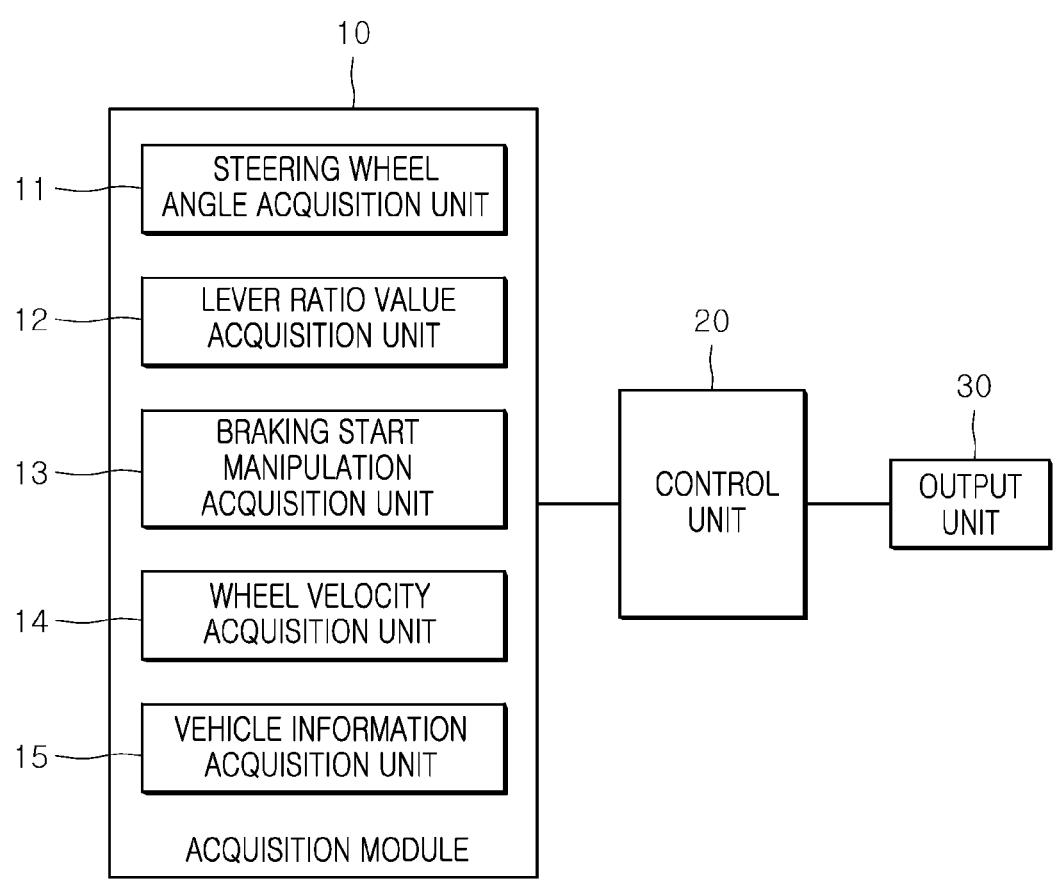
FIG. 53 is a block diagram for describing a function of a corner module apparatus for a vehicle according to an embodiment of the present disclosure.

FIG. 53 is a block diagram for describing a function of a corner module apparatus for a vehicle according to an embodiment of the present disclosure. Referring to FIG. 53, the corner module apparatus for a vehicle according to an embodiment of the present disclosure includes an acquisition module 10, a controller 20, and an output unit 30.

The acquisition module 10 functions as a module for obtaining overall information that is necessary for the controller 20 to implement first to fifth applications described later, and includes a steering wheel angle acquisition part 11, a lever ratio acquisition part 12, a braking initiation manipulation acquisition unit 13, a wheel velocity acquisition part 14, and a vehicle information acquisition unit 15 as illustrated in FIG. 53. The steering wheel angle acquisition part 11 and the lever ratio acquisition part 12 are related to the first application. The braking initiation manipulation acquisition unit 13 is related to the second application. The wheel velocity acquisition part 14 is related to the third and fourth applications. The vehicle information acquisition unit 15 is related to the fifth application.

The steering wheel angle acquisition part 11 may obtain a steering wheel angle. The steering wheel angle may correspond to a steering angle formed through the steering of a driver for a steering wheel or a steering angle command from an ADAS system. Accordingly, the steering wheel angle acquisition part 11 may be implemented as a separate input module for obtaining a steering angle command outputted by a steering angle sensor or the ADAS system mounted on a vehicle.

The lever ratio acquisition part 12 may obtain the lever ratio. In the first application described later, the lever ratio is defined as a parameter indicating whether the front wheel and rear wheel of a bicycle model are inphase or reversed-phased and a steering angle ratio between the front wheel and rear wheel, which are defined with respect to a vehicle, and may have a value of −1 to 1. A sign of the lever ratio indicates whether the front wheel and rear wheel of the bicycle model are inphase or reverse-phased (e.g., an inphase when the sign is a positive value, and a reverse phase when the sign has a negative value). The size of the lever ratio indicates a steering angle ratio between the front wheel and rear wheel of the bicycle model (e.g., when the lever ratio is 0.5, a front wheel steering angle:a rear wheel steering angle=2:1). The lever ratio may be configured to be changed based on a manipulation of a driver. To this end, the lever ratio acquisition part 12 may be implemented as a lever structure (an example of FIG. 54) provided in the interior of a vehicle or a touch screen structure provided in the instrument panel of a vehicle. Accordingly, the lever ratio may be changed by a lever manipulation of a driver or a touch manipulation of a driver on the touch screen.

The braking initiation manipulation acquisition unit 13 may obtain a braking initiation manipulation of a vehicle from a driver. In the second application described later, braking may correspond to a concept including a braking operation (e.g., sudden braking) in the state in which a vehicle drives on a slope S and a braking operation (i.e., parking braking) for maintaining a parked or stopped in a slope S. However, as described later, in the second application, an operation of the present embodiment may be applied when a vehicle moves in a preset low-speed area for the posture stability of the vehicle if a braking operation in the state in which the vehicle drives on the slope S is performed, in that braking is performed through a method of independently controlling the steering of each of the four wheels of the vehicle. The braking initiation manipulation acquisition unit 13 may be implemented in the form of a switch separately provided within a vehicle, and may obtain, as the braking initiation manipulation, a manipulation of a driver for the switch.

The wheel velocity acquisition part 14 may obtain a wheel velocity of the four wheels of a vehicle. The wheel velocity acquisition part 14 may be implemented as a motor sensor for sensing the number of revolutions of an in-wheel motor mounted on each wheel. The wheel velocity acquisition part 14 may obtain wheel velocities of a left front wheel, right front wheel, left rear wheel, and right rear wheel of a vehicle, respectively.

The vehicle information acquisition unit 15 may obtain driving state information and driving environment information of a vehicle. The driving state information may include a vehicle speed and heading angle of a vehicle. The driving environment information may include surrounding image information (e.g., a front image) of a vehicle. In order to obtain such driving state information and driving environment information, the vehicle information acquisition unit 15 may use various sensors (e.g., a vehicle sensor, a gyro sensor, and a camera sensor) mounted on a vehicle. Driving state information and driving environment information of a vehicle obtained by the vehicle information acquisition unit 15 may be used in a process of calculating information on a distance up to a target point, target curvature, and a target steering angle in the fifth application described later.

The controller 20 is a main agent that independently controls the driving and steering of the four wheels of a vehicle through individual driving torque for each of the four wheels, and may be implemented as an electronic control unit (ECU), a central processing unit (CPU), a processor, or a system on chip (SoC). The controller 20 may control a plurality of hardware or software components connected to the controller 20 by driving an operating system or an application, and may perform various data processing and operations. The controller 20 may be configured to execute at least one instruction stored in a memory and store data, that is, a result of the execution, in the memory.

The output unit 30 may correspond to a display, a speaker, etc. which is installed in a cluster of a vehicle or at a specific location within a vehicle.

Hereinafter, the first to fifth applications of the corner module apparatus for a vehicle and detailed operating methods thereof are described chiefly based on an operation of the controller 20.

1. First Application: Individual Steering Architecture

In the first application, the controller 20 may calculate first to fourth target angles of a left front wheel, right front wheel, left rear wheel, and right rear wheel of a vehicle, respectively, based on a steering wheel angle obtained by the steering wheel angle acquisition part 11 and a lever ratio obtained by the lever ratio acquisition part 12, and may independently control the steering of each of the four wheels of the vehicle based on the calculated first to fourth target angles.

Figure 54:
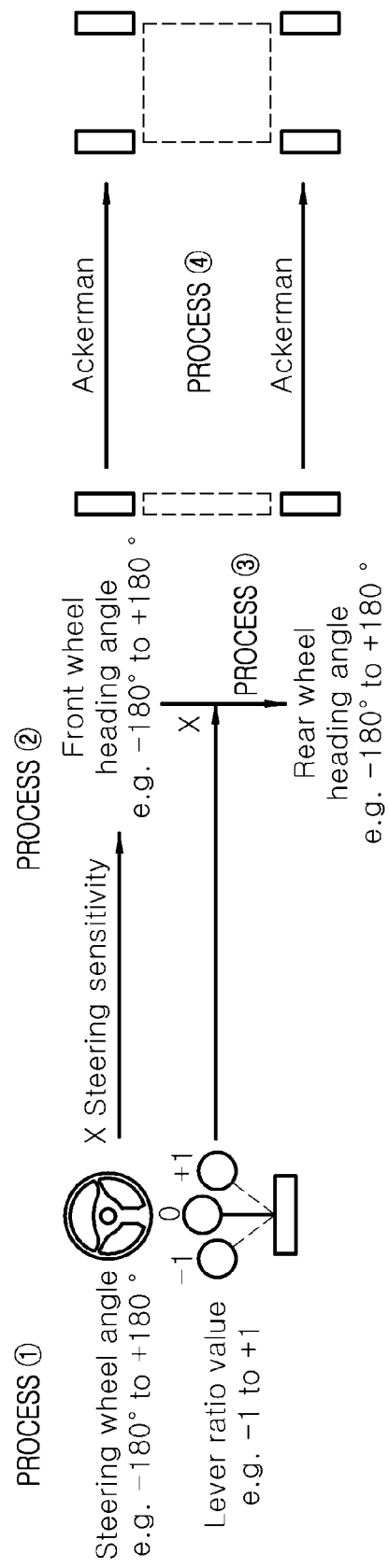
FIG. 54 is an exemplary diagram schematically illustrating a series of processes of calculating first to fourth target angles in a first application (individual steering architecture) of a corner module apparatus for a vehicle according to an embodiment of the present disclosure.

FIG. 54 illustrates, as a general example, a series of processes of calculating, by the controller 20, the first to fourth target angles. Referring to FIG. 54, (process ①), first, the controller 20 may receive a steering wheel angle obtained by the steering wheel angle acquisition part 11 and a lever ratio obtained by the lever ratio acquisition part 12. (Process ②) Next, the controller 20 may calculate a front wheel heading angle of the bicycle model from the steering wheel angle. In this case, the controller 20 may calculate the front wheel heading angle by multiplying the steering wheel angle by a preset steering sensitivity. The steering sensitivity may correspond to a total gear ratio (TGR) of a steering gear ratio variable device applied to the vehicle. (Process ③) When the front wheel heading angle is calculated, the controller 20 may calculate a rear wheel heading angle of the bicycle model based on the front wheel heading angle and a lever ratio obtained by the lever ratio acquisition part 12. (Process ④), next, the controller 20 may expand the bicycle model to a four-wheel vehicle model and calculate first to fourth target angles of the left front wheel, right front wheel, left rear wheel, and right rear wheel of the vehicle.

Among the aforementioned processes, the process ④ corresponding to a direct process of calculating the first to fourth target angles may be performed in a differentiated way based on a value of the lever ratio obtained by the lever ratio acquisition part 12. Specifically, in the present embodiment, a steering control mode of the controller 20 for the steering of the four wheels may be divided into a front-wheel steering mode, a four-wheel inphase steering mode, and a four-wheel reversed-phase steering mode based on a value of the lever ratio. The controller 20 may calculate the first to fourth target angles in differentiated ways based on a value of the lever ratio and for each steering control mode determined based on a value of the lever ratio. Hereinafter, a process of calculating the first to fourth target angles based on a value of the lever ratio and a steering control mode is described in detail.

Figure 55:
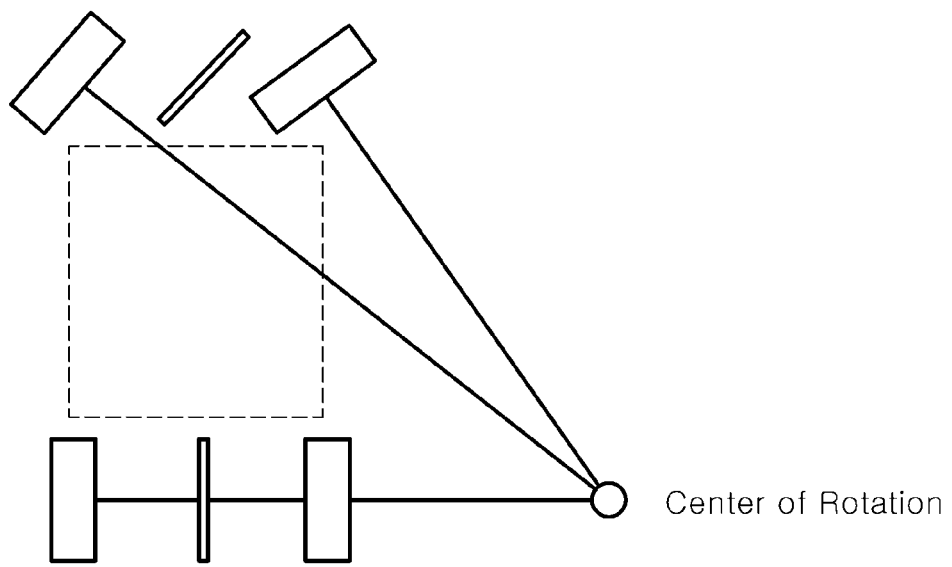
FIG. 55 is an exemplary diagram illustrating first to fourth target angles in a front-wheel steering mode in the first application (individual steering architecture) of a corner module apparatus for a vehicle according to an embodiment of the present disclosure.

First, the front-wheel steering mode corresponds to a steering control mode when the lever ratio is 0. That is, since the lever ratio is 0, rear-wheel steering control is not performed, and only common front-wheel steering control is performed. In this case, the controller 20 may calculate first and second target angles by applying the Ackerman geometry model to a front wheel heading angle, and may calculate third and fourth target angles as a neutral angle (i.e., 0°) indicative of the longitudinal direction of the vehicle because the lever ratio is 0. FIG. 55 illustrates an example in which when a front wheel heading angle is 45°, first and second target angles are calculated as given values based on the center of rotation according to the Ackerman geometry model.

Next, the four-wheel inphase steering mode corresponds to a steering control mode when the lever ratio is greater than 0 and equal to or smaller than 1. That is, since the lever ratio is a positive value, the front wheel and the rear wheel are independently controlled in the state in which the lever ratio is inphase. In the four-wheel inphase steering mode, first to fourth target angles are calculated in differentiated ways "when the lever ratio is greater than 0 and smaller than 1" and "when the lever ratio is 1."

Figure 56:
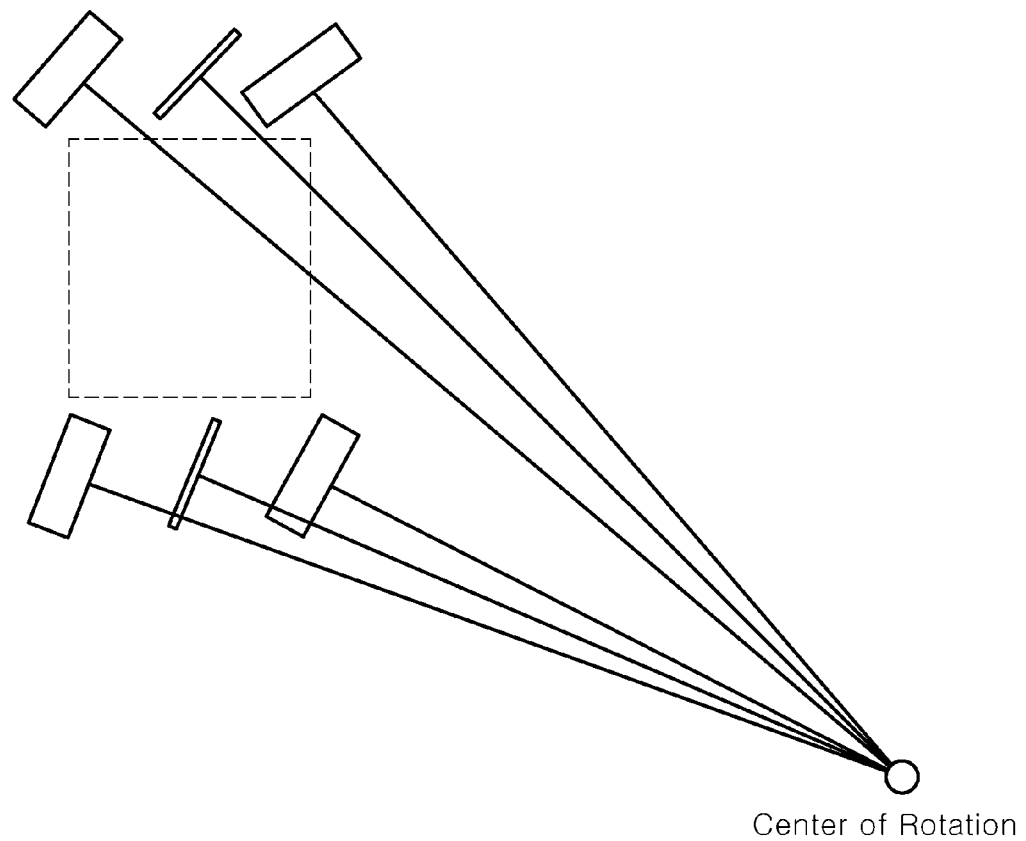
FIGS. 56 and 57 are exemplary diagrams illustrating first to fourth target angles in a four-wheel inphase steering mode in the first application (individual steering architecture) of a corner module apparatus for a vehicle according to an embodiment of the present disclosure.

When the lever ratio is greater than 0 and less than 1, the controller 20 may calculate first and second target angles by applying the Ackerman geometry model to a front wheel heading angle. Furthermore, the controller 20 may calculate a rear wheel heading angle of the bicycle model by applying (or multiplying) the lever ratio to the front wheel heading angle, and may calculate third and fourth target angles by applying the Ackerman geometry model to the calculated rear wheel heading angle. FIG. 56 illustrates an example in which when the lever ratio is 0.5, that is, when a front wheel heading angle is 45°, first to fourth target angles are calculated as given values based on the center of rotation according to the Ackerman geometry model.

Figure 57:
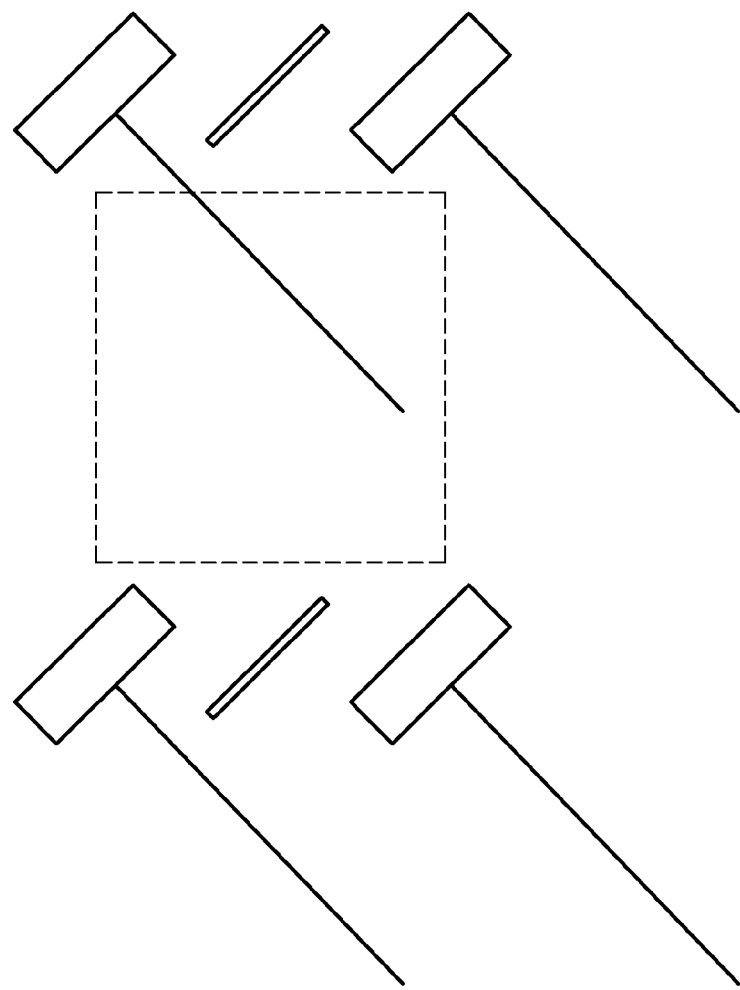

When the lever ratio is 1, the controller 20 may calculate first to fourth target angles as front wheel heading angles. That is, when the lever ratio is 1, this means a state in which the center of rotation according to the Ackerman geometry model is not present, the front wheels and the rear wheels have an inphase state, and steering angles are identically formed. The controller 20 may calculate the first to fourth target angles as front wheel heading angles. FIG. 57 illustrates an example in which when the lever ratio is 1, that is, when a front wheel heading angle is 45°, first to fourth target angles are calculated as front wheel heading angles.

Figure 58:
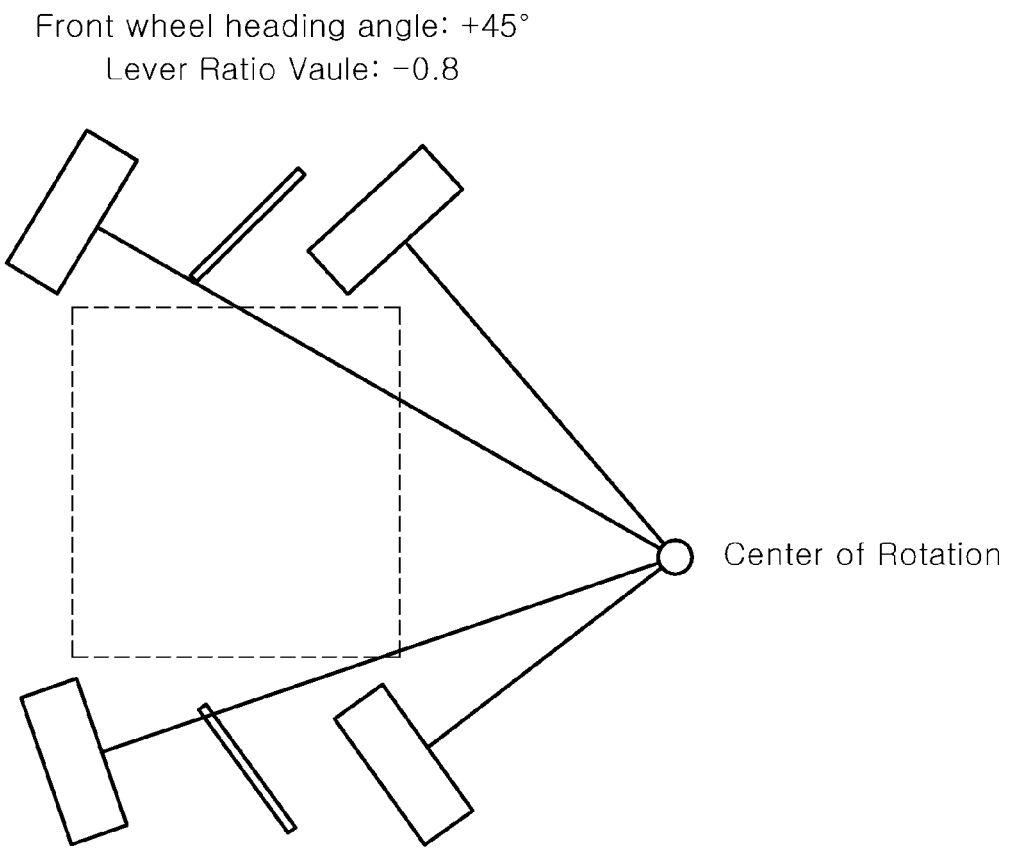
FIGS. 58 and 59 are exemplary diagrams illustrating first to fourth target angles in a four-wheel reversed-phase steering mode in the first application (individual steering architecture) of a corner module apparatus for a vehicle according to an embodiment of the present disclosure.
Figure 59:
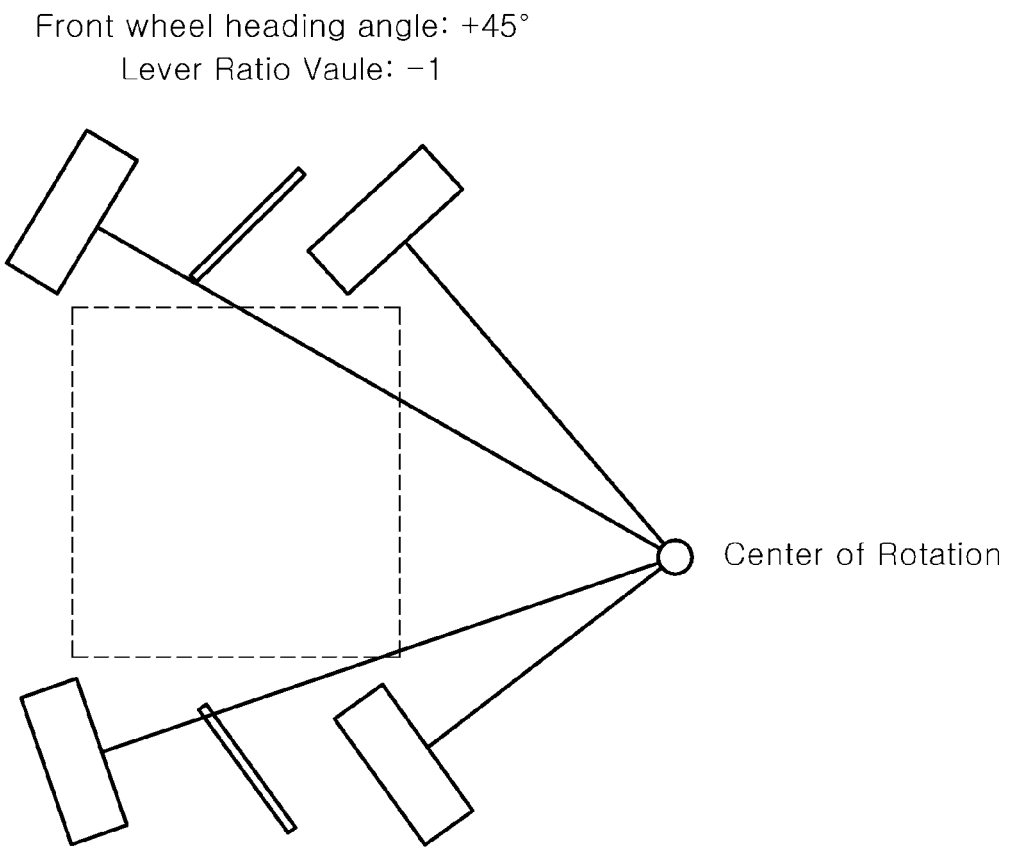

The four-wheel reversed-phase steering mode corresponds to a steering control mode when the lever ratio is equal to greater than −1 and less than 0. That is, since the lever ratio is a negative value, the front wheels and the rear wheels are independently controlled in the state in which the front wheels and the rear wheels have reversed phases. In the four-wheel reversed-phase steering mode, the center of rotation according to the Ackerman geometry model is always present. Accordingly, the controller 20 may calculate first and second target angles by applying the Ackerman geometry model to a front wheel heading angle, and may calculate third and fourth target angles by applying the Ackerman geometry model to a rear wheel heading angle of the bicycle model which is calculated by applying the lever ratio to the front wheel heading angle. FIG. 58 illustrates an example in which when the lever ratio is −0.8, that is, when a front wheel heading angle is 45°, first to fourth target angles are calculated as predetermined values based on the center of rotation according to the Ackerman geometry model. FIG. 59 illustrates an example in which when the lever ratio is −1, that is, when a front wheel heading angle is 45°, first to fourth target angles are calculated as predetermined values based on the center of rotation according to the Ackerman geometry model.

Table 1 below illustrates a method of calculating the first to fourth target angles based on a value of the lever ratio and a steering control mode.

TABLE 1

| Steering control mode | Lever ratio (R) | Method of calculating target angle |
|---|---|---|
| Front-wheel steering mode | 0 | First and second target angles: Ackerman geometry model Third and fourth target angles: neutral angle |
| Four-wheel inphase steering mode | 0 < R < 1 | First to fourth target angles: Ackerman geometry model |
| | R = 1 | First to fourth target angles: front wheel heading angle |
| Four-wheel reversed-phase steering mode | −1 ≤ R < 0 | First to fourth target angles: Ackerman geometry model |

As described above, the lever ratio may be configured to be changed and set based on a manipulation of a driver. Accordingly, if sudden transition of a steering control mode is caused because the lever ratio is changed in a process of a vehicle driving, there occurs a problem in that the driving stability of a vehicle, such as a slip of a vehicle tire to the rollover of a vehicle, is reduced. In order to prevent such a problem, in the present embodiment, when the transition of a steering control mode is caused due to a change in the lever ratio, the controller 20 may perform the transition of the steering control mode during a preset excess time by controlling change speeds of the steering angles of the four wheels at a preset control speed. The control speed may be preset in the controller 20 based on experimental results of a designer so that the control speed has a sufficiently low value within a range in which the driving stability of a vehicle is secured without causing sudden transition of a steering control mode. The excess time may also be preset in the controller 20 as a value corresponding to a control speed. As a detailed example, if transition to the four-wheel reversed-phase steering mode is caused because a driver changes the lever ratio to −0.5 in the state in which a vehicle drives in the four-wheel inphase steering mode, the controller 20 changes a current steering angle of a rear wheel to a target angle (i.e., third and fourth target angles in the four-wheel reversed-phase steering mode), but may slowly change the steering angle of the rear wheel to the third and fourth target angles based on a control speed so that the driving stability of the vehicle can be secured.

Figure 60:
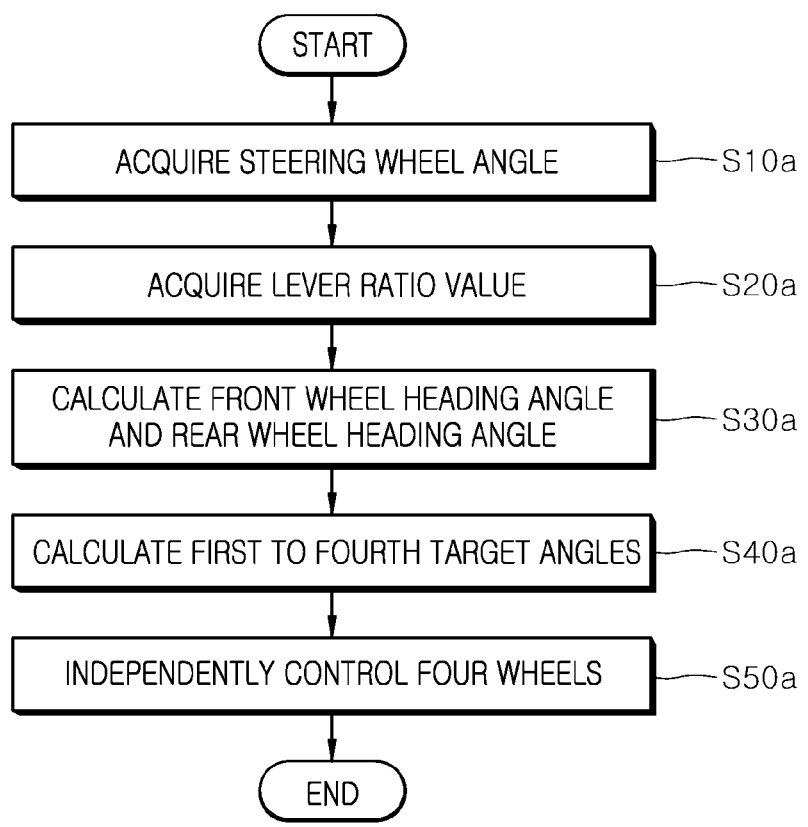
FIG. 60 is a flowchart for describing an operating method in the first application (individual steering architecture) of a corner module apparatus for a vehicle according to an embodiment of the present disclosure.

FIG. 60 is a flowchart for describing an operating method in the first application of the corner module apparatus for a vehicle according to an embodiment of the present disclosure. An operating method of the corner module apparatus for a vehicle according to the present embodiment is described with reference to FIG. 60. A detailed description of a portion redundant with the aforementioned contents is omitted, and a time-series configuration thereof is chiefly described.

First, the steering wheel angle acquisition part 11 obtains a steering wheel angle (S10a). The lever ratio acquisition part 12 obtains a lever ratio indicating whether the front wheels and rear wheels of the bicycle model are inphase and reversed-phased and a steering angle ratio between the front wheels and the rear wheels, which have been defined with respect to a vehicle (S20a). The lever ratio has a value of −1 to 1. A sign of the lever ratio indicates whether the front wheels and rear wheels of the bicycle model are inphase and reversed-phased. The size of the lever ratio indicates a steering angle ratio between the front wheels and rear wheels of the bicycle model.

Next, the controller 20 calculates a front wheel heading angle of the bicycle model based on the steering wheel angle obtained in step S10a, and calculates a rear wheel heading angle of the bicycle model based on the calculated front wheel heading angle and the lever ratio obtained in step S20a (S30a). In step S30a, the controller 20 calculates the front wheel heading angle by multiplying the steering wheel angle by a preset steering sensitivity.

Next, the controller 20 expands the bicycle model to a four-wheel vehicle model, and calculates first to fourth target angles of a left front wheel, right front wheel, left rear wheel, and right rear wheel of the vehicle, respectively (S40a). A method of calculating the first to fourth target angles in step S40a is differentially determined based on the lever ratio obtained in step S20a. Specifically, the first to fourth target angles are calculated in differentiated ways based on a value of the lever ratio and for each steering control mode determined based on a value of the lever ratio. The steering control mode includes the front-wheel steering mode corresponding to a case where the lever ratio is 0, the four-wheel inphase steering mode corresponding to a case where the lever ratio is greater than 0 and equal to or smaller than 1, and the four-wheel reversed-phase steering mode corresponding to a case where the lever ratio is equal to greater than −1 and less than 0.

When a steering control mode of the vehicle is the front-wheel steering mode, in step S40a, the controller 20 calculates the first and second target angles by applying the Ackerman geometry model to the front wheel heading angle, and calculates the third and fourth target angles as a neutral angle indicative of the longitudinal direction of the vehicle.

When a steering control mode of the vehicle is the four-wheel inphase steering mode or the four-wheel reversed-phase steering mode in the state in which the lever ratio is greater than 0 and less than 1, in step S40a, the controller 20 (i) calculates the first and second target angles by applying the Ackerman geometry model to the front wheel heading angle and (ii) calculates a rear wheel heading angle of the bicycle model by applying the lever ratio to the front wheel heading angle and calculates the third and fourth target angles by applying the Ackerman geometry model to the calculated rear wheel heading angle.

When a steering control mode of the vehicle is the four-wheel inphase steering mode in the state in which the lever ratio is 1, in step S40a, the controller 20 calculates the first to fourth target angles as front wheel heading angles.

When the first to fourth target angles are calculated in step S40a, the controller 20 independently controls the steering of each of the four wheels of the vehicle based on the first to fourth target angles (S50a). If the transition of a steering control mode is caused due to a change in the lever ratio, in step S50a, the controller 20 performs the transition of the steering control mode during a preset excess time by controlling change speeds of the steering angles of the four wheels at a preset control speed.

According to the first application, there are advantages in terms of expandability and a degree of freedom because independent control is applied to the steering of each of the four wheels compared to the existing front wheel steering method or rear wheel steering method (RWS). Independent control of the four wheels can be safely performed even in a driving state in addition to a case where a vehicle is parked and stopped because the transition of a steering control mode is implemented to have continuity.

2. Second Application: Braking Mechanism Through Individual Steering

In the second application, when a braking initiation manipulation is obtained by the braking initiation manipulation acquisition unit 13, the controller 20 may perform the braking of a vehicle by independently controlling the steering of four wheels of the vehicle.

In the case of a structure in which the four wheels are independently controlled, the brake of each corner module may be removed depending on a design method, and a method of performing braking through an in-wheel motor may be applied. In this case, since control of the in-wheel motor is impossible in the state in which a power source of the vehicle has been off, a new braking logic is required because braking control is impossible. The present embodiment proposes a method of performing the braking of a vehicle in a way to control the state in which the four wheels of the vehicle have been aligned by independently controlling the steering of each of the four wheels with consideration taken of the design expandability of devices for independently driving the four wheels and the need for corresponding braking logic. The method is described in detail below. In order to help understanding of an embodiment, an example in which a braking operation (i.e., parking braking) for maintaining a parked or stopped state in a slope S is described.

Figure 61:
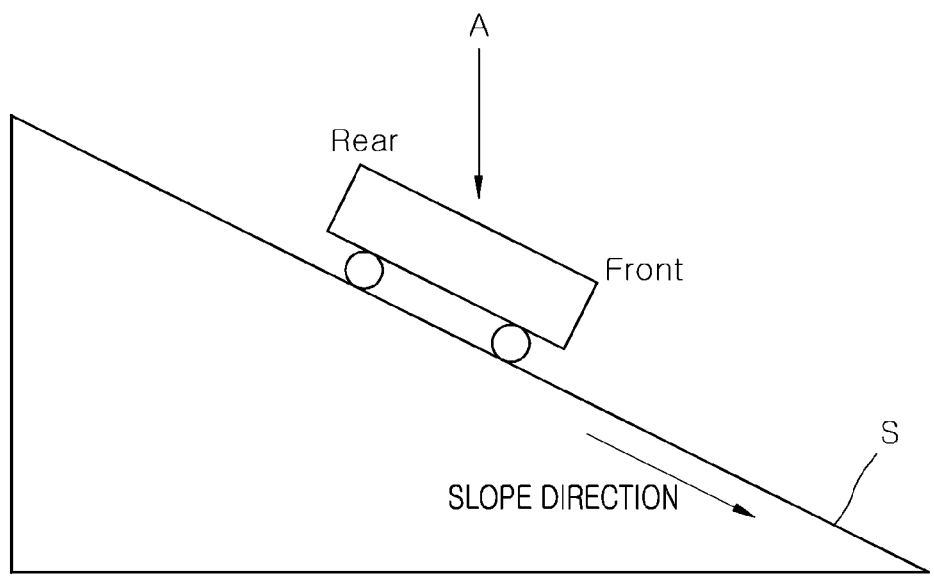
FIGS. 61 to 66 are exemplary diagrams illustrating a relation between a slope and a location of a vehicle in a second application (a braking mechanism through individual steering) of a corner module apparatus for a vehicle according to an embodiment of the present disclosure.
Figure 62:
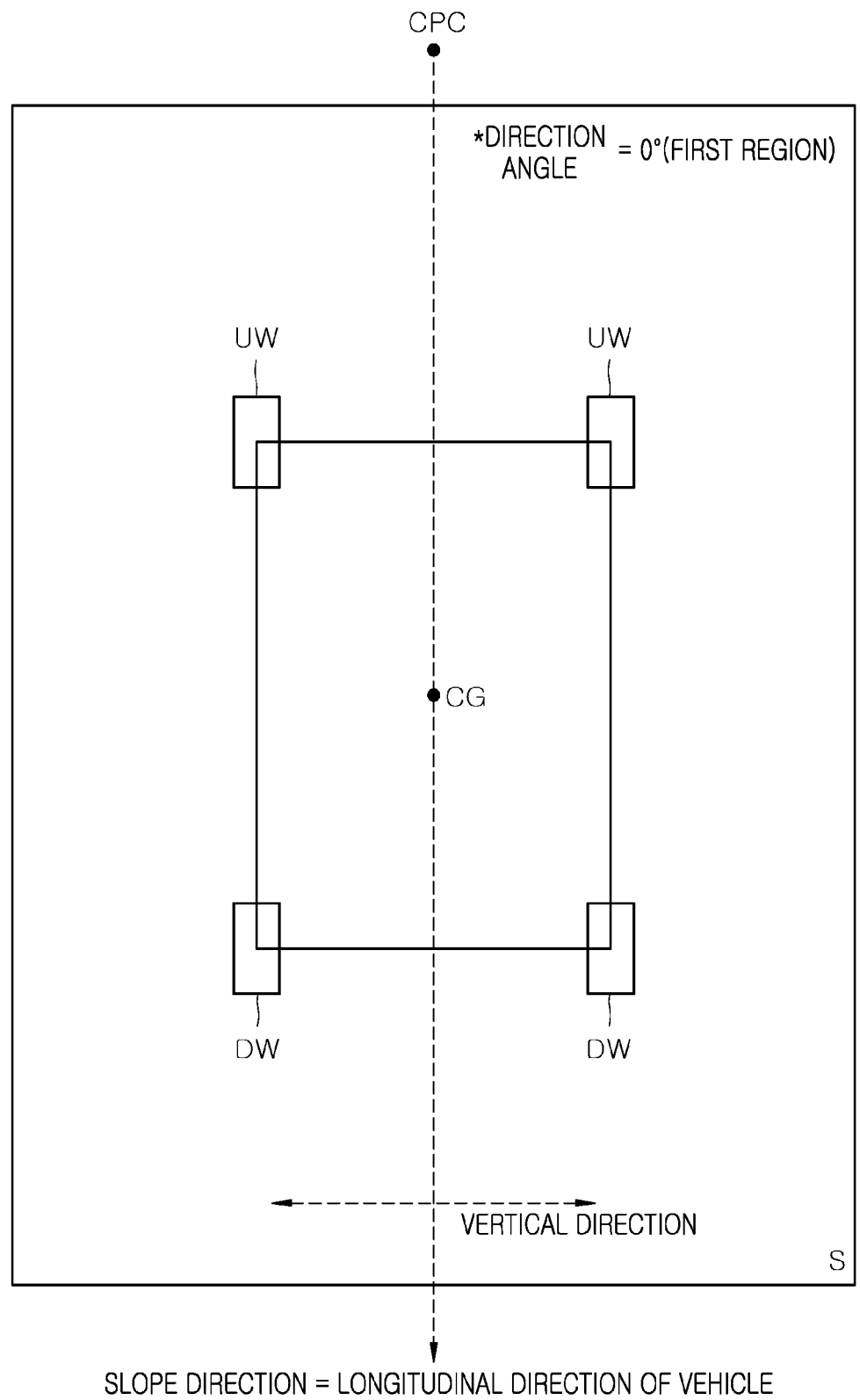
Figure 63:
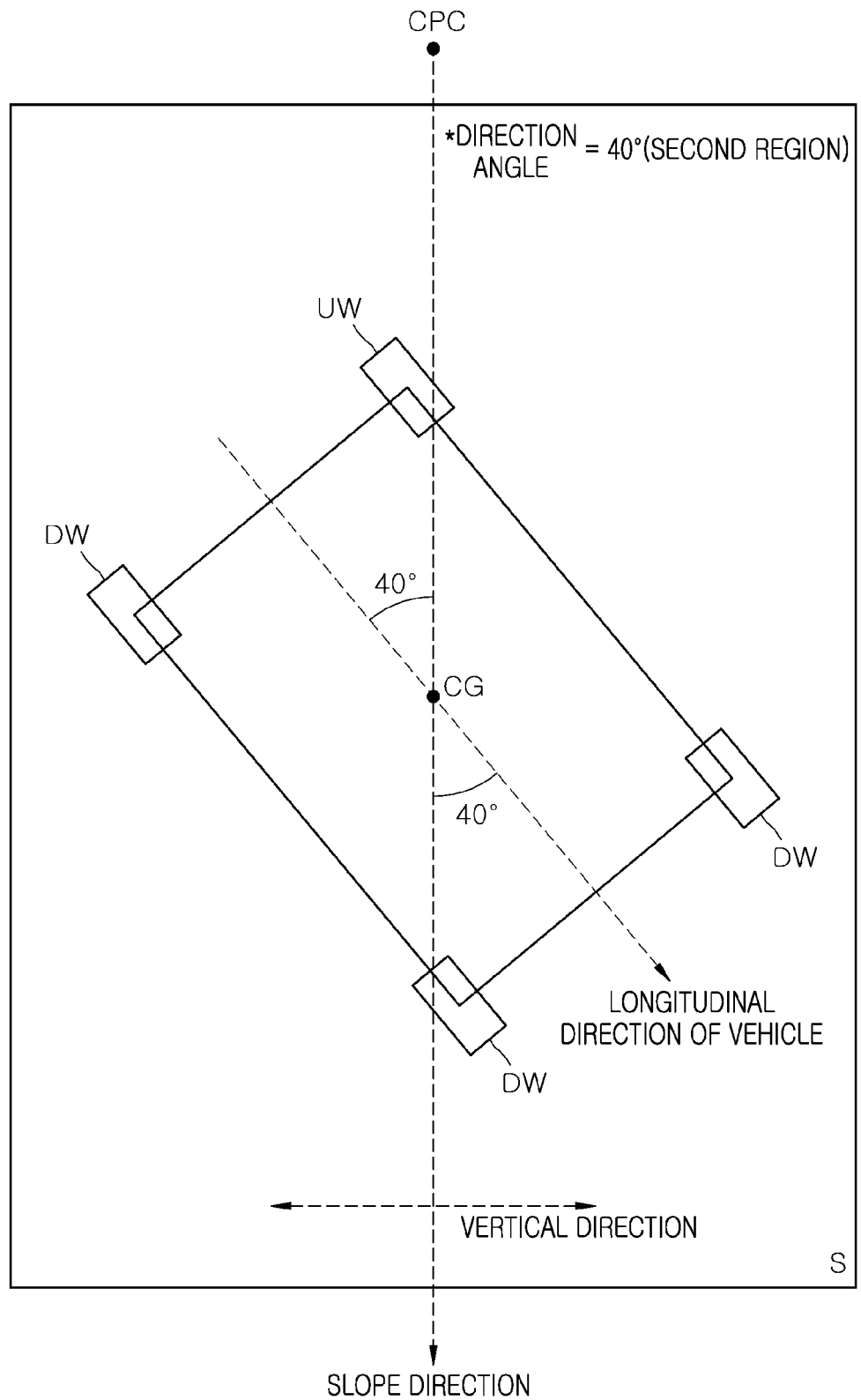
Figure 64:
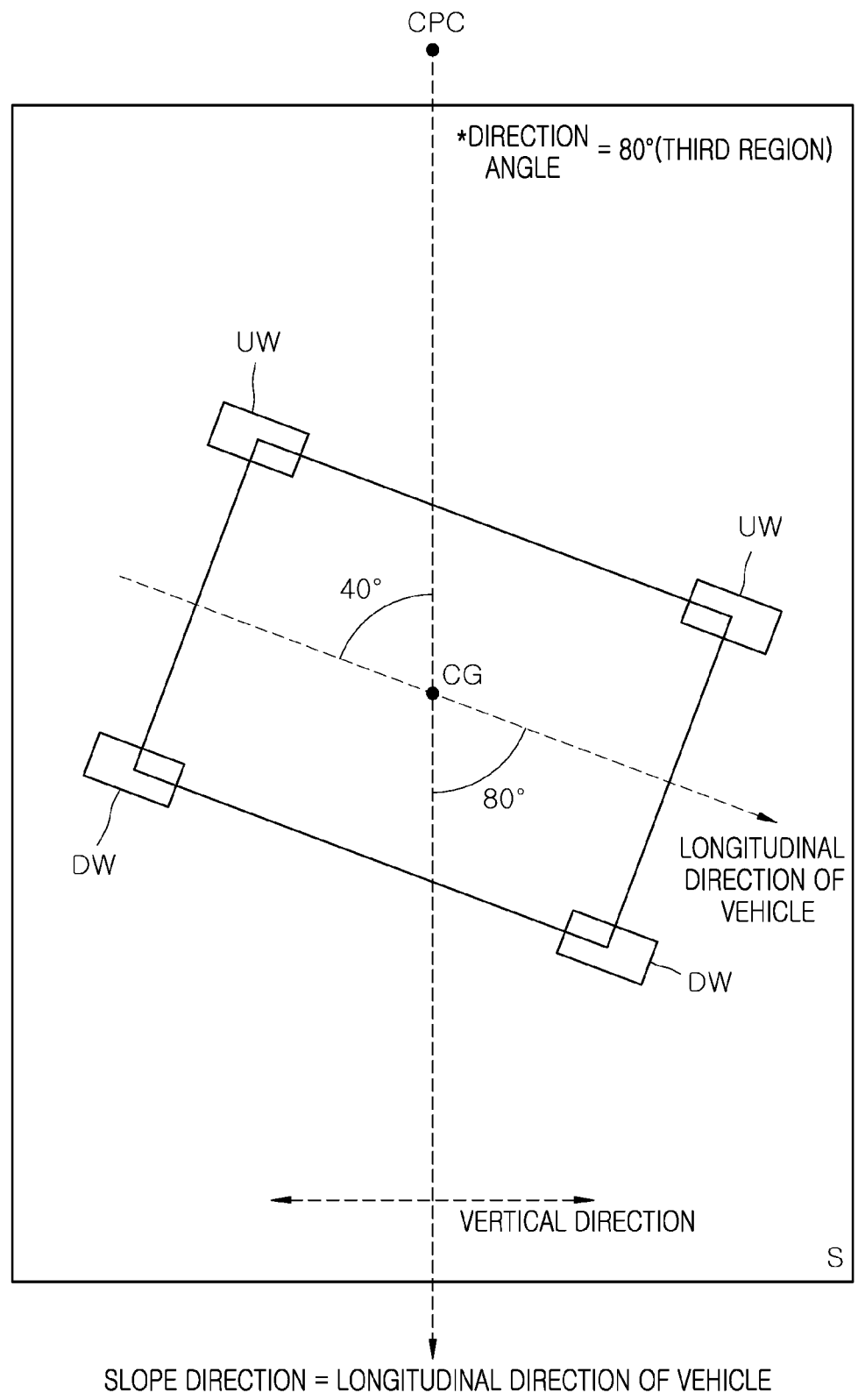

In the present embodiment, when a braking initiation manipulation is obtained by the braking initiation manipulation acquisition unit 13 in the state in which a vehicle has been placed in the slope S, the controller 20 may perform the braking of the vehicle by independently controlling the steering of four wheels of the vehicle based on an angle (acute angle) (defined as a direction angle in the present embodiment) between an inclined direction of the slope S and a longitudinal direction of the vehicle. FIG. 61 illustrates an example in which the vehicle is placed in the slope S. FIGS. 62 to 64 illustrate postures of the vehicle when the vehicle and the slope S are viewed from a direction "A" in FIG. 61 (FIG. 62: the direction angle is 0°, FIG. 63: the direction angle is 40°, FIG. 64: the direction angle is 80°).

In this case, the controller 20 may align the four wheels of the vehicle according to different rules with respect to down wheels DW disposed on the lower side of the slope S and up wheels UW disposed on the upper side of the slope S among the four wheels. The state in which the direction angle is 0° in FIG. 62 is described as an example. A relatively great load is applied to the down wheels DW disposed on the lower side of the slope S and a relatively small load is applied to the up wheels UW disposed on the upper side of the slope S, on the basis of the inclined direction of the slope S. Accordingly, aligning the down wheels DW to which the relatively great load is applied in a way to limit a movement of the vehicle to the inclined direction of the slope S and aligning the up wheels UW to which the relatively small load is applied in a way to limit a movement of the vehicle to a direction perpendicular to the slope direction are effective in prohibiting a movement of the vehicle from the slope S to the longitudinal direction and transverse direction of the vehicle and maintaining the parking and stopping state of the vehicle.

Accordingly, if steering control rules for a down wheel DW and an up wheel UW are indicated as a first rule and a second rule, respectively, the first rule may be predefined in the controller 20 as a rule for limiting a movement of the vehicle to an inclined direction of the slope S. Furthermore, the second rule may be predefined in the controller 20 as a rule for limiting a movement of the vehicle to a direction perpendicular to a slope direction of the slope S on the inclined plane of the slope.

Figure 65:
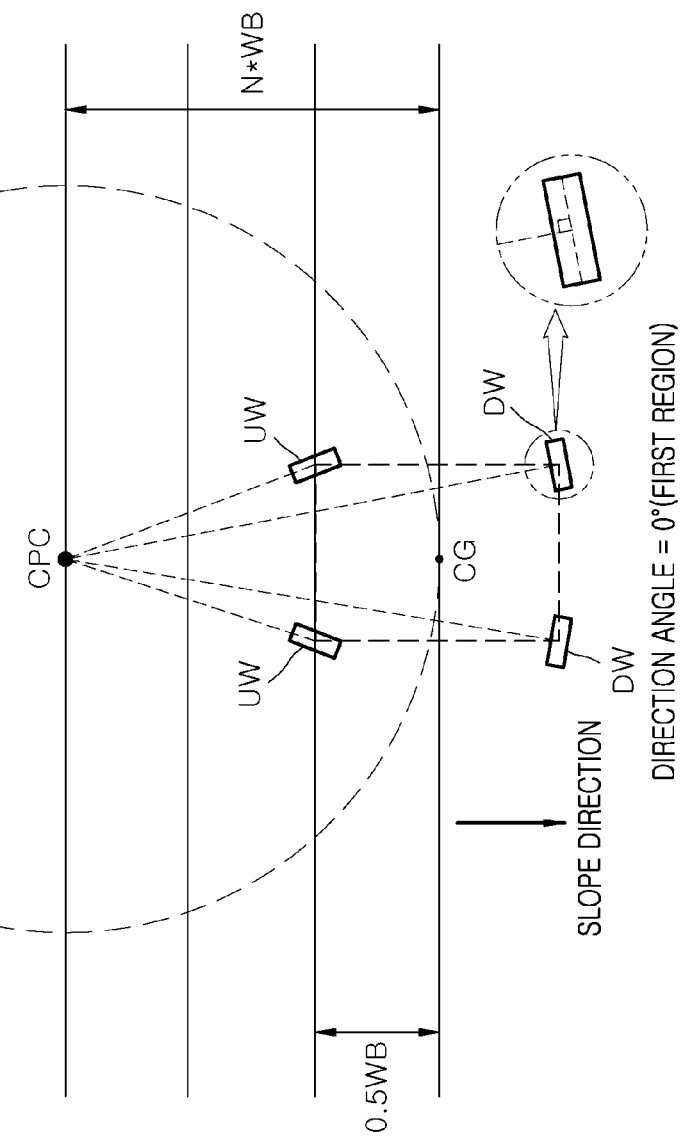

A process of aligning down wheels DW and up wheels UW according to the first rule and the second rule is described in detail with reference to FIG. 65 illustrating an example in which the direction angle is 0°. When the direction angle is 0°, down wheels DW are defined as two wheels disposed on the lower side of the slope S among the four wheels. Up wheels UW are defined as the remaining two wheels disposed on the upper side of the slope S among the four wheels (the down wheels DW and the up wheels UW are differently defined depending on the direction angle, and is described in detail later).

Figure 66:
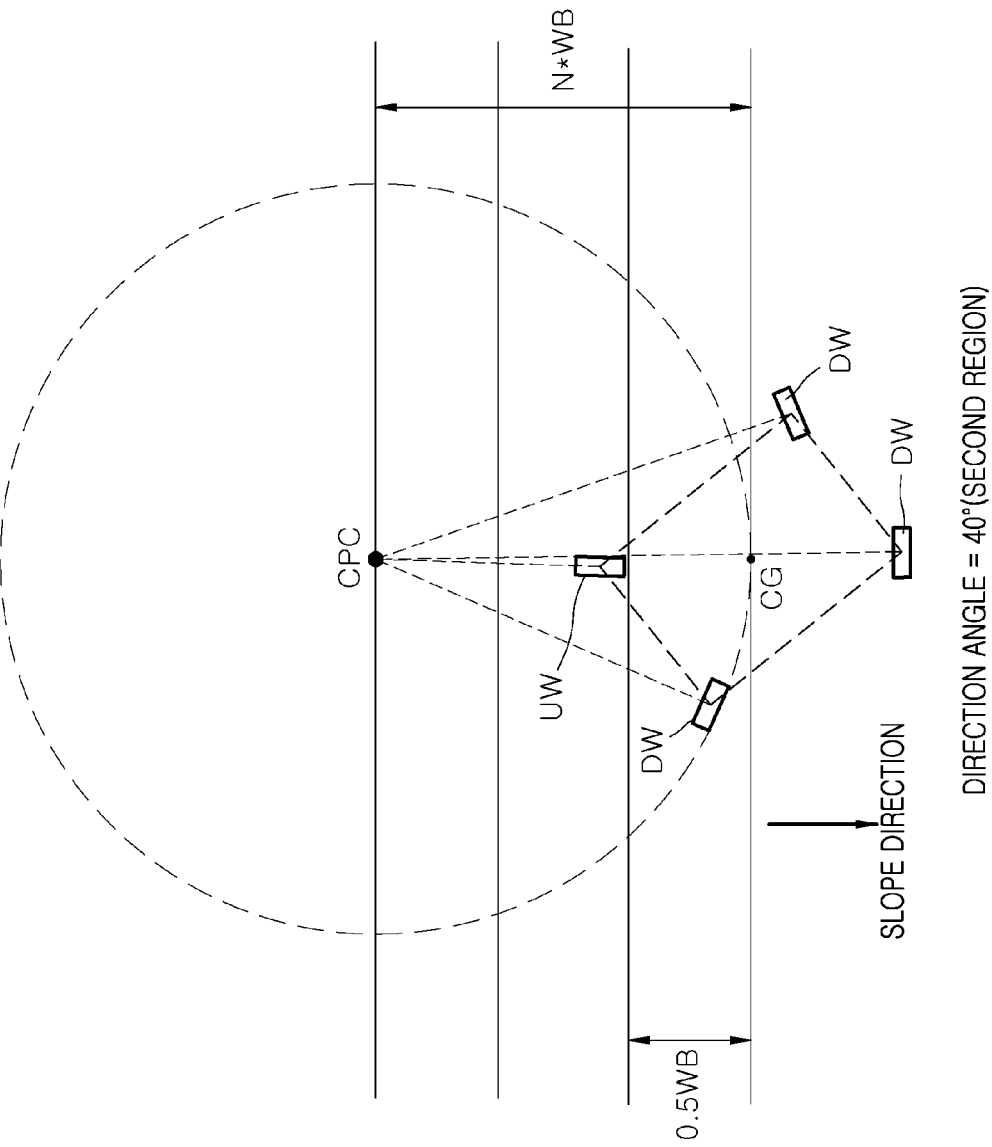
Figure 67:
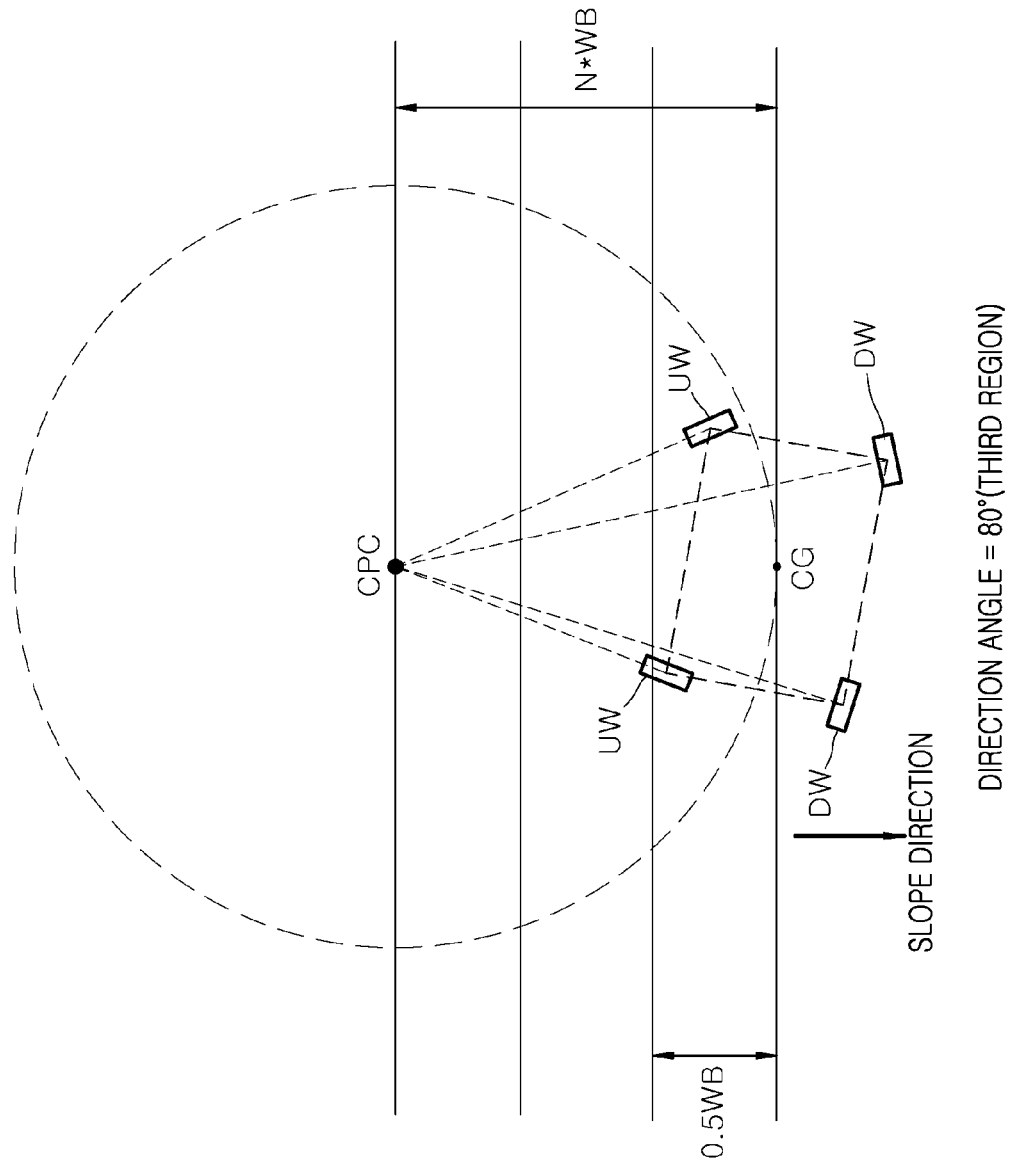

As a criterion for aligning down wheels DW and up wheels UW, the present embodiment adopts a reference point that is defined as a point separated from the center of gravity (GC) of a vehicle by a set distance in a direction opposite to a slope direction. If a circle having the reference point as a center thereof and passing through the center of gravity (GC) of the vehicle is defined as a parking circle, the reference point may be named the center of parking circle (CPC). Wheels may be aligned on the basis of the reference point CPC, and the vehicle may converge on a stable state with respect to the slope S. The set distance may be represented as N*WB. In this case, WB is a distance between a front wheel axle and a rear wheel axle, and N corresponds to a value that is set based on a gradient of the vehicle (e.g., the controller 20 may set a value of N so that N has a higher value as the gradient becomes greater. In FIGS. 65 to 67, N=1.5). An algorithm that defines the reference point CPC may be preset in the controller 20.

If the reference point CPC is defined as described above, the first rule may be defined as a rule for aligning down wheels DW so that a straight line that connects the reference point CPC and a center point of the down wheels DW and long axes of the down wheels DW become perpendicular to each other. The second rule may be defined as a rule for aligning up wheels UW so that a straight line that connects the reference point CPC and a center point of the up wheels UW and long axes of the up wheels UW are placed on the same line.

Accordingly, as illustrated in FIG. 65, the controller 20 may align down wheels DW so that a straight line that connects the reference point CPC and a center point of the down wheels DW and long axes of the down wheels DW become perpendicular to each other according to the first rule, and may align up wheels UW so that a straight line that connects the reference point CPC and a center point of the up wheels UW and long axes of the up wheels UW are placed on the same line according to the second rule.

A case where down wheels DW correspond to two wheels disposed on the lower side of the slope S among the four wheels and up wheels UW correspond to the remaining two wheels disposed on the upper side of the slope S among the four wheels has been described. However, as described above, in the present embodiment, down wheels DW and up wheels UW may be differently defined depending on a direction angle. As described above, a first area to a third area are defined.

The first area: an area in which the direction angle is equal to or greater than 0° and less than a first reference angle The second area: an area in which the direction angle is equal to or greater than the first reference angle and less than a second reference angle The third area: an area in which the direction angle is equal to or greater than the second reference angle or equal to or smaller than 90°

The first reference angle and the second reference angle may be preset in the controller 20 based on specifications of a vehicle and experimental results of a designer. For example, the first reference angle may be set to 20°, and the second reference angle may be set to 70°.

Accordingly, if the direction angle is present in the first area or the third area, down wheels DW may be defined as two wheels disposed on the lower side of the slope S among the four wheels, and up wheels UW may be defined as the remaining two wheels disposed on the upper side of the slope S among the four wheels. Furthermore, if the direction angle is present in the second area, down wheels DW may be defined as three wheels disposed on the lower side of the slope S among the four wheels, and up wheel UW may be defined as the remaining one wheel disposed on the upper side of the slope S. A case where the direction angle is present in the first area has been described with reference to FIG. 65. Accordingly, cases where the direction angle is present in the second area and the third area are described.

FIGS. 63 and 66 illustrate examples of a case where the direction angle is 40° and present in the second area. The controller 20 may align down wheels DW so that a straight line that connects the reference point CPC and a center point of down wheels DW (i.e., three down wheels DW) and long axes of the down wheels DW become perpendicular to each other according to the first rule. Furthermore, the controller 20 may align up wheels UW so that a straight line that connects the reference point CPC and a center point of an up wheel UW (i.e., the remaining one up wheel UW) and long axes of the up wheels UW are placed on the same line according to the second rule.

FIGS. 64 and 67 illustrate examples of a case where the direction angle is 80° and present in the third area. The controller 20 may align down wheels DW so that a straight line that connects the reference point CPC and a center point of down wheels DW (i.e., two down wheels DW) and the long axes of the down wheels DW become perpendicular to each other according to the first rule. Furthermore, the controller 20 may align up wheels UW so that a straight line that connects the reference point CPC and a center point of up wheels UW (i.e., the remaining two up wheels UW) and long axes of the up wheels UW are placed on the same line according to the second rule.

Through such control of the steering of each wheel and braking through alignment, a movement of a vehicle to a longitudinal direction and transverse direction of the vehicle in the slope S can be prohibited, and a parking and stopping state can be effectively maintained.

Figure 68:
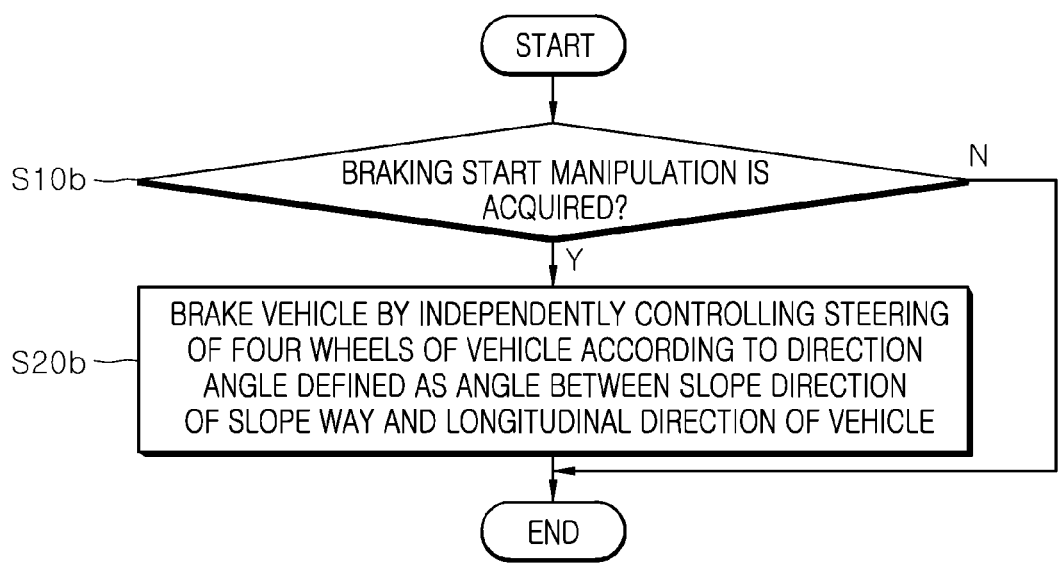
FIG. 68 is a flowchart for describing an operating method in the second application (the braking mechanism through individual steering) of a corner module apparatus for a vehicle according to an embodiment of the present disclosure.

FIG. 68 is a flowchart for describing an operating method in the second application of the corner module apparatus for a vehicle according to an embodiment of the present disclosure. An operating method of the corner module apparatus for a vehicle according to the present embodiment is described with reference FIG. 68. A detailed description of a portion redundant with the aforementioned contents is omitted, and a time-series configuration thereof is chiefly described.

First, the controller 20 determines whether a braking initiation manipulation of a vehicle by a driver has been obtained through the braking initiation manipulation acquisition unit 13 (S10*b*).

Next, when the braking initiation manipulation is obtained in the state in which the vehicle has been placed in the slope S, the controller 20 performs the braking of the vehicle by independently controlling the steering of four wheels of the vehicle based on a direction angle that is defined as an angle between an inclined direction of the slope S and a longitudinal direction of the vehicle (S20*b*).

In step S20*b*, the controller 20 aligns the four wheels of the vehicle according to the first rule and the second rule with respect to down wheels DW disposed on the lower side of the slope S and up wheels UW disposed on the upper side of the slope S among the four wheels of the vehicle. In this case, the down wheel DW and the up wheel UW may be defined based on the direction angle. Specifically, when the direction angle is present in the first area or the third area, the down wheels DW may be defined as two wheels disposed on the lower side of the slope S among the four wheels of the vehicle, and the up wheels UW may be defined as the remaining two wheels disposed on the upper side of the slope S among the four wheels of the vehicle. Furthermore, when the direction angle is present in the second area, the down wheels DW may be defined as three wheels disposed on the lower side of the slope S among the four wheels of the vehicle, and the up wheel UW may be defined as the remaining one wheel disposed on the upper side of the slope S among the four wheels of the vehicle.

The aforementioned first rule is a rule for limiting a movement of a vehicle to a slope direction. Furthermore, the second rule is a rule for limiting a movement of a vehicle to a direction perpendicular to a slope direction on an inclined plane of the slope S. The first rule and the second rule may be predefined in the controller 20. Specifically, if a point isolated from the center of gravity (GC) of the vehicle by a set distance in a direction opposite to the slope direction is defined as the reference point CPC, the first rule is defined as a rule for aligning down wheels DW so that a straight line that connects the reference point CPC and a center point of down wheels DW, and long axes of the down wheels DW become perpendicular to each other. The second rule is defined as a rule for aligning up wheels UW so that a straight line that connects the reference point CPC and a center point of up wheels UW and long axes of the up wheels UW are placed on the same line. Accordingly, in step S20, the controller 20 aligns down wheels DW so that a straight line that connects the reference point CPC and a center point of down wheels DW and long axes of the down wheels DW become perpendicular to each other according to the first rule, and aligns up wheels UW so that a straight line that connects the reference point CPC and a center point of up wheels UW and long axes of the up wheels UW are placed on the same line according to the second rule.

According to the second application, the braking of a vehicle can be safely performed regardless of the on and off state of a power source of the vehicle because the braking of the vehicle is performed in a way to control the state in which the four wheels of the vehicle have been aligned by independently controlling the steering of each of the four wheels.

3. Third Application: Posture Control Mechanism for Improving Straight Driving Performance In the case of the existing vehicle having an internal combustion engine structure, driving power is delivered through an engine-drive shaft-differential-axial shaft. In contrast, in the case of a four-wheel independent-driving method premised by the present embodiment, a speed difference may occur between the four wheels because the four wheels are individually and independently driven and an axial shaft is not present. Such a speed difference between the four wheels becomes a danger element that causes the spin or rollover of a vehicle when the vehicle drives straight ahead. Accordingly, the third application proposes a method of improving straight driving performance of a vehicle through an approach in terms of driving control, not in terms of mechanical or additional steering control of a vehicle.

To this end, the controller 20 may detect an abnormal wheel that causes the deterioration of straight driving performance of a vehicle based on the four wheel velocities obtained by the wheel velocity acquisition part 14, may calculate a compensation parameter for compensating for a deviation between the wheel velocities based on a wheel velocity of the detected abnormal wheel, may determine target driving torque for driving the abnormal wheel based on the calculated compensation parameter, and may control the driving of the abnormal wheel based on the determined target driving torque. Hereinafter, a configuration of the present embodiment is described in detail for each operation of the controller 20.

First, in relation to the method of detecting an abnormal wheel, the controller 20 may detect an abnormal wheel in a way to calculate a first average value of the four wheel velocities and determining whether an error between the calculated first average value and each of the four wheel velocities is equal to or greater than a preset threshold value. If wheel velocities of a left front wheel, right front wheel, left rear wheel, and right rear wheel of a vehicle are $V_{fl}$, $V_{fr}$, $V_{rl}$, and $V_{rr}$, a first average value $V_{avg}$ may be represented as $(V_{fl}+V_{fr}+V_{rl}+V_{rr})/4$. A method of detecting an abnormal wheel may be represented as a conditional expression "$V_{avg}-V_i \geq$ threshold value, i=fl, fr, rl, rr." For example, if a wheel that satisfies the conditional expression corresponds to the left front wheel (fl), an abnormal wheel may be specified as the left front wheel. If a wheel that satisfies the conditional expression corresponds is plural, an abnormal wheel may be specified as a wheel having a lower wheel velocity among the plurality of wheels. Accordingly, an abnormal wheel is specified as a wheel that deteriorates straight driving performance of a vehicle because the abnormal wheel has a lower wheel velocity by a predetermined value or more than other wheels when a vehicle drives straight ahead. In the conditional expression, the threshold value may be defined as another value based on the first average value. For example, by defining that the threshold value has a higher value as the first average value has a higher value, an abnormal wheel may be determined based on a more reinforced criterion for the driving stability of a vehicle in a high-speed area.

When detecting an abnormal wheel, the controller 20 may calculate a compensation parameter for compensating for a deviation between the wheel velocities based on a wheel velocity of the detected abnormal wheel. Compensating for a deviation between the wheel velocities means that a deviation between the wheel velocities of the abnormal wheel and another wheel is reduced by increasing and compensating for driving torque of the abnormal wheel (i.e., by increasing the wheel velocity of the abnormal wheel).

In this case, the controller 20 may calculate a second average value of wheel velocities of three wheels except the abnormal wheel, and may calculate a compensation parameter by using, as factors, a difference value between the calculated second average value and the wheel velocity of the abnormal wheel and a variable gain according to the second average value. In the example in which an abnormal wheel is detected as the left front wheel, the second average value $V_{target}$ may be represented as $(V_{fr}+V_{rl}+V_{rr})/3$, and the compensation parameter may be represented as $\alpha*V_{target}*(V_{target}-V_{fl})$. In the equation of the compensation parameter, the second term $V_{target}$ functions as a term for taking into consideration a target wheel velocity that is the subject of tracking in the process of calculating the compensation parameter, and the third term $V_{target}-V_{fl}$ functions as a term for taking into consideration a deviation between the wheel velocity of the abnormal wheel and a target wheel velocity in the process of calculating the compensation parameter. The first term a is a variable gain, and functions as a scaling factor for scaling the size of the compensation parameter.

Figure 69:
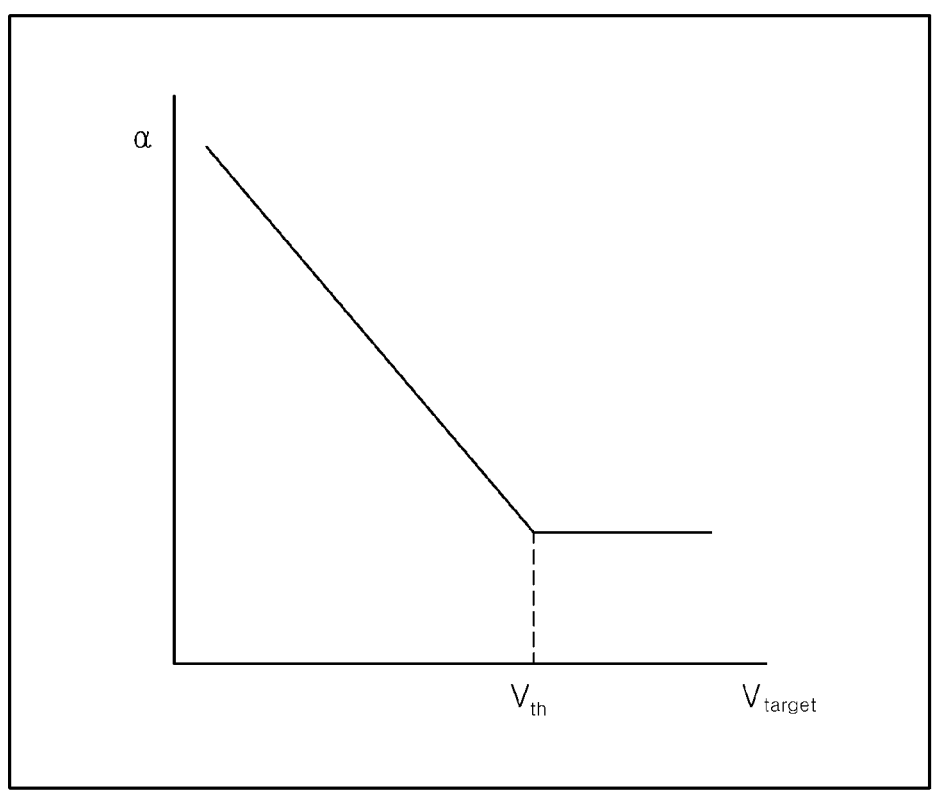
FIG. 69 is an exemplary diagram illustrating a method of determining a variable gain in a third application (a posture control mechanism for improving straight driving performance) of a corner module apparatus for a vehicle according to an embodiment of the present disclosure.

As illustrated in FIG. 69, the variable gain may be determined as a value that is decreased as the second average value is increased when the second average value ($V_{target}$) is placed in a predefined middle and low-speed area (e.g., an area having a predefined threshold velocity ($V_{th}$) or less), and may be determined as a predefined fixed when the second average value ($V_{target}$) is placed in a predefined high-speed area (e.g., an area having more than the predefined threshold velocity ($V_{th}$)). That is, as the second average value $V_{target}$ functioning as a target wheel velocity has a higher value, the compensation parameter functioning as compensation for driving torque of an abnormal wheel is calculated as a lower value. In this case, it is suitable to secure the driving stability of a vehicle without a sudden change in a current driving control state of the vehicle. If the second average value $V_{target}$ is greater than the threshold velocity, it is suitable to maintain the driving stability of the vehicle in calculating the compensation parameter as a lower limit value (i.e., the fixed value). Accordingly, the controller 20 may calculate the compensation parameter so that the compensation parameter has a different value based on the second average value as illustrated in FIG. 69.

When calculating the compensation parameter, the controller 20 may determine target driving torque for driving the abnormal wheel based on the calculated compensation parameter. In this case, the controller 20 may determine the target driving torque by applying current driving torque (i.e., the existing driving torque) for driving the abnormal wheel to the compensation parameter (i.e., target driving torque=current driving torque*compensation parameter). Thereafter, the controller 20 may control the driving of the abnormal wheel based on the target driving torque determined as described above. Since the driving torque for driving the abnormal wheel is compensated for compared to a conventional technology, straight driving performance of the vehicle can be improved.

The controller 20 may recalculate a first average value of the four wheel velocities in the state in which the driving of the abnormal wheel is controlled based on the target driving torque, and may output alarm through the output unit 30 when an error between the recalculated first average value and a wheel velocity of the abnormal wheel is equal to or greater than the threshold value. That is, the controller 20 may determine whether straight driving performance of the vehicle has been improved in a way to determine whether an error between the recalculated first average value and the wheel velocity of the abnormal wheel is less than the threshold value, and may calculate target driving torque through the aforementioned process. Even though the driving of the abnormal wheel has been controlled, if it is determined that the error between the recalculated first average value and the wheel velocity of the abnormal wheel is equal to or greater than the threshold value, such a situation is a situation in which a danger element, such as the spin or rollover of the vehicle, is present because a deviation between the wheel velocities of the four wheels is equal to or greater than a predetermined value. Accordingly, the controller 20 may output alarm through the output unit 30 so that a driver can recognize the corresponding situation.

Figure 70:
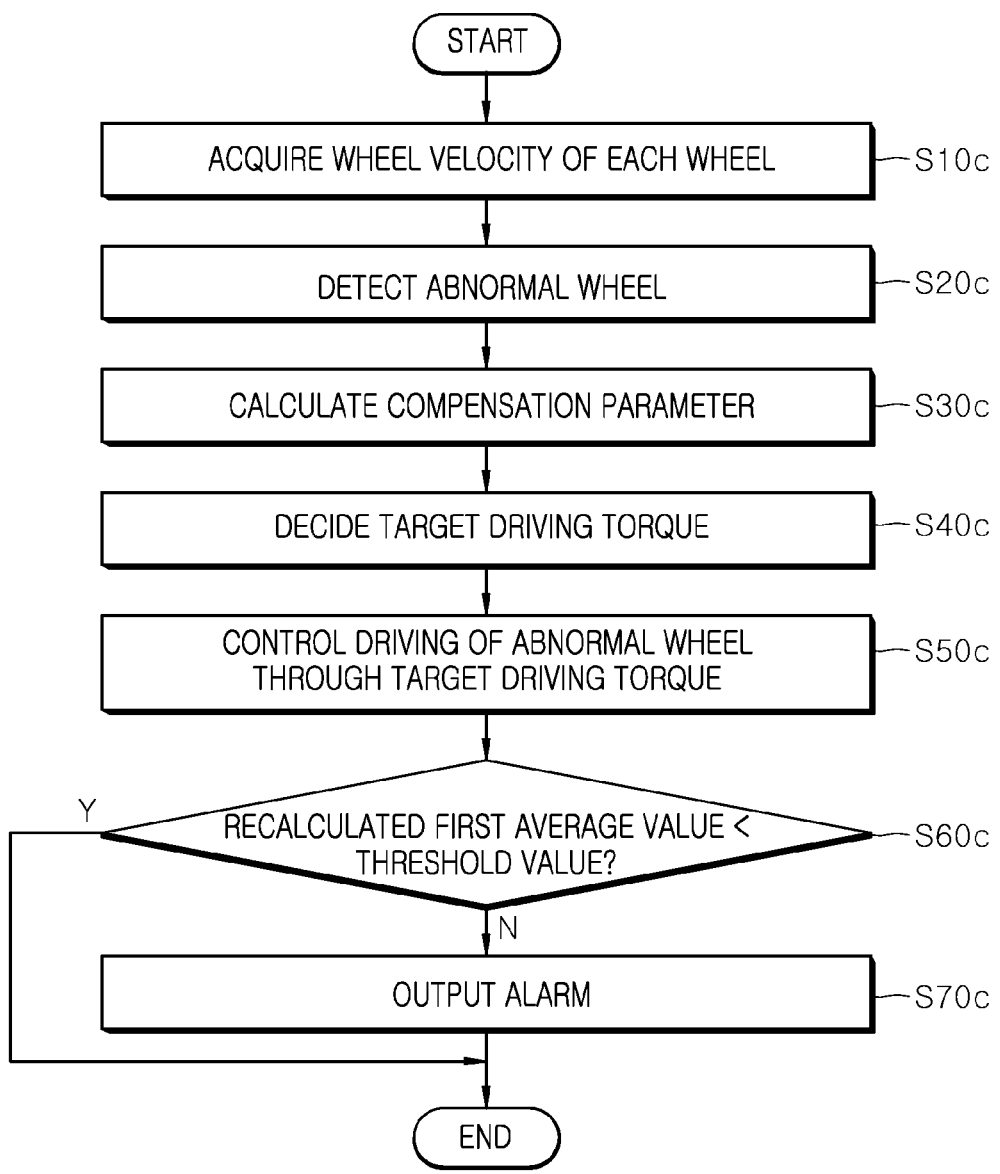
FIG. 70 is a flowchart for describing an operating method in the third application (the posture control mechanism for improving straight driving performance) of a corner module apparatus for a vehicle according to an embodiment of the present disclosure.

FIG. 70 is a flowchart for describing an operating method in the third application of the corner module apparatus for a vehicle according to an embodiment of the present disclosure. The operating method of the corner module apparatus for a vehicle according to the present embodiment is described with reference to FIG. 70. A detailed description of a portion redundant with the aforementioned contents is omitted, and a time-series configuration thereof is chiefly described.

First, the controller 20 obtains four wheel velocities of a vehicle through the wheel velocity acquisition part 14 (S10c).

Next, the controller 20 detects an abnormal wheel that causes the deterioration of straight driving performance of the vehicle based on the four wheel velocities obtained in step S10c (S20c). In step S20c, the controller 20 calculates a first average value of the four wheel velocities, and detects an abnormal wheel in a way to determine whether an error between the calculated first average value and each of the four wheel velocities is equal to or greater than a preset threshold value.

Next, the controller 20 calculates a compensation parameter for compensating for a deviation between the four wheel velocities based on a wheel velocity of the abnormal wheel detected in step S20c (S30c). In step S30c, the controller 20 calculates a second average value of wheel velocities of three wheels except the abnormal wheel, and calculates the compensation parameter by using, as factors, a difference value between the calculated second average value and the wheel velocity of the abnormal wheel, a variable gain according to the second average value, and the second average value. The variable gain is determined as a value that is decreased as the second average value is increased when the second average value is placed in a predefined middle and low-speed area, and is determined as a predefined fixed value when the second average value is placed in a predefined high-speed area.

Next, the controller 20 determines target driving torque for driving the abnormal wheel based on the compensation parameter calculated in step S30c (S40c). Specifically, the controller 20 determines the target driving torque by applying the compensation parameter to current driving torque for driving the abnormal wheel.

Next, the controller 20 controls the driving of the abnormal wheel based on the target driving torque determined in step in S40c (S50c), and controls other wheels except the abnormal wheel based on the existing driving torque.

Next, the controller 20 recalculates a first average value of the four wheel velocities, and compares an error between the recalculated first average value and a wheel velocity of the abnormal wheel with the threshold value (S60c). When determining that the error between the recalculated first average value and the wheel velocity of the abnormal wheel is equal to or greater than the threshold value in step S60c, the controller 20 outputs alarm through the output unit 30 (S70c).

According to the third application, straight driving performance of the vehicle can be improved by compensating for a deviation between wheel velocities through only control of driving torque for four wheels without additional instrument to additional steering control for a vehicle.

4. Fourth Application: Posture Control Mechanism for Solving Slip

In the case of the existing front wheel driving vehicle, there is a limit in that battery consumption of a vehicle is increased because posture control over the vehicle is performed through electronic control systems, such as an anti-lock brake system (ABS), an electronic stability program (ESP), and electronic controlled suspension (ECS). In the present embodiment, posture control over a vehicle is possible in a way to control the driving and steering of each wheel compared to a conventional posture control over system of a vehicle because the driving of each wheel is independently controlled by applying the four wheel-independent driving method. Hereinafter, a detailed configuration for performing posture control over a vehicle in a way to control the driving and steering of each wheel is described on the basis of an operation of the controller 20.

In the fourth application, the controller 20 may determine whether a predefined slip condition has been satisfied based on a wheel velocity of each wheel obtained by the wheel velocity acquisition part 14, and may perform posture control over a vehicle through driving torque control for controlling driving torque of each wheel when determining that the slip condition has been satisfied.

The slip condition is a case where a slip has occurred in a wheel, and corresponds to a condition for determining whether posture control for the driving stability of a vehicle is required. In this case, the controller 20 may calculate a slip rate of each wheel based on a wheel velocity of each wheel (as noted, the slip rate of each wheel may be calculated as a ratio of "a difference between a vehicle speed and each wheel velocity" and "a vehicle speed"), may determine a maximum slip rate having a maximum value among the calculated slip rates of the wheels, and may determine that the slip condition has been satisfied when the determined maximum slip rate is equal to or greater than a preset threshold value.

If it is determined that the slip condition has been satisfied, the controller 20 may perform posture control over the vehicle through the aforementioned driving torque control. In this case, the controller 20 may control the driving of each wheel based on target driving torque having a lower value compared to current driving torque of each wheel (the target driving torque may be determined as a value lower than a minimum value among values of current driving torque of the four wheels now applied for the driving of the wheels). That is, the controller 20 may perform control for reducing driving torque of the wheels in order to solve the slip state of a current wheel, and may control the driving of each wheel based on the same target driving torque. In this case, in order to solve the corresponding slip state, it is necessary to decrease the driving torque of each wheel to a lower value as a maximum slip rate is greater. Accordingly, the target driving torque may be determined to have a lower value as the maximum slip rate has a higher value. For example, the target driving torque and the maximum slip rate may be defined to have a negative linear relation in the controller 20.

After performing the driving torque control, the controller 20 may determine whether the slip state has been solved through driving torque control by re-determining whether the slip condition has been satisfied. If it is determined that the state in which the slip condition has been satisfied is maintained (i.e., if the slip state has not been solved), the controller 20 may perform posture control over the vehicle by subsequently performing steering control for controlling the steering of each wheel.

When performing the steering control, the controller 20 may perform the steering control in a way to displace the steering of two wheels on the opposite side of the transverse direction of a wheel having a maximum slip rate by a target steering angle. For example, if a wheel having a maximum slip rate corresponds to a right front wheel, the controller 20 may perform steering control in a way to displace the steering of a left front wheel and a left rear wheel by a target steering angle. In the above example, the steering control over the left front wheel and the left rear wheel is for solving the slip state of the right front wheel by deriving the braking effect of the vehicle, and a corresponding steering direction may be any one the left or the right. In this case, in order to solve the corresponding slip state, it is necessary to form greater steering angles of the two wheels on the opposite side of the transverse direction of the wheel as the maximum slip rate becomes greater. Accordingly, the target steering angle may be determined to have a higher value as the maximum slip rate has a higher value. For example, the target steering angle and the maximum slip rate may be defined to have a positive linear relation in the controller 20. In order to prevent a phenomenon in which a behavior of the vehicle becomes unstable due to sudden steering control over the two wheels on the opposite side of the transverse direction of the wheel, a control time until the steering angles of the two wheels on the opposite side of the transverse direction reach the target steering angle may be set as a sufficiently set time based on experimental results of a designer, and may be set in the controller 20.

Figure 71:
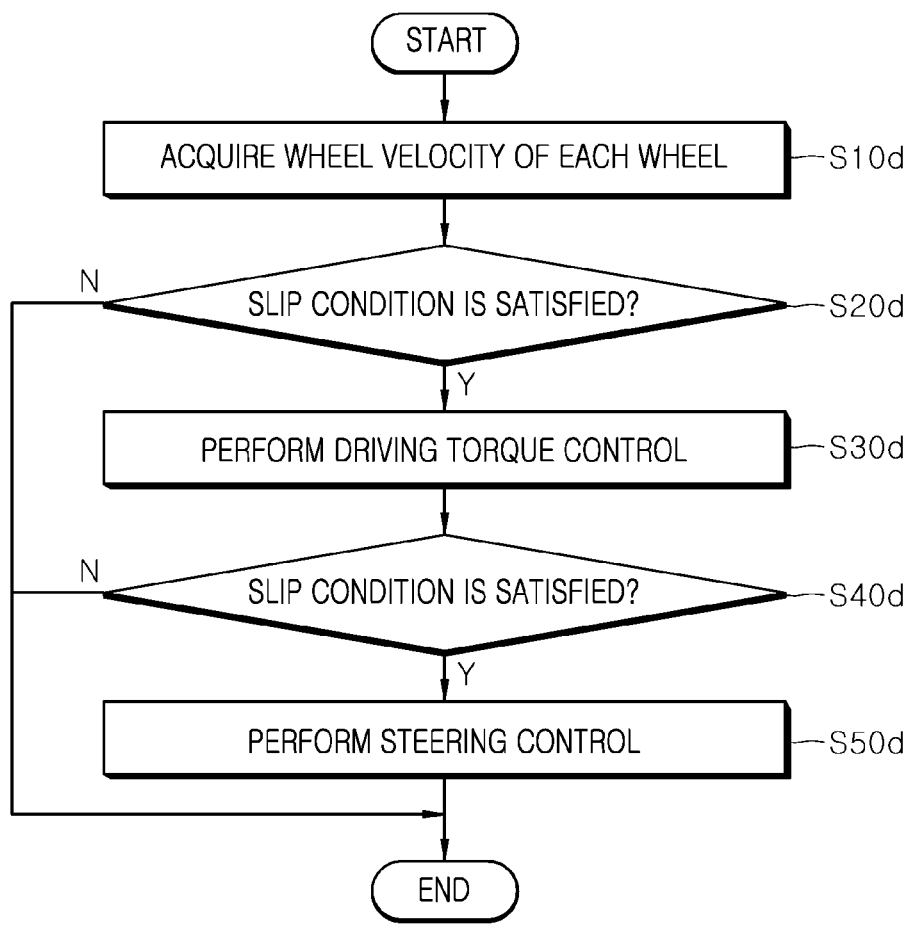
FIG. 71 is a flowchart for describing an operating method in a fourth application (a posture control mechanism for solving a slip) of a corner module apparatus for a vehicle according to an embodiment of the present disclosure.

FIG. 71 is a flowchart for describing an operating method in the fourth application of the corner module apparatus for a vehicle according to an embodiment of the present disclosure. The operating method of the corner module apparatus for a vehicle according to the present embodiment is described with reference to FIG. 71. A detailed description of a portion redundant with the aforementioned contents is omitted, and a time-series configuration thereof is chiefly described.

First, the controller 20 obtains a wheel velocity of each of four wheels of a vehicle through the wheel velocity acquisition part 14 (S10d).

Next, the controller 20 determines whether a predefined slip condition has been satisfied based on the wheel velocity of each wheel obtained in step S10d (S20d). In step S20d, the controller 20 calculates a slip rate of each wheel based on the wheel velocity of each wheel, determines a maximum slip rate having a maximum value among the calculated slip rates of the four wheels, and determines that the slip condition has been satisfied when the determined maximum slip rate is equal to or greater than the preset threshold value.

If it is determined that the slip condition has been satisfied in step S20d, the controller 20 performs posture control over the vehicle through driving torque control for controlling driving torque of each wheel (S30d). In step S30d, the controller 20 controls the driving of each wheel based on target driving torque having a lower value compared to current driving torque of each wheel. In this case, the target driving torque may be determined to have a lower value as the maximum slip rate has a higher value.

After step S30d, the controller 20 re-determines whether the slip condition has been satisfied (S40d).

If it is determined that the state in which the slip condition has been satisfied is maintained in step S40d, the controller 20 performs posture control over the vehicle through steering control for controlling the steering of each wheel (S50d). In step S50d, the controller 20 displaces the steering of two wheels on the opposite side of the transverse direction of a wheel having the maximum slip rate by a target steering angle. In this case, the target steering angle may be determined to have a higher value as the maximum slip rate has a higher value.

Steps S40d and S50d may be repeatedly performed within a predefined repetition number until it is determined that the slip condition has not been satisfied in step S40d (i.e., until the slip state is solved).

According to the fourth application, dependency on a conventional posture control system of a vehicle can be removed, and posture control over a vehicle is possible by using only a method of controlling the driving and steering of each wheel. Accordingly, there is an effect in that an available battery capacity can be increased by reducing battery consumption required for posture control over a vehicle.

5. Fifth Application: Target Trajectory Generation and Tracking Control Mechanism In the case of the four wheel-independent driving method, the steering of each wheel needs to be independently controlled because the four wheels are not mechanically connected. In particular, in order to secure the driving stability of a vehicle upon rotation driving, a quantitative control mechanism for steering control over each wheel needs to be provided. Accordingly, the fifth application proposes a method of independently controlling the steering of each of four wheels of a vehicle by differentially calculating a target steering angle of each wheel, if the vehicle to which the four wheel-independent driving method has been applied rotates and drives on a crossroad having a predetermined curvature (specifically, when the slip of each wheel does not occur, which corresponds to a case where the vehicle rotates at a low speed at a vehicle speed less than a set speed).

In the fifth application, the controller 20 may calculate information on a distance up to a target point, that is, a target of a movement of a vehicle, based on driving state information and driving environment information obtained by the vehicle information acquisition unit 15, may calculate, based on the calculated information on the distance, target curvature defined as curvature of a target trajectory up to the target point, may calculate a target steering angle of each of four wheels of a vehicle based on the calculated target curvature, and may independently control the steering of each of the four wheels based on the target steering angles. Hereinafter, a configuration of the present embodiment is described in detail for each operation of the controller 20.

First, in relation to a method of calculating the information on the distance up to the target point, the controller 20 may calculate the information on the distance up to the target point by using a vehicle speed of the vehicle, an offset distance of the vehicle from the middle (④ in FIG. 72) of a carriageway calculated from surrounding image information, and a curvature radius of the carriageway based on the middle of the carriageway (the offset distance and the curvature radius of the carriageway may be calculated by analyzing a lane and the carriageway included in the surrounding image information). The information on the distance may include a straight-line distance, a longitudinal distance, and a transverse distance from a current location (C in FIG. 72) of the vehicle to the target point (A in FIG. 72).

Specifically, the controller 20 may calculate the straight-line distance up to the target point in a way to apply the vehicle speed of the vehicle to a predefined distance calculation algorithm. In this case, the distance calculation algorithm may be predefined in the controller 20 as an algorithm for calculating a greater straight-line distance as a vehicle speed becomes higher. For example, the distance calculation algorithm may be defined in a linear expression form of L=A*$V_x$+B (L is the straight-line distance, $V_x$ is the vehicle speed, and A and B are constant values designed based on experimental results of a designer).

Figure 72:
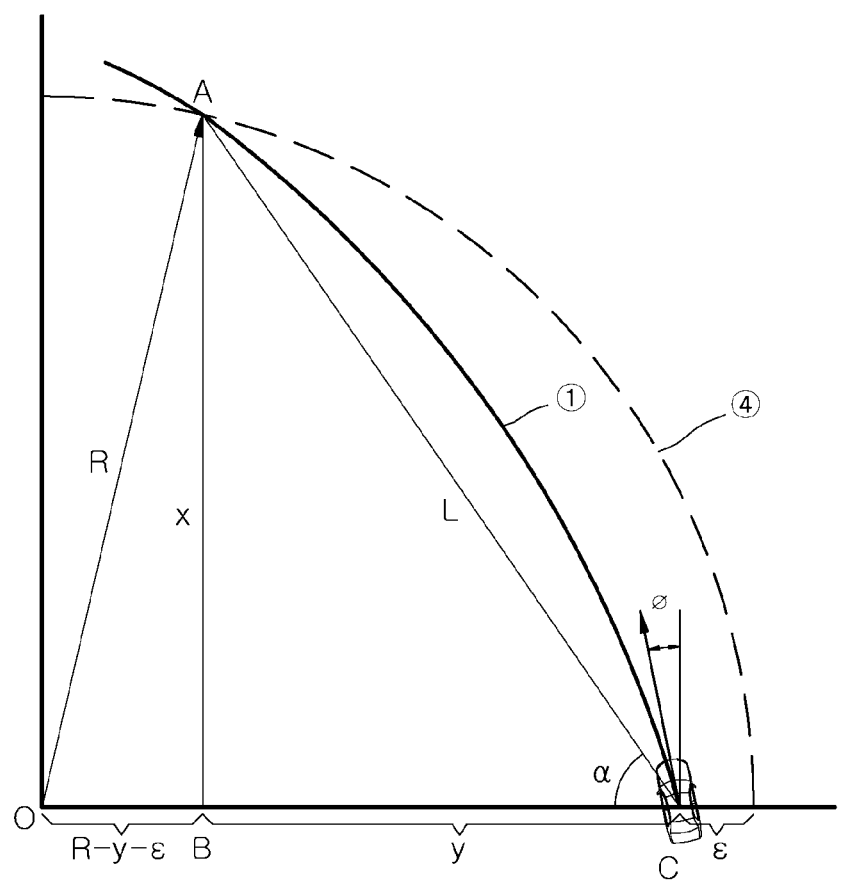
FIG. 72 is an exemplary diagram illustrating a process of calculating distance information and center target curvature in a fifth application (a target trajectory generation and tracking control mechanism) of a corner module apparatus for a vehicle according to an embodiment of the present disclosure.

When calculating the straight-line distance up to the target point, the controller 20 may calculate a longitudinal distance and transverse distance up to the target point by using the offset distance, a heading angle of the vehicle, the curvature radius of the carriageway, and the straight-line distance up to the target point. Referring to FIG. 72, Equation 1 below may be derived.

$$R^2 = (R - y - \varepsilon)^2 + x^2 \quad \text{[Equation 1]}$$

$$(x^2 = L^2 - y^2) \Longrightarrow R^2 =$$

$$R^2 + y^2 + \varepsilon^2 - 2Ry + 2y\varepsilon - 2\varepsilon R + L^2 - y^2 \Longrightarrow 2y(R - \varepsilon) =$$

$$\varepsilon^2 - 2\varepsilon R + L^2 \Longrightarrow y = \frac{L^2 + \varepsilon^2 - 2\varepsilon R}{2(R - \varepsilon)} =$$

$$\frac{\rho_k(L^2 + \varepsilon^2) - 2\varepsilon}{2(1 - \rho_k\varepsilon)} \Longrightarrow y = \frac{L^2 - \varepsilon^2 - 2\varepsilon(R - \varepsilon)}{2(R - \varepsilon)} = \frac{\rho_k(L^2 - \varepsilon^2)}{2(1 - \rho_k\varepsilon)} - \varepsilon$$

Equation 2 below is obtained by arranging Equation 1 with respect to x and y.

$$x = \sqrt{L^2 - y^2} \quad \text{[Equation 2]}$$

$$y = \frac{\rho_k(L^2 + \varepsilon^2) - 2\varepsilon}{2(1 - \rho_k\varepsilon)} = \frac{\rho_k(L^2 - \varepsilon^2)}{2(1 - \rho_k\varepsilon)} - \varepsilon$$

In Equations 1 and 2, L, x, and y are the straight-line distance, the longitudinal distance, and the transverse distance up to the target point, respectively. R is the curvature radius of the carriageway. $\rho_k$ is curvature (1/R) of the carriageway. $\varepsilon$ is the offset distance.

When calculating the information on the distance up to the target point as described above, the controller 20 may calculate target curvature defined as curvature of a target trajectory up to the target point, based on the calculated information on the distance. In the present embodiment, the target curvature may be divided into center target curvature defined as curvature of a target trajectory based on the center of the vehicle (i.e., a moving target trajectory of the center of the vehicle, ① in FIGS. 72 and 73), left target curvature defined as curvature of a target trajectory based on a left wheel of the vehicle (i.e., a moving target trajectory of the left wheel of the vehicle, ② in FIG. 73), and right target curvature defined as curvature of a target trajectory based on a right wheel of the vehicle (i.e., a moving target trajectory of the right wheel of the vehicle, ③ in FIG. 73). After preferentially calculating the center target curvature, the controller 20 may expand the center target curvature to the left target curvature and the right target curvature by using wheel track information of the vehicle.

Figure 73:
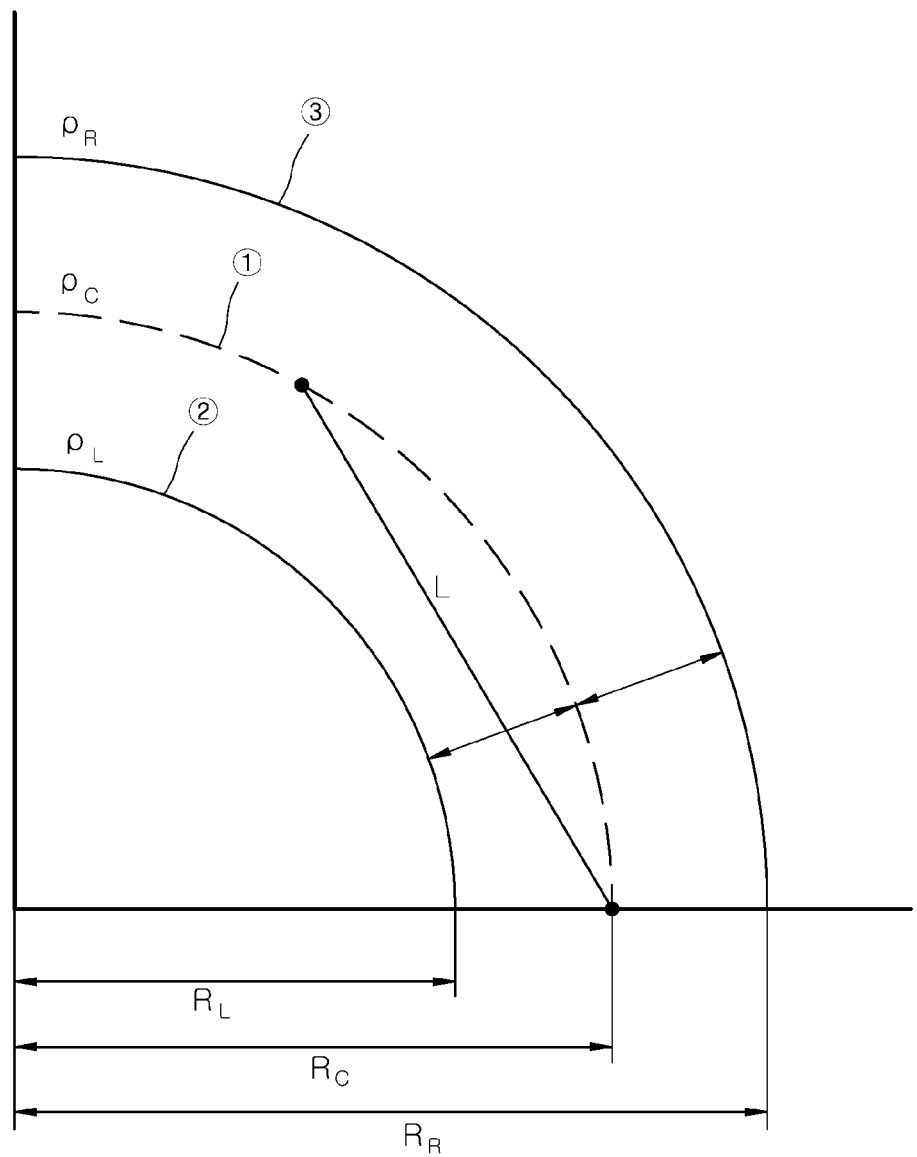
FIG. 73 is an exemplary diagram illustrating a process of calculating left target curvature and right target curvature in the fifth application (the target trajectory generation and tracking control mechanism) of a corner module apparatus for a vehicle according to an embodiment of the present disclosure.

Referring to FIGS. 72 and 73, the center target curvature may be calculated according to Equation 3 below.

$$R_c\cos(\phi + \alpha) = \frac{R_c}{L}(y\cos\phi - x\sin\phi) = \frac{L}{2} \quad \text{[Equation 3]}$$

$$\rho_c = \frac{1}{R_c} = \frac{2}{L^2}(y\cos\phi - x\sin\phi)$$

In Equation 3, $R_c$ is the curvature radius of the moving target trajectory of the center of the vehicle, φ is the heading angle of the vehicle, α is an angle formed by the vehicle and the target point, L is the straight-line distance up to the target point, and $\rho_c$ is the center target curvature (1/$R_c$).

After calculating the center target curvature, the controller 20 may calculate the left target curvature and the right target curvature based on the center target curvature by using the wheel track information of the vehicle. Referring to FIG. 73 illustrating an example in which the vehicle rotates and drives to the left, the left target curvature and the right target curvature may be calculated according to Equations 4 and 5 below, respectively.

$$R_L = R_C - w_L \quad \text{[Equation 4]}$$

$$\rho_L = \frac{1}{R_L} = \frac{1}{R_C - w_L} = \frac{\rho_c}{1 - \rho_c w_L}$$

$$R_R = R_C - w_R \quad \text{[Equation 5]}$$

$$\rho_R = \frac{1}{R_R} = \frac{1}{R_C - w_R} = \frac{\rho_c}{1 - \rho_c w_R}$$

In Equation 4, $R_L$ is a curvature radius of a moving target trajectory of a left wheel of the vehicle, $R_C$ is a curvature radius of a moving target trajectory of the center of the vehicle, $w_L$ is a half value of a wheel track of the vehicle (w/2, w is the wheel track), and $\rho_L$ is the left target curvature.

In Equation 5, $R_R$ is a curvature radius of a moving target trajectory of a right wheel of the vehicle, $R_C$ is the curvature radius of the moving target trajectory of the center of the vehicle, $w_R$ is a half value of a wheel track of the vehicle (w/2, w is the wheel track), and $\rho_R$ is the right target curvature.

FIG. 73 and Equations 4 and 5 describe the left rotation driving of the vehicle as an example. In the case of the right rotation driving of the vehicle, since a rotation-inner wheel and a rotation-outer wheel are reversed, the left target curvature and the right target curvature are calculated according to Equation 6 below.

$$\rho_L = \frac{\rho_c}{1 + \rho_c w_L} \quad \text{[Equation 6]}$$
$$\rho_R = \frac{\rho_c}{1 + \rho_c w_R}$$

When calculating the left target curvature and the right target curvature as described above, the controller 20 may calculate a target steering angle of each of the four wheels of the vehicle based on each calculated target curvature.

Specifically, target yaw rates of a left wheel and a right wheel may be represented like Equation 7 based on the calculated left target curvature and right target curvature.

$$YR_{des,L} = \rho_L v_x$$
$$YR_{des,R} = \rho_R v_x \quad \text{[Equation 7]}$$

In Equation 7, $YR_{des,L}$ is the target yaw rate of the left wheel, $\rho_L$ is the left target curvature, $YR_{des,R}$ is the target yaw rate of the right wheel, $\rho_R$ is the right target curvature, and $v_x$ is the vehicle speed.

Figure 74:
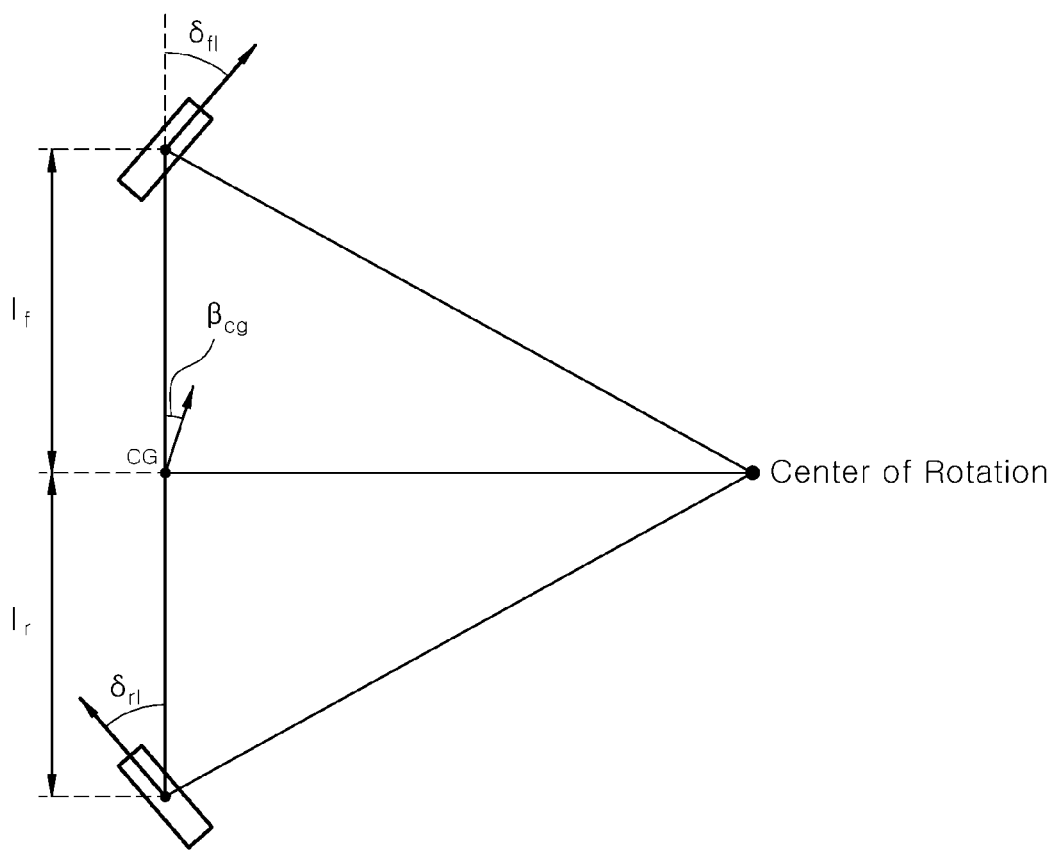
FIG. 74 is an exemplary diagram illustrating a process of calculating a target steering angle in the fifth application (the target trajectory generation and tracking control mechanism) of a corner module apparatus for a vehicle according to an embodiment of the present disclosure.

FIG. 74 illustrates an example of a vehicle kinetics model having a degree of 2 freedoms (only front and rear left wheels are illustrated in FIG. 74, for convenience sake). According to the vehicle kinetics model of FIG. 74, the slip angle of each wheel may be represented based on Equation 8 below.

$$\alpha_{fl} = \delta_{fl} - \frac{\beta_{cg} v_x + l_f YR_{des,L}}{v_x} \quad \text{[Equation 8]}$$
$$\alpha_{fr} = \delta_{fr} - \frac{\beta_{cg} v_x + l_f YR_{des,R}}{v_x}$$
$$\alpha_{rl} = \delta_{rl} - \frac{\beta_{cg} v_x - l_f YR_{des,L}}{v_x}$$
$$\alpha_{rr} = \delta_{rr} - \frac{\beta_{cg} v_x - l_f YR_{des,R}}{v_x}$$

In Equation 8, $\alpha_{fl}$, $\alpha_{fr}$, $\alpha_{rl}$, and $\alpha_{rr}$ are a slip angle of a left front wheel, a slip angle of a right front wheel, a slip angle of a left rear wheel, and a slip angle of a right rear wheel, respectively. $\beta_{cg}$ is a slip angle of the center of the vehicle. $v_x$ is the vehicle speed. $l_f$ is a distance between the axle of the front wheel of the vehicle and the center (cg) of the vehicle. $l_r$ is the axle of the rear wheel of the vehicle and the center (cg) of the vehicle. $YR_{des,L}$ and $YR_{des,R}$ are the target yaw rates of the left wheel and the right wheel. $\delta_{fl}$, $\delta_{fr}$, $\delta_{rl}$, and $\delta_{rr}$ are a target steering angle of the left front wheel, a target steering angle of the right front wheel, a target steering angle of the left rear wheel, and a target steering angle of the right rear wheel, respectively, which are subjects of calculation.

As described above, the present embodiment is a case where a vehicle rotates at a low speed and is subject to a case where the slip of each wheel does not occur. Accordingly, in Equation 8, $\alpha_{fl}$, $\alpha_{fr}$, $\alpha_{rl}$, $\alpha_{rr}$, and $\beta_{cg}$ may be approximated as a value of 0. Furthermore, the target steering angle of the left front wheel, the target steering angle of the right front wheel, the target steering angle of the left rear wheel, and the target steering angle of the right rear wheel may be calculated according to Equation 9 below.

$$\delta_{fl} = \frac{l_f YR_{des,L}}{v_x} = l_f \rho_L \quad \text{[Equation 9]}$$
$$\delta_{fr} = \frac{l_f YR_{des,R}}{v_x} = l_f \rho_R$$
$$\delta_{rl} = -\frac{l_r YR_{des,L}}{v_x} = -l_r \rho_L$$
$$\delta_{rr} = -\frac{l_r YR_{des,R}}{v_x} = -l_r \rho_R$$

The above case is a process of calculating the target steering angles the front wheel and the rear wheel in the reverse-phased state. The target steering angles of the front wheel and the rear wheel in the inphase state may be calculated through the following process.

First, the vehicle kinetics model in the inphase state may be represented according to Equation 10 below.

$$\frac{d}{dt}\begin{bmatrix}\beta\\\psi\end{bmatrix} = \begin{bmatrix}a_{11} & a_{12}\\a_{21} & a_{22}\end{bmatrix}\begin{bmatrix}\beta\\\psi\end{bmatrix} + \begin{bmatrix}b_{11} & b_{12}\\b_{21} & b_{22}\end{bmatrix}\begin{bmatrix}\delta_f\\\delta_r\end{bmatrix} \quad \text{[Equation 10]}$$

where $a_{11} = -\frac{C_f + C_r}{mv_x}$ $a_{12} = -1 - \frac{C_f l_f - C_r l_r}{mv_x^2}$ $a_{21} = -\frac{C_f l_f - C_r l_r}{I}$ $a_{22} = -\frac{C_f l_f^2 - C_r l_r^2}{I}$ $b_{11} = \frac{C_f}{mv_x}$ $b_{12} = \frac{C_r}{mv_x}$ $b_{21} = \frac{C_f l_f}{I}$ $b_{22} = \frac{C_r l_r}{I}$ In Equation 10, β and ψ are the slip angle and direction angle of the center of the vehicle. For each of factors that define a matrix parameter, reference is made to Table 2 below.

TABLE 2

| | |
|---|---|
| $v_x$ | Vehicle Speed |
| m | Vehicle Mass |
| I | Yaw moment of Inertia |
| If | Distance from the axle of the front wheel to C.G |
| Ir | Distance from the axle of the rear wheel to C.G |
| Cf | Front cornering coefficient |
| Cr | Rear cornering coefficient |

Since a case where the slip angle of the vehicle is 0 is presupposed, Equation 11 is derived because the left side and β in Equation 10 become 0.

$$\begin{bmatrix}\beta\\\psi\end{bmatrix} = \begin{bmatrix}a_{11} & a_{12}\\a_{21} & a_{22}\end{bmatrix}^{-1}\begin{bmatrix}b_{11} & b_{12}\\b_{21} & b_{22}\end{bmatrix}\begin{bmatrix}\delta_f\\\delta_r\end{bmatrix} = \quad \text{[Equation 11]}$$

-continued $$\begin{bmatrix} \dfrac{-a_{22}b_{11} + a_{12}b_{21}}{a_{11}a_{22} - a_{12}a_{21}} & \dfrac{-a_{22}b_{12} + a_{12}b_{22}}{a_{11}a_{22} - a_{12}a_{21}} \\ \dfrac{a_{21}b_{11} - a_{11}b_{21}}{a_{11}a_{22} - a_{12}a_{21}} & \dfrac{a_{22}b_{12} - a_{11}b_{22}}{a_{11}a_{22} - a_{12}a_{21}} \end{bmatrix} \begin{bmatrix} \delta_f \\ \delta_r \end{bmatrix}$$

In the condition in which β=0, a relation between $\delta_f$ and $\delta_r$ is derived like Equation 12 below.

$$\delta_r = \frac{-l_r + [ml_f/C_r(l_f + l_r)]v_x^2}{l_f + [ml_r/C_f(l_f + l_r)]v_x^2} \delta_f \quad \text{[Equation 12]}$$

The target steering angle of the left front wheel and the target steering angle of the right front wheel are calculated according to Equation 9. The target steering angle of the left rear wheel and the target steering angle of the right rear wheel are calculated according to a relation with Equation 12. Accordingly, in the inphase state, the target steering angle of the left front wheel, the target steering angle of the right front wheel, the target steering angle of the left rear wheel, and the target steering angle of the right rear wheel may be calculated according to Equation 13 below.

$$\delta_{fl} = \frac{l_f YR_{des,L}}{v_x} = l_f \rho_L \quad \text{[Equation 13]}$$

$$\delta_{fr} = \frac{l_f YR_{des,R}}{v_x} = l_f \rho_R$$

$$\delta_{rl} = \frac{-l_r + [ml_f/C_r(l_f + l_r)]v_x^2}{l_f + [ml_r/C_f(l_f + l_r)]v_x^2} \cdot (l_f \rho_L)$$

$$\delta_{rr} = \frac{-l_r + [ml_f/C_r(l_f + l_r)]v_x^2}{l_f + [ml_r/C_f(l_f + l_r)]v_x^2} \cdot (l_f \rho_R)$$

As a result, based on the predefined vehicle kinetics model, the controller 20 may calculate the target steering angle of the left front wheel by using a distance between the axle of the front wheel and center of the vehicle and the left target curvature, may calculate the target steering angle of the right front wheel by using a distance between the axle of the front wheel and center of the vehicle and the right target curvature, may calculate the target steering angle of the left rear wheel by using a distance between the axle of the rear wheel and center of the vehicle and the left target curvature, and may calculate the target steering angle of the right rear wheel by using a distance between the axle of the rear wheel and center of the vehicle and the right target curvature.

Figure 75:
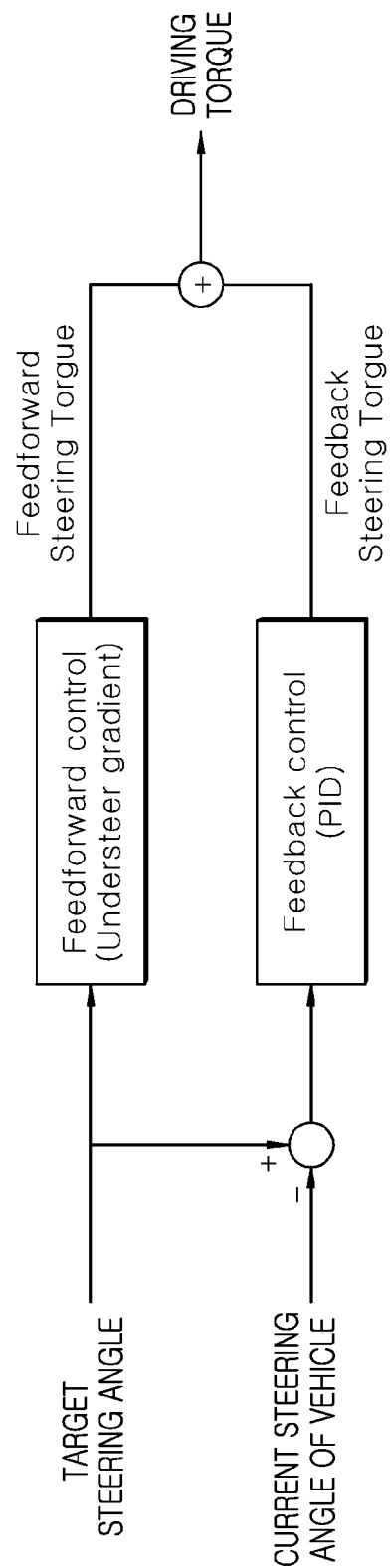
FIG. 75 is a block diagram illustrating a method of independently controlling the steering of each wheel in the fifth application (the target trajectory generation and tracking control mechanism) of a corner module apparatus for a vehicle according to an embodiment of the present disclosure.

When calculating the target steering angle of each wheel, the controller 20 may independently control the steering of each of the four wheels based on each of the calculated target steering angles. In this case, as illustrated in FIG. 75, the controller 20 may calculate driving torque for driving the four wheels through feedforward control (understeer gradient) and feedback control (PID control) for each of the target steering angles and a current steering angle of the vehicle, and may independently control the steering of each of the four wheels in a way to control the driving of the four wheels.

Figure 76:
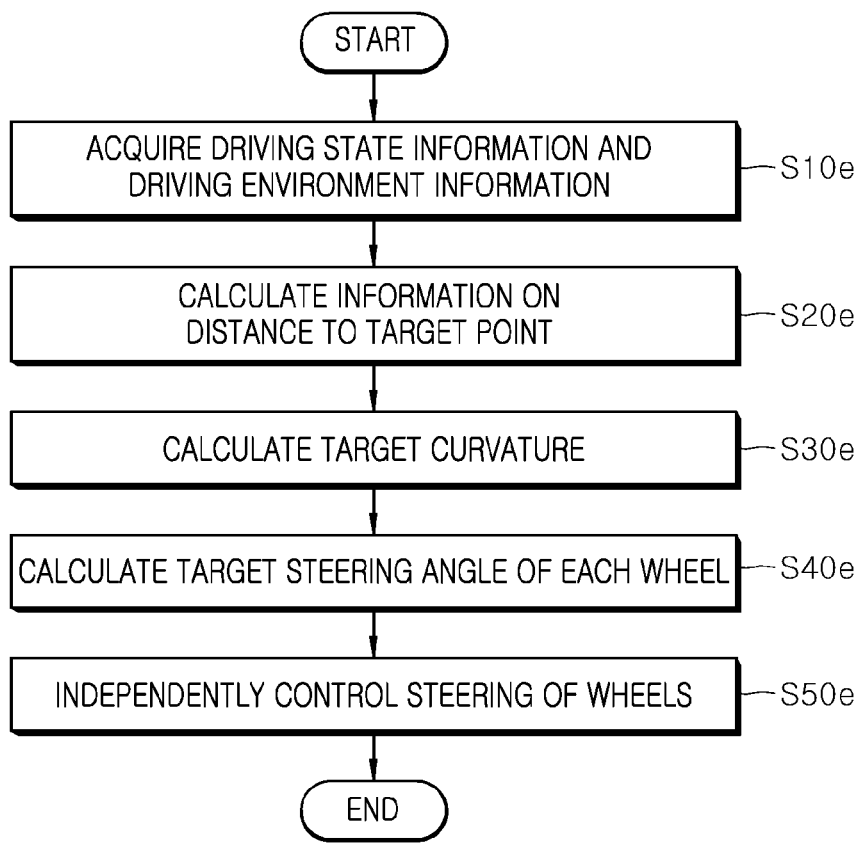
FIG. 76 is a flowchart for describing an operating method in the fifth application (the target trajectory generation and tracking control mechanism) of a corner module apparatus for a vehicle according to an embodiment of the present disclosure.

FIG. 76 is a flowchart for describing an operating method in the fifth application of the corner module apparatus for a vehicle according to an embodiment of the present disclosure. The operating method of the corner module apparatus for a vehicle according to the present embodiment is described with reference to FIG. 76. A detailed description of a portion redundant with the aforementioned contents is omitted, and a time-series configuration thereof is chiefly described.

First, the controller 20 obtains driving state information and driving environment information of a vehicle through the vehicle information acquisition unit 15 (S10e). The driving state information may include a vehicle speed and heading angle of the vehicle. The driving environment information may include surrounding image information (e.g., a front image) of the vehicle.

Next, the controller 20 calculates information on a distance up to a target point, that is, a target of a movement of the vehicle, based on the driving state information and driving environment information of the vehicle (S20e). In step S20e, the controller 20 calculates a straight-line distance, a longitudinal distance, and a transverse distance from the vehicle to the target point as the information on the distance up to the target point, by using the vehicle speed of the vehicle, an offset distance of the vehicle from the middle of a carriageway calculated based on the surrounding image information, and curvature radius of the carriageway based on the middle of the carriageway.

Next, the controller 20 calculates target curvature, defined as curvature of a target trajectory up to the target point, based on the information on the distance calculated in step S20e (S30e). The target curvature may be divided into center target curvature defined as curvature of a target trajectory based on the center of the vehicle, left target curvature defined as curvature of a target trajectory based on a left wheel of the vehicle, and right target curvature defined as curvature of a target trajectory based on a right wheel of the vehicle. Accordingly, in step S30e, after calculating the center target curvature by using the straight-line distance, the longitudinal distance, and the transverse distance from the vehicle to the target point, and the heading angle of the vehicle, the controller 20 calculates the left target curvature and the right target curvature based on the center target curvature by using wheel track information of the vehicle.

Next, the controller 20 calculates a target steering angle of each of the four wheels of the vehicle based on the target curvature calculated in step S30e (S40e). In step S40e, based on the predefined vehicle kinetics model, the controller 20 calculates a target steering angle of the left front wheel based on a distance between the axle of the front wheel and center of the vehicle and the left target curvature, calculates a target steering angle of the right front wheel based on a distance between the axle of the front wheel and center of the vehicle and the right target curvature, calculates a target steering angle of the left rear wheel based on a distance between the axle of the rear wheel and center of the vehicle and the left target curvature, and calculates a target steering angle of the right rear wheel based on a distance between the axle of the rear wheel and center of the vehicle and the right target curvature. In this case, the controller 20 calculates the target steering angle of each of the four wheels in a condition in which a slip angle of each wheel of the vehicle is 0.

Next, the controller 20 independently controls the steering of each of the four wheels based on each of the target steering angles calculated in step S40e (S50e). In step S50e, the controller 20 calculates driving torque for driving each of the four wheels through feedforward and feedback control over each of the target steering angles and the current steering angle of the vehicle, and independently controls the steering of each of the four wheels in a way to control the driving of the four wheels.

According to the fifth application, there is proposed a quantitative control mechanism for independently controlling the steering of each of the four wheels by differentially calculating a target steering angle of each wheel upon rotation driving of a vehicle to which the four wheel-independent driving method has been applied. Accordingly, rotation driving performance and rotation driving stability of the vehicle can be improved.

The term "part" used in this specification may include a unit implemented as hardware, software or firmware, and may be interchangeably used with a term, such as logic, a logical block, a unit, or a circuit. The "part" may be an integrated part, or a minimum unit of the part or a part thereof, which performs one or more functions. For example, according to an embodiment, the "part" may be implemented in the form of an application-specific integrated circuit (ASIC). Furthermore, an implementation described in this specification may be realized as a method or process, an apparatus, a software program, a data stream or a signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

The present disclosure has been made in an effort to solve the problems in the related art, and an object of the present disclosure is to provide a corner module apparatus for a vehicle, which can freely adjust the number and alignment of wheels to suit a purpose of a vehicle.

The present disclosure has also been made in an effort to provide a corner module apparatus for a vehicle, which can independently control operations of each wheel.

According to aspects of the present disclosure, a degree of freedom in design can be improved and various types of purpose built vehicles (PBVs) can be mass-produced because the number and arrangement of the first platforms and the second platforms can be adjusted suitably for the type or purpose of a vehicle.

The present disclosure makes it possible to provide stable driving with a driving state and a range of a steering angle, such as rotation at its own position and side driving, that can be more widely secured because the corner module can independently adjust operations of each wheel.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A corner module apparatus for a vehicle, comprising:
   a driving unit configured to provide drive power to a wheel of the vehicle;
   a braking unit configured to interfere with rotation of the wheel to generate braking power;
   a suspension unit, connected to the driving unit, configured to absorb shock transferred from a road surface to the wheel; and
   a steering unit, connected to the suspension unit, configured to be rotated about a steering axis inclined with respect to the wheel, and to adjust a steering angle of the wheel,
   wherein the steering unit comprises:
      a steering main body connected to the suspension unit, with one side of the steering main body being supported on a frame module and rotatable about the steering axis; and
      a steering driving unit connected to the steering main body and configured to rotate the steering main body relative to the frame module, the steering driving unit positioned above the steering main body.

2. The corner module apparatus of claim 1, wherein the steering axis is disposed inclined to a predetermined angle from the wheel toward the inside in a width direction of the vehicle.

3. The corner module apparatus of claim 1, wherein the driving unit comprises:
- an in-wheel motor, disposed inside the wheel, configured to generate rotatory power to rotate the wheel; and
- a knuckle, coupled to the in-wheel motor, configured to support the braking unit and the suspension unit.

4. A corner module apparatus for a vehicle, comprising:
- a driving unit configured to provide drive power to a wheel of the vehicle;
- a braking unit configured to interfere with rotation of the wheel to generate braking power;
- a suspension unit, connected to the driving unit, configured to absorb shock transferred from a road surface to the wheel; and
- a steering unit, connected to the suspension unit, configured to be rotated about a steering axis inclined with respect to the wheel, and to adjust a steering angle of the wheel, wherein the steering unit comprises:
- a steering main body, connected to the suspension unit, one side of the steering main body being supported on a frame module in a manner that is rotatable about the steering axis; and
- a steering driving unit, connected to the steering main body, configured to rotate the steering main body relative to the frame module, wherein the driving unit comprises:
- an in-wheel motor, disposed inside the wheel, configured to generate rotatory power to rotate the wheel; and
- a knuckle, coupled to the in-wheel motor, configured to support the braking unit and the suspension unit, and wherein the suspension unit comprises:
- a suspension arm having at least two sides, the at least two sides of the suspension arm being rotatably connected to the steering main body and the knuckle; and
- a shock absorber module, disposed between the suspension arm and the steering main body and provided in a manner that is expandable and contractable in a length direction thereof.

5. The corner module apparatus of claim 4, wherein the suspension arm comprises:
- a first arm extending along a width direction of the vehicle; and
- a second arm extending along the width direction of the vehicle and spaced a distance, in an upward-downward direction, away from the first arm.

6. The corner module apparatus of claim 4, wherein the shock absorber modules are provided in one pair and are disposed on both sides, respectively, of the steering main body.

7. The corner module apparatus of claim 5, wherein the shock absorber module comprises:
- a cylinder connected to the suspension arm;
- a rod slidably installed in the cylinder and connected to the steering main body; and
- an elastic body provided between the cylinder and the rod and configured to elastically support the rod with respect to the cylinder.

8. The corner module apparatus of claim 7, wherein a lower end portion of the cylinder is rotatably coupled to the second arm.

9. The corner module apparatus of claim 7, wherein both end portions of the elastic body having two end portions are coupled to a lower sheet fixed to the cylinder and an upper sheet fixed to the rod, respectively.

10. A corner module apparatus for a vehicle, comprising:
- a driving unit configured to provide drive power to a wheel of the vehicle;
- a braking unit configured to interfere with rotation of the wheel to generate braking power;
- a suspension unit, connected to the driving unit, configured to absorb shock transferred from a road surface to the wheel;
- a steering unit, connected to the suspension unit, configured to be rotated about a steering axis inclined with respect to the wheel, and to adjust a steering angle of the wheel; and
- a support unit, extending from the frame module, configured to support the other side of the steering main body, wherein the steering unit comprises:
- a steering main body, connected to the suspension unit, one side of the steering main body being supported on a frame module in a manner that is rotatable about the steering axis; and
- a steering driving unit, connected to the steering main body, configured to rotate the steering main body relative to the frame module.

11. The corner module apparatus of claim 10, wherein the support unit comprises:
- a support body, disposed in a manner that faces the other side of the steering main body;
- a first joint, coupled to one side of the support body and connected to the frame module; and
- a second joint, coupled to the other side of the support body and connected to the other side of the steering main body.

12. The corner module apparatus of claim 11, wherein the first joint is a rubber bush.

13. The corner module apparatus of claim 11, wherein the second joint is a ball joint.

* * * * *